US008068205B2

(12) United States Patent
Ahn

(10) Patent No.: US 8,068,205 B2
(45) Date of Patent: Nov. 29, 2011

(54) METHOD OF FABRICATING A LIQUID CRYSTAL DISPLAY DEVICE USING GATE AND COMMON LINKS TO LINK GATE AND COMMON LINES TO GATE AND COMMON PADS

(75) Inventor: Byung Chul Ahn, Anyang-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 12/591,450

(22) Filed: Nov. 19, 2009

(65) Prior Publication Data

US 2010/0073622 A1    Mar. 25, 2010

Related U.S. Application Data

(62) Division of application No. 11/167,829, filed on Jun. 28, 2005, now Pat. No. 7,643,122.

(30) Foreign Application Priority Data

Jun. 30, 2004 (KR) .................. 10-2004-0049954

(51) Int. Cl.
*G02F 1/1339* (2006.01)
*G02F 1/1345* (2006.01)
(52) U.S. Cl. ................... 349/152; 349/149; 349/153
(58) Field of Classification Search .............. 349/190, 349/39, 149–154
See application file for complete search history.

(56) References Cited

U.S. PATENT DOCUMENTS

| 5,162,933 A | 11/1992 | Kakuda et al. |
| 5,317,433 A | 5/1994 | Miyawaki et al. |
| 5,339,181 A | 8/1994 | Kim et al. |
| 5,462,887 A | 10/1995 | Glück |
| 5,668,379 A | 9/1997 | Ono et al. |
| 5,731,856 A | 3/1998 | Kim et al. |
| 5,771,083 A | 6/1998 | Fujihara et al. |
| 5,793,460 A | 8/1998 | Yang |
| 5,847,781 A | 12/1998 | Ono et al. |
| 6,100,954 A | 8/2000 | Kim et al. |
| 6,133,978 A | 10/2000 | Tajima |
| 6,759,281 B1 | 7/2004 | Kim et al. |
| 7,253,867 B2 | 8/2007 | Kim et al. |
| 2001/0013918 A1* | 8/2001 | Kwak et al. ........... 349/153 |
| 2002/0176040 A1* | 11/2002 | Lim et al. ............. 349/113 |
| 2003/0038913 A1 | 2/2003 | Choo |
| 2004/0041973 A1* | 3/2004 | Lee et al. ............. 349/153 |
| 2004/0125314 A1 | 7/2004 | Choi |

FOREIGN PATENT DOCUMENTS

| KR | 10-0246020 | 3/2000 |
| KR | 10-2003-0016534 | 3/2003 |
| KR | 1020020081961 | * 6/2004 |

* cited by examiner

*Primary Examiner* — Jessica M Merlin
(74) *Attorney, Agent, or Firm* — McKenna Long & Aldridge, LLP

(57) ABSTRACT

The present invention provides a liquid crystal display panel that is adaptive for preventing a liquid crystal contamination as well as improving an adhesive strength of a sealant and an organic insulating film, and a fabricating method thereof. A liquid crystal display device according to an embodiment of the present invention includes: a first and a second substrate having a liquid crystal region, a sealant region, and an outer region; a wiring disposed on the first substrate, the wiring crossing the sealant region; a gate insulating film disposed on the wiring; an organic insulating film disposed on a portion of the wiring; and a sealant disposed on the sealant region of the first and second substrates, wherein the sealant is in contact with the gate insulating film.

13 Claims, 117 Drawing Sheets

METHOD OF FABRICATING A LIQUID CRYSTAL DISPLAY DEVICE USING GATE AND COMMON LINKS TO LINK GATE AND COMMON LINES TO GATE AND COMMON PADS

This application is a Divisional Application of U.S. patent application Ser. No. 11/167,829, filed Jun. 28, 2005, now U.S. Pat. No. 7,643,122, now allowed, which claims priority to Korean Application No. 10-2004-0049954, filed Jun. 30, 2004, all of which are hereby incorporated by reference for all purposes as if fully sets forth herein.

This application claims the benefit of the Korean Patent Application No. P2004-49954 filed on Jun. 30, 2004, which is hereby incorporated by reference.

BACKGROUND OF THE INVENTION

1. Field of the Invention

The present invention relates to a liquid crystal display panel having an organic insulating film. More particularly, the present invention relates to a liquid crystal display panel that is adaptive for preventing liquid crystal contamination as well as improving an adhesive strength of a sealant and an organic insulating film, and a fabricating method thereof.

2. Description of the Related Art

A liquid crystal display device displays a picture by controlling the transmission of light through a liquid crystal by use of an electric field. A liquid crystal display device includes a liquid crystal display panel in which liquid crystal cells are arranged in a matrix shape, and a drive circuit to drive the liquid crystal display panel.

The liquid crystal display panel, as illustrated in FIG. 1, has a structure in which a thin film transistor substrate 2 and an upper plate 4 a disposed opposite each other and are bonded by a seal material 6. The bonded thin film transistor array substrate 2 maintains a fixed cell gap from the upper plate 4 by a spacer, and the cell gap is filled with the liquid crystal which is for controlling the transmission of light in accordance with an applied electric field.

The thin film transistor substrate 2 includes a gate line and a data line formed on a first substrate; a thin film transistor connected at a crossing of the gate line and the data line; a pixel electrode formed at each pixel area which is defined by the crossing of the gate line and the data line and connected to the thin film transistor; a passivation film to protect the structure; and an alignment film to align liquid crystal. The gate line receives a scan signal from a gate driver through a gate pad 10. The data line receives a video signal from a data driver through a data pad 8. The thin film transistor responds to the scan signal of the gate line to supply a video signal of the data line to the pixel electrode.

The upper plate 4 includes a color filter which is formed on a second substrate; a black matrix for dividing between the color filters and to reflect external incident light; a common electrode for supplying a reference voltage to the liquid crystal cells; and an alignment film to align liquid crystal.

The thin film transistor substrate 2 and the upper plate 4 are bonded together by a sealant 6 which is spread along the outer area of a picture display area where the liquid crystal cells are arranged. The upper plate 4 is bonded with the thin film transistor substrate 2 such that the gate pad 8 and the data pad 10, which are provided at a bordering area of the thin film transistor substrate 2, are exposed.

An inorganic insulating film or an organic insulating film is used for the passivation film which is included in the thin film transistor substrate 2 in the liquid crystal display panel. The inorganic insulating film is formed of an inorganic insulating material, such as SiNx, SiOx. The inorganic insulating film has a high dielectric constant and is formed by a deposition method. Accordingly, it has a disadvantage in that it is difficult to increase the height of the inorganic insulating film. Because of this, the pixel electrode and the data line, which have the inorganic insulating film disposed between them have to keep a fixed horizontal gap, e.g., a horizontal gap of 3~5 μm, in order to minimize a coupling effect caused by a parasitic capacitance. As a result, the size of the pixel electrode which controls the aperture ratio of the liquid crystal cell is diminished, thereby lowering the aperture ratio.

An organic insulating film is applied in order to solve the low aperture ratio problem caused by the inorganic insulating film. As such, the organic insulating material has relatively low dielectric constant. Further, the organic insulating film has an advantage that it can be formed to be relatively thick by application methods such as spin coating. The presence of the organic insulating film, which has a relatively low dielectric constant and which can be formed relatively thick, reduces the capacitance of the parasitic capacitor between the data line and the pixel electrode. As a result, the pixel electrode can be formed to overlap the data line. As a result, the size of the pixel electrode is increased along with the aperture ratio.

An organic insulating film might also be applied to a structure in which the color filter is formed on the thin film transistor substrate, and a transflective structure in which each pixel area is divided into a transmission area and a reflection area.

According to the related art, the organic insulating film included in the thin film transistor substrate is in contact with the sealant, which is for bonding the thin film transistor substrate with the upper plate. The organic insulating film and the sealant, which is generally an epoxy resin have a weak adhesive characteristic such that its adhesive strength deteriorates over time. Deterioration of the organic insulating film provides a path through which the moisture of the outside penetrates due to its structure, resulting in defects such as a liquid crystal contamination. Further, at the interface where the organic insulating film and the sealant are in contact with the liquid crystal, liquid crystal contamination may be caused by the organic material with polarity which is generated by the mutual reaction of the polymer and monomer remaining behind at the organic insulating film and the sealant.

SUMMARY OF THE INVENTION

Accordingly, the present invention is directed to a liquid crystal display panel including organic insulation film and fabricating method thereof that substantially obviates one or more of the aforementioned problems due to limitations and disadvantages of the related art. In general, the present invention achieves this by providing a structure and fabrication process that prevents liquid crystal contamination and improves the adhesive strength of a sealant by preventing a reaction between the liquid crystal, the sealant, and the organic insulating layer in the liquid crystal display device.

An advantage of the present invention is that it reduces the risk of contamination of a liquid crystal material Another advantage of the present invention is that it improves liquid crystal display reliability by improving the adhesive strength of the sealant used to bond the two substrates forming the liquid crystal display device.

Additional advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

The aforementioned and other advantages of the present invention are achieved with a liquid crystal display device, which comprises a first and a second substrate having a liquid crystal region, a sealant region, and an outer region; a wiring disposed on the first substrate, the wiring crossing the sealant region; a gate insulating film disposed on the wiring; an organic insulating film disposed on a portion of the wiring; and a sealant disposed on the sealant region of the first and second substrates, wherein the sealant is in contact with the gate insulating film.

In another aspect of the present invention, the aforementioned and other advantages are achieved by a method of fabricating a liquid crystal display device, wherein the method comprises providing first and second substrates having a liquid crystal region, a sealant region, and an outer region; forming a wiring on the first substrate, wherein the wiring crosses the sealant region; forming an inorganic insulating film on the wiring; forming an organic insulating film on the inorganic insulating film, wherein a portion of the inorganic insulating film is exposed in the sealant region; and forming a liquid crystal layer between the first and second substrates using a sealant, wherein the sealant contacts the inorganic insulating film in the sealant region.

It is to be understood that both the foregoing general description and the following detailed description are exemplary and explanatory and are intended to provide further explanation of the invention as claimed.

BRIEF DESCRIPTION OF THE DRAWINGS

These and other objects of the invention will be apparent from the following detailed description of the embodiments of the present invention with reference to the accompanying drawings.

DETAILED DESCRIPTION OF THE ILLUSTRATED EMBODIMENT

Reference will now be made in detail to embodiments of the present invention, examples of which are illustrated in the accompanying drawings.

Hereinafter, the present invention will be described in detail with reference to FIGS. 2 to 24.

Figure 1:
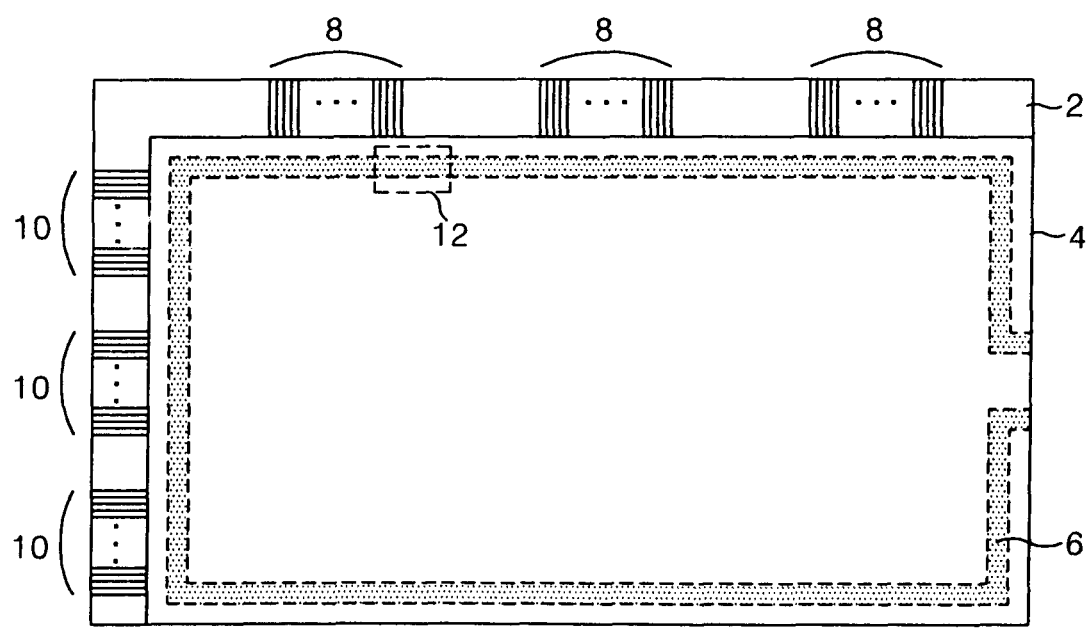
FIG. 1 is a plane view briefly illustrating a related art liquid crystal display panel structure.
Figure 2:
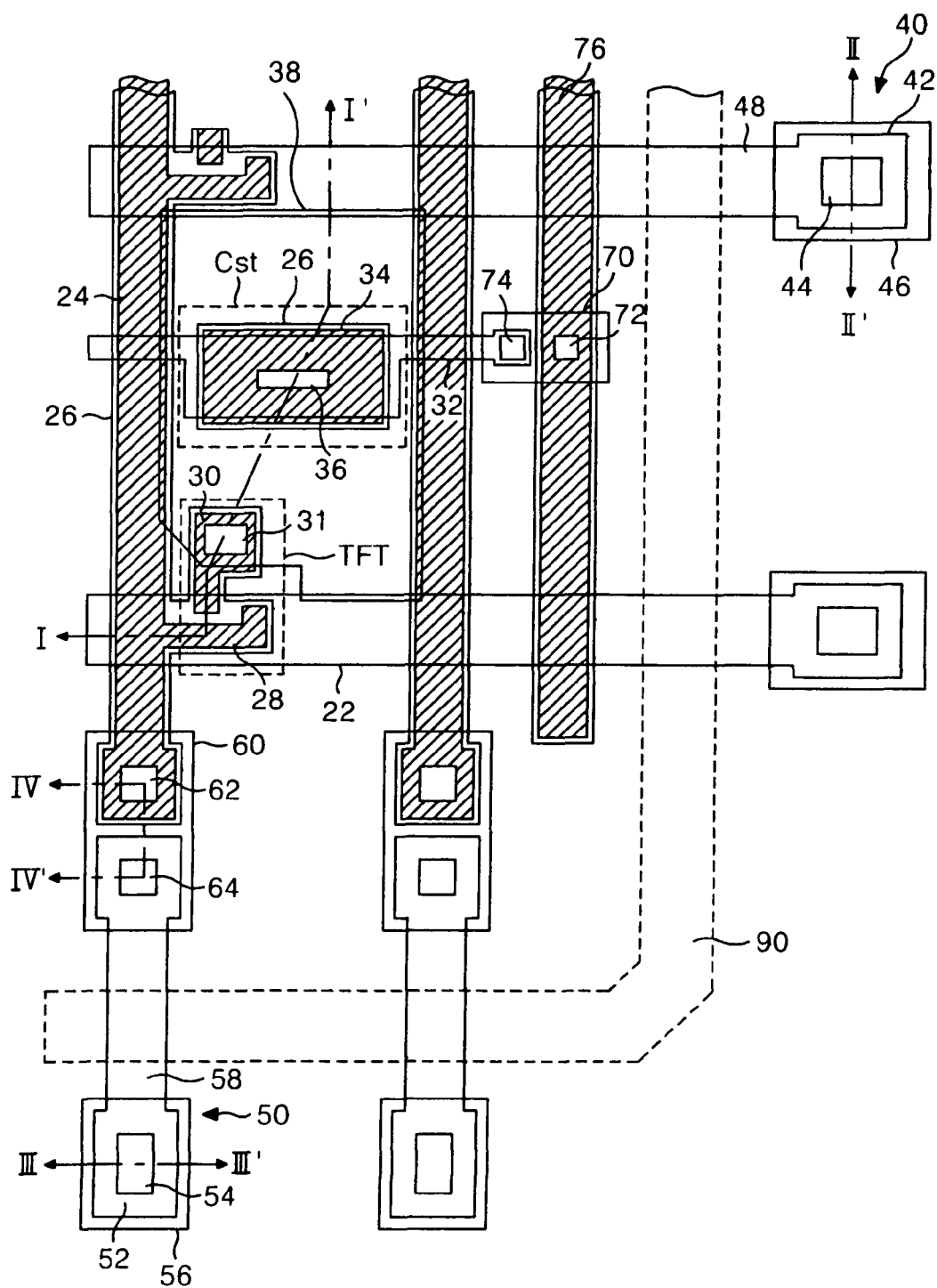
FIG. 2 is a plane view illustrating a part of a thin film transistor substrate including an organic insulating film in a liquid crystal display panel according to an embodiment of the present invention.

FIG. 2 is a plane view illustrating a part of an exemplary thin film transistor substrate including an organic insulating film in a liquid crystal display panel according to an embodiment of the present invention. FIG. 3A-3D are sectional diagrams illustrating a thin film transistor substrate illustrated in FIG. 2, respectively taken along the lines I-I', II-II', III-III' and IV-IV'. The thin film transistor substrate shown in FIGS. 3A-3D is illustrated by taking a high aperture ratio structure as an example, wherein the high aperture ratio structure has an organic insulating film used to increase the aperture ratio.

Referring to FIGS. 2 and 3A-3D, the thin film transistor substrate includes a gate line 22 and a data line 24 which cross each other with a gate insulating film 82 disposed between them to define a pixel area; a thin film transistor TFT connected to the gate line 22 and the data line 24; and a pixel electrode 38, which is formed at each pixel area and connected to the thin film transistor TFT. The thin film transistor substrate includes a storage capacitor Cst formed by the overlapping of pixel electrode 38 and a first common line 32 that crosses a pixel area; a gate pad 40 connected to the gate line 22 through a gate link 48; and a data pad 50 connected to the data line 24 through a data link 58.

The gate line 22 supplies a scan signal from a gate driver (not shown), and the data line 24 supplies a video signal from a data driver (not shown). The gate line 22 and the data line 24 cross each other with the gate insulating film 82 disposed between them to define each pixel area.

Figure 3A:
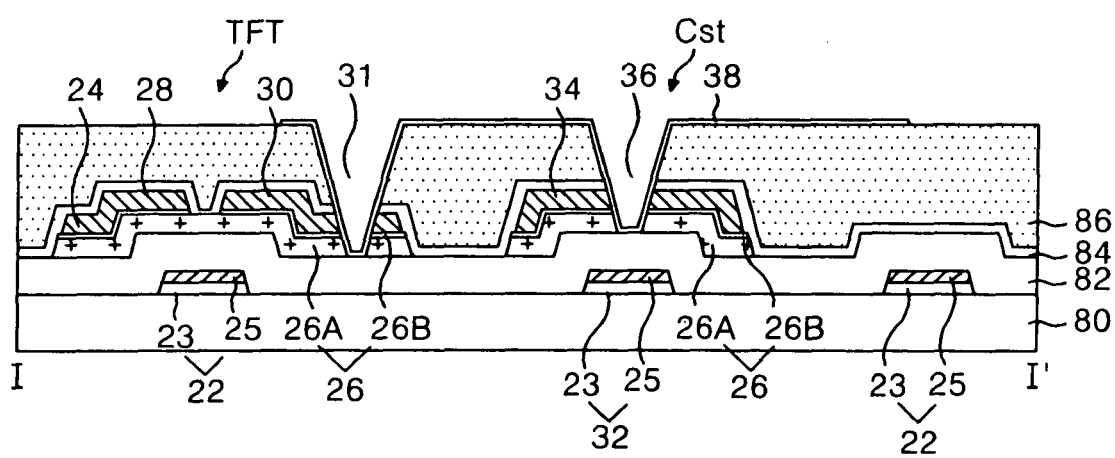
FIG. 3 is a sectional diagram illustrating a thin film transistor substrate shown in FIG. 2, taken along the lines I-I', II-II', III-III' and IV-IV'.

Referring to FIGS. 2 and 3A, the thin film transistor TFT responds to the scan signal of the gate line 22 by applying the video signal voltage on the data line 24 to the pixel electrode 38. For this, the thin film transistor TFT includes a gate electrode included in the gate line 22; a source electrode 28 connected to the data line 24; a drain electrode 30 that faces the source electrode 28 and is connected to the pixel electrode 38; an active layer 26A which overlaps the gate line 22 with the gate insulating film 82 to form a channel between the source electrode 28 and the drain electrode 30; and an ohmic contact layer 26B formed on the active layer 26A, except for a channel part, in order to be in ohmic-contact with the source electrode 28 and the drain electrode 30.

A semiconductor pattern 26, which includes the active layer 26A and the ohmic contact layer 26B, is formed to overlap the data line 24.

The pixel electrode 38 is formed on an organic insulating film 86 of each pixel area and is connected to the drain electrode 30 exposed through a first contact hole 31 that penetrates the organic insulating film 86 and a buffer insulating film 84. The pixel electrode 38 is formed to partially overlap the gate line 22 and the data line 24 thereby increasing the aperture ratio. The pixel electrode 38 generates a potential difference with the common electrode of the upper plate (not shown) by the video signal voltage supplied through the thin film transistor TFT. The liquid crystal, by means of its dielectric anisotropy, rotates according this potential difference to control the transmission of the light through the liquid crystal device. Accordingly, the brightness becomes different as a function of the video signal.

The storage capacitor Cst is formed by having the first common line 32 crossing the pixel electrode 38 overlap the storage upper electrode 34 connected to the pixel electrode 38 through a second contact hole 36 with the gate insulating film 82 between them. The storage upper electrode 34 overlaps the semiconductor pattern 26. The storage capacitor Cst stably maintains the video signal voltage, which is charged in the pixel electrode.

The gate line 22 is connected to a gate driver (not shown) through a gate pad 40. The gate pad 40 includes a gate pad lower electrode 42 connected to the gate line 22 through a gate link 48, and a gate pad upper electrode 46 connected to the gate pad lower electrode 42. The gate pad lower electrode 42 is exposed through a third contact hole 44, which goes through the organic insulating film 86 to the gate insulating film 82.

The data line 24 is connected to a data driver (not shown) through a data pad 50. The data pad 50 includes a data pad lower electrode 52 connected to the data line 24 through the data link 58, and a data pad upper electrode 56 connected to the data pad lower electrode 52. The data pad lower electrode 52 is exposed through a fourth contact hole 54, which goes through the organic insulating film 86 to the gate insulating film 82.

Figure 3B:
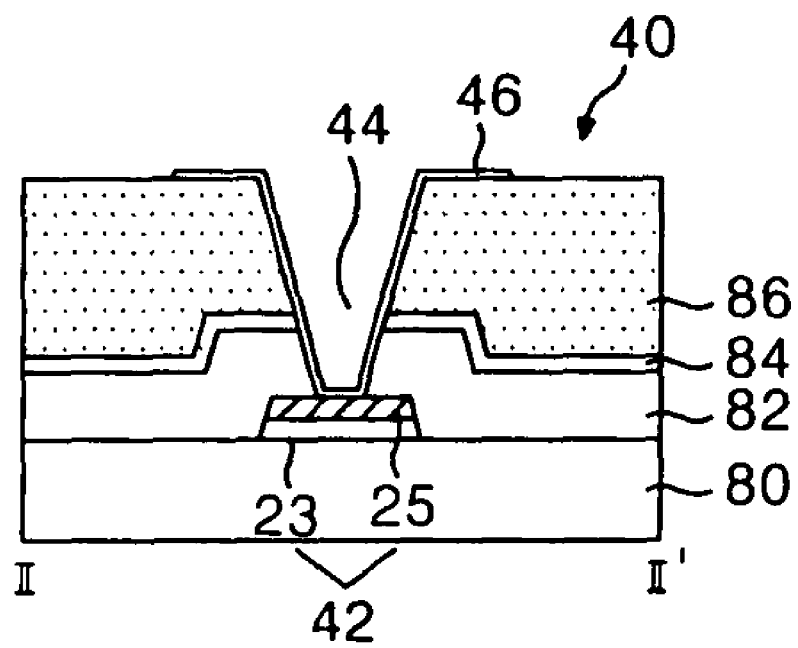
Figure 3C:
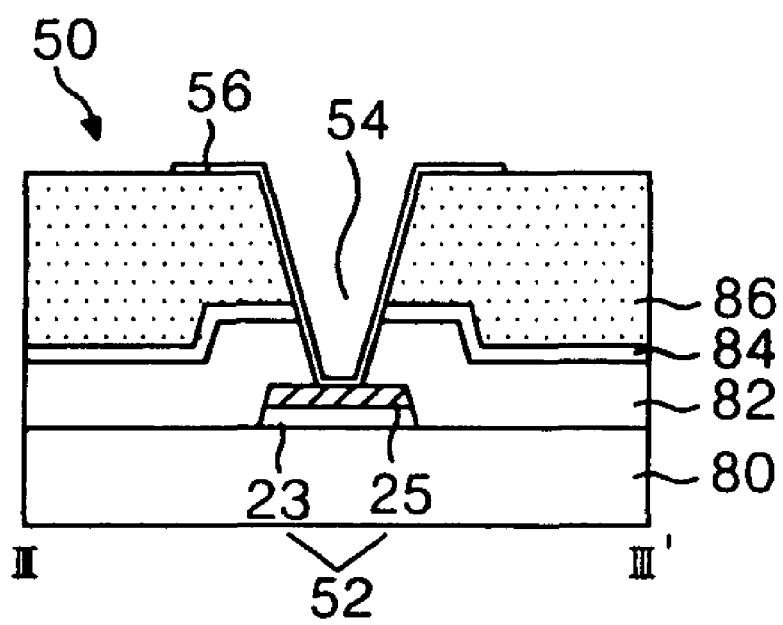

Referring to FIGS. 3B and 3C, the data pad 50 and link 58 are formed in the same vertical structure as the gate pad 40 and link 48. In other words, the data pad and link 50, 58 are formed from a gate metal layer having a single layer or double layer structure together with the gate pad 40 and link 48, the gate line 22 and the first common line 32. For example, the gate metal layer may be formed of a double layer structure in which first and second gate metal layers 23 and 25 are deposited. In this manner, the data pad 50 and link 58 are formed in the same vertical structure as the gate pad 40 and link 48, the gate insulating film 82 and the organic insulating film 86 serve as the passivation film, thereby improving the reliability of the wiring. Further, a sealant 90 is formed to cross the gate link 48 and the data link 58 of the same vertical structure so that the seal area can maintain a uniform cell gap.

Figure 3D:
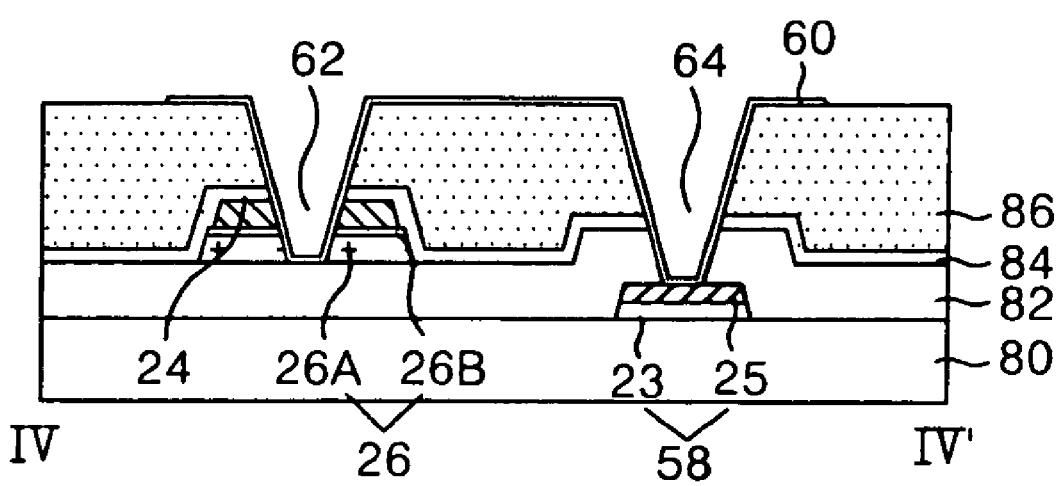
Figure 4A:
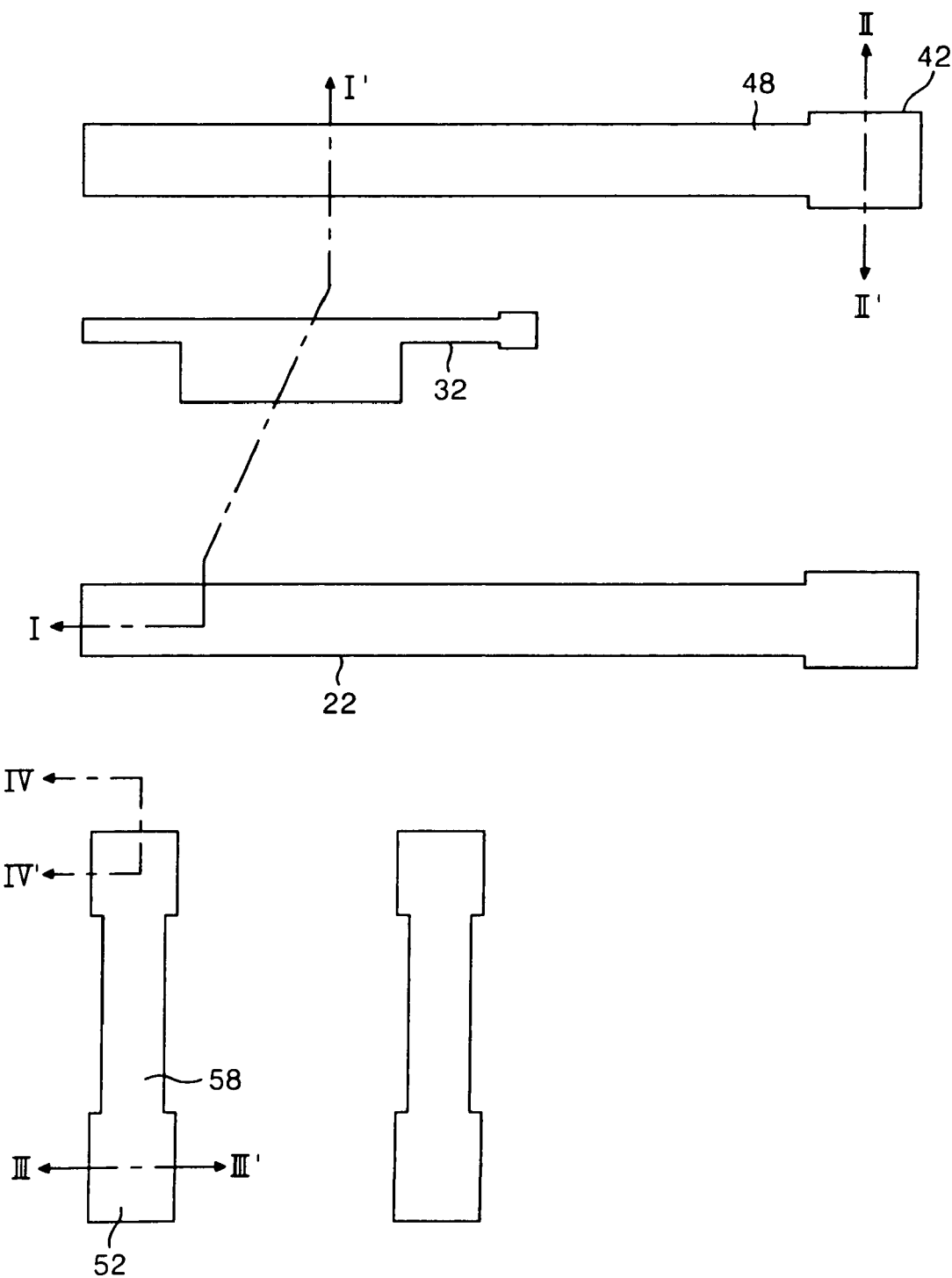
FIGS. 4A through 4E are a plane view and a sectional diagram to explain a first mask process in a fabricating method of a thin film transistor substrate according to the embodiment of the present invention.
Figure 4B:
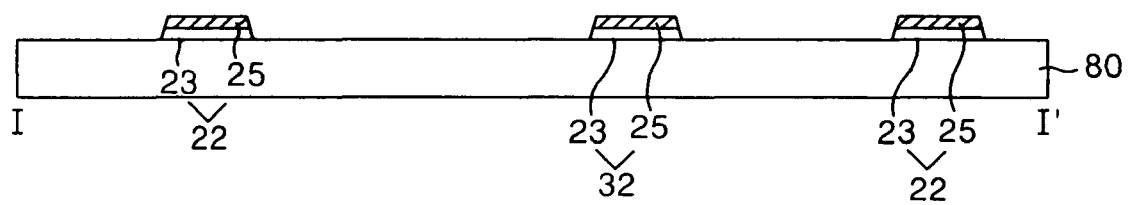
Figure 4C:
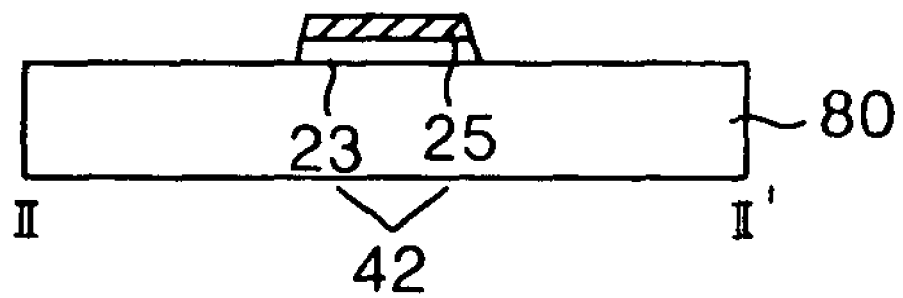
Figure 4D:
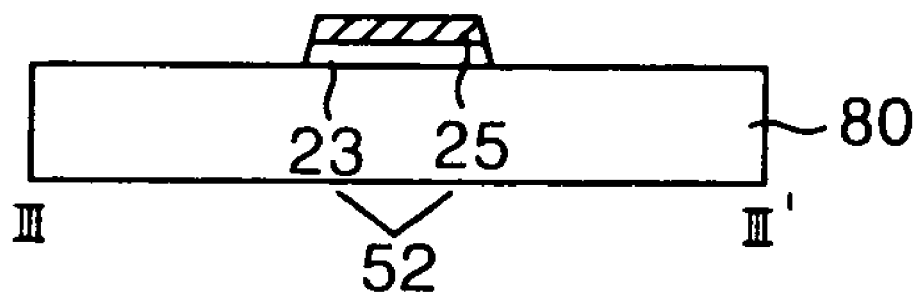
Figure 4E:
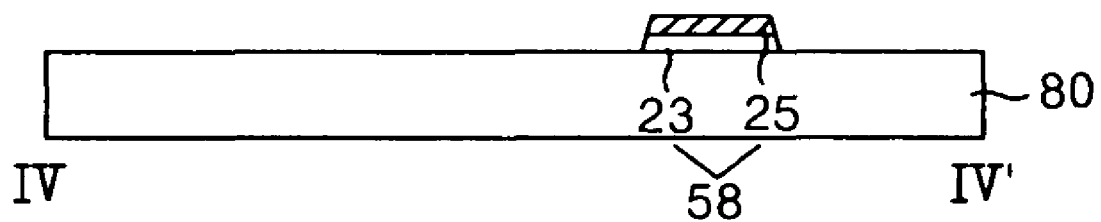
Figure 5A:
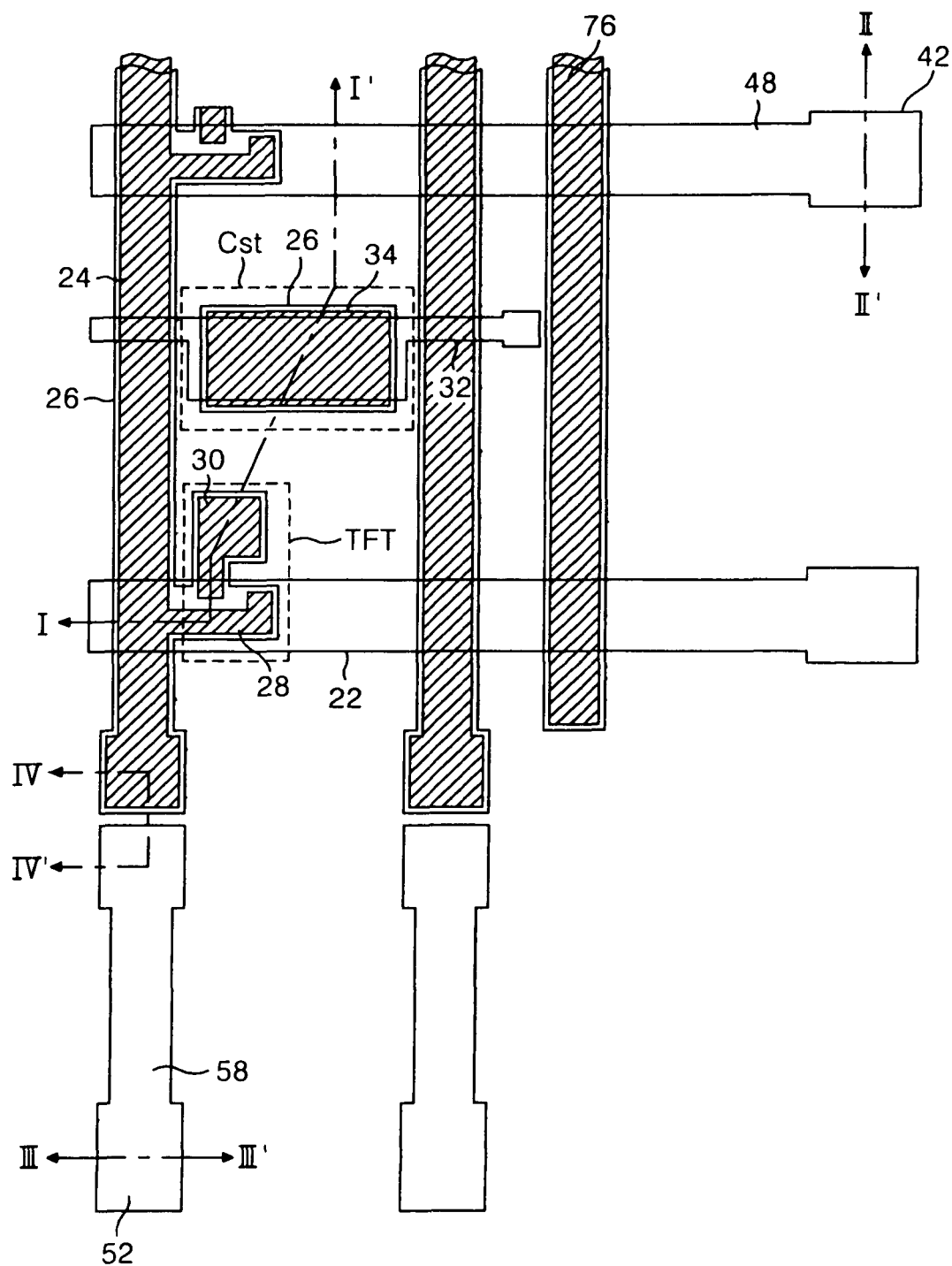
FIGS. 5A through 5E are a plane view and a sectional diagram to explain a second mask process in the fabricating method of the thin film transistor substrate according to the embodiment of the present invention.
Figure 5B:
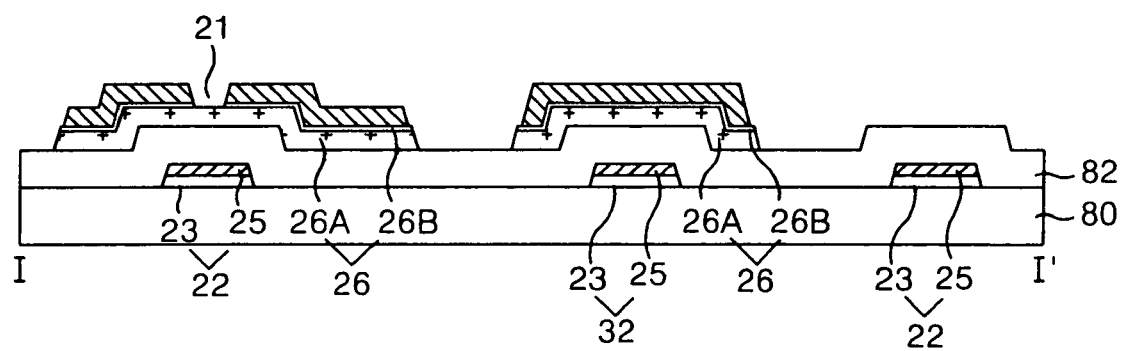
Figure 5C:
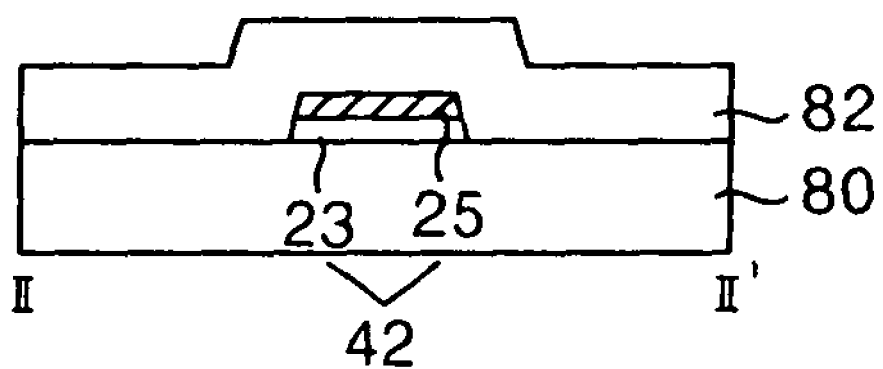
Figure 5D:
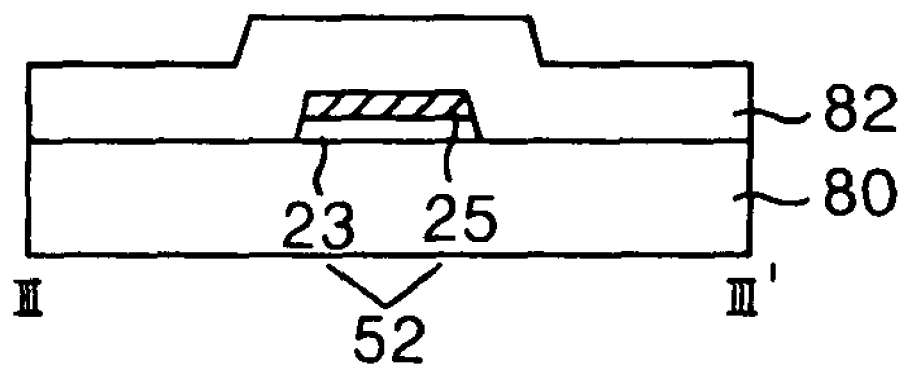
Figure 5E:
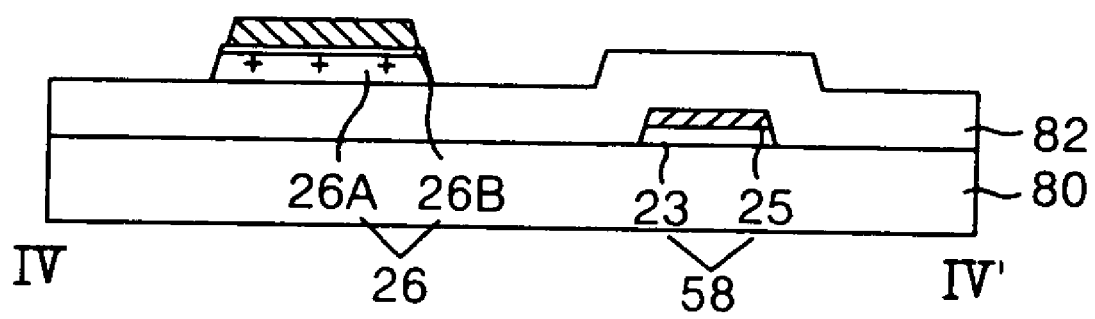
Figure 6A:
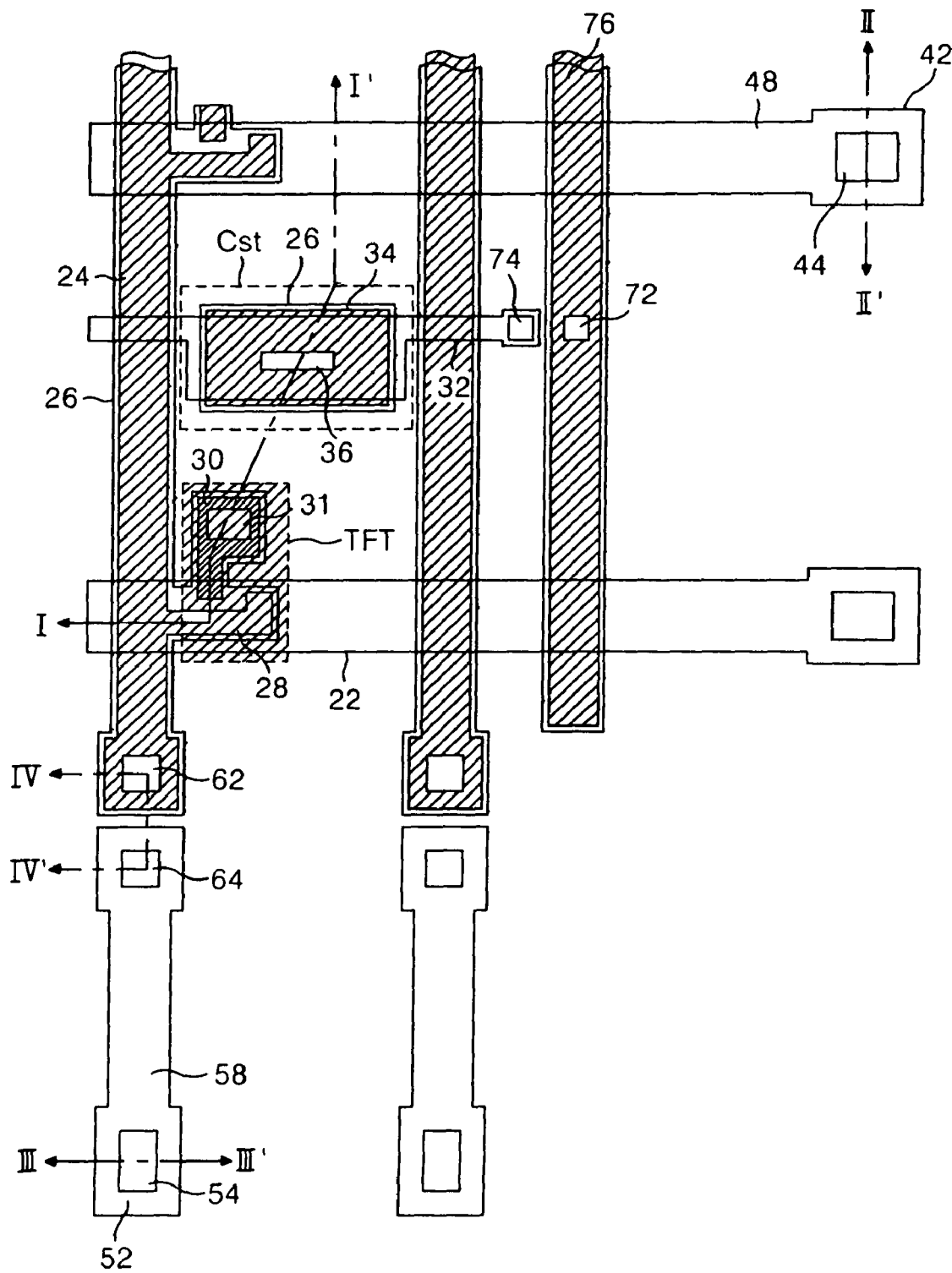
FIGS. 6A through 6E are a plane view and a sectional diagram to explain a third mask process in the fabricating method of the thin film transistor substrate according to the embodiment of the present invention.
Figure 6B:
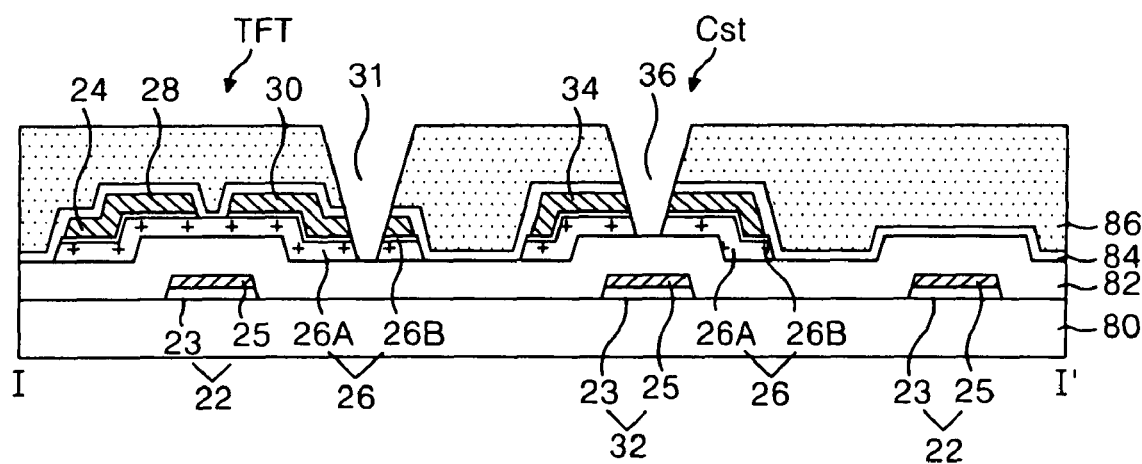
Figure 6C:
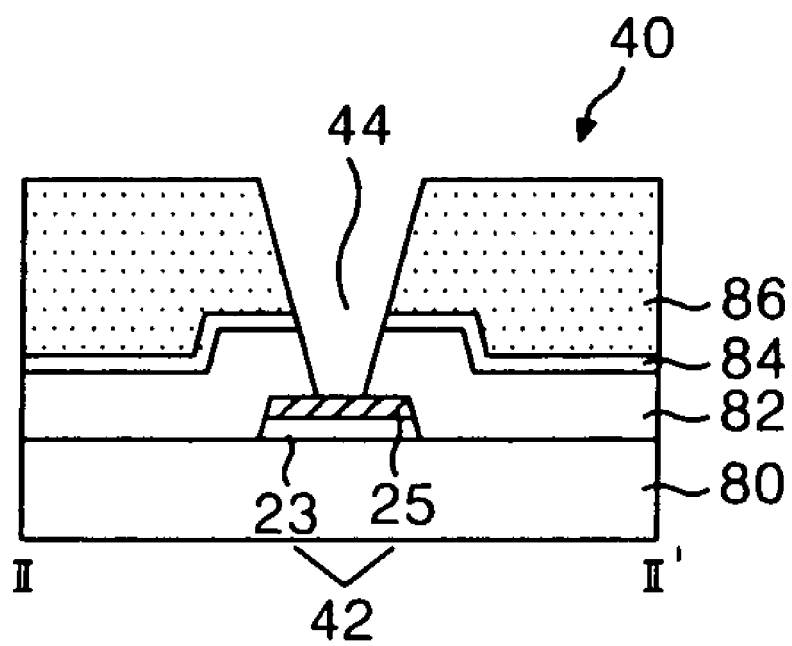
Figure 6D:
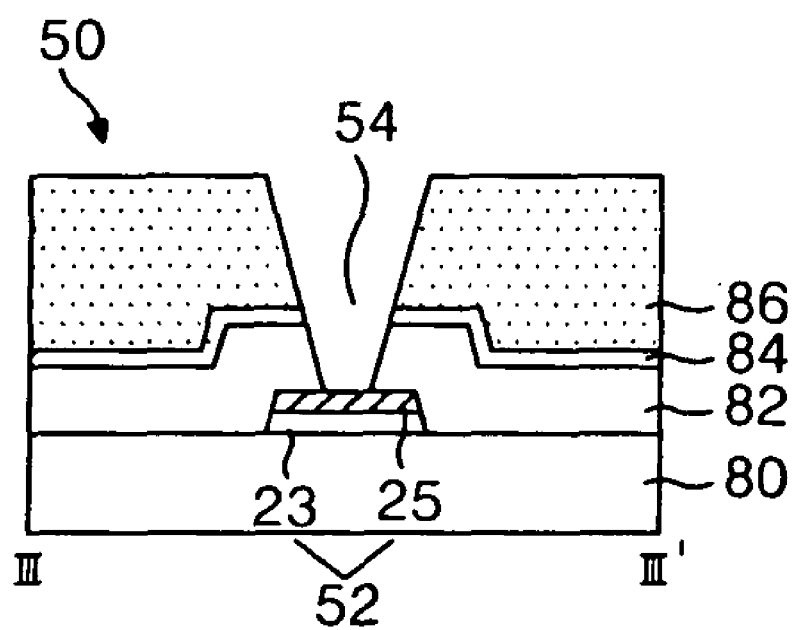
Figure 6E:
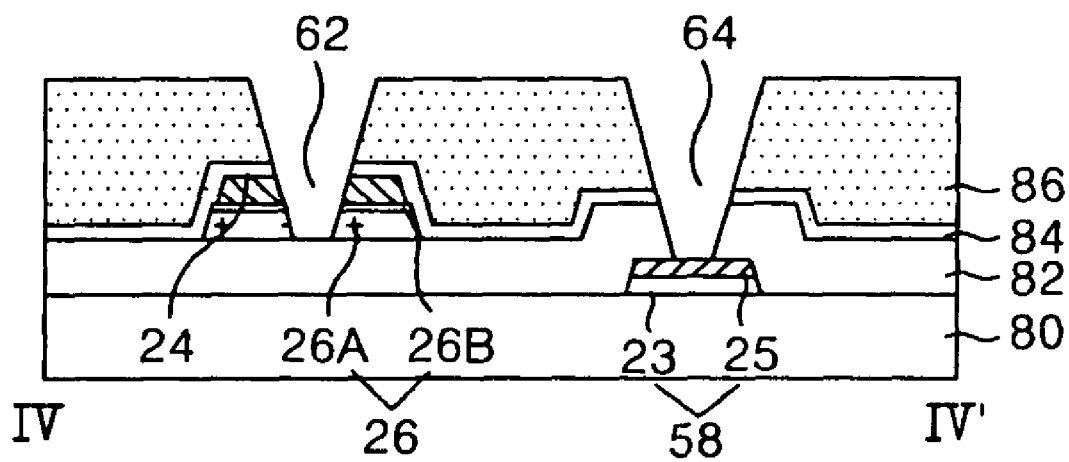
Figure 7A:
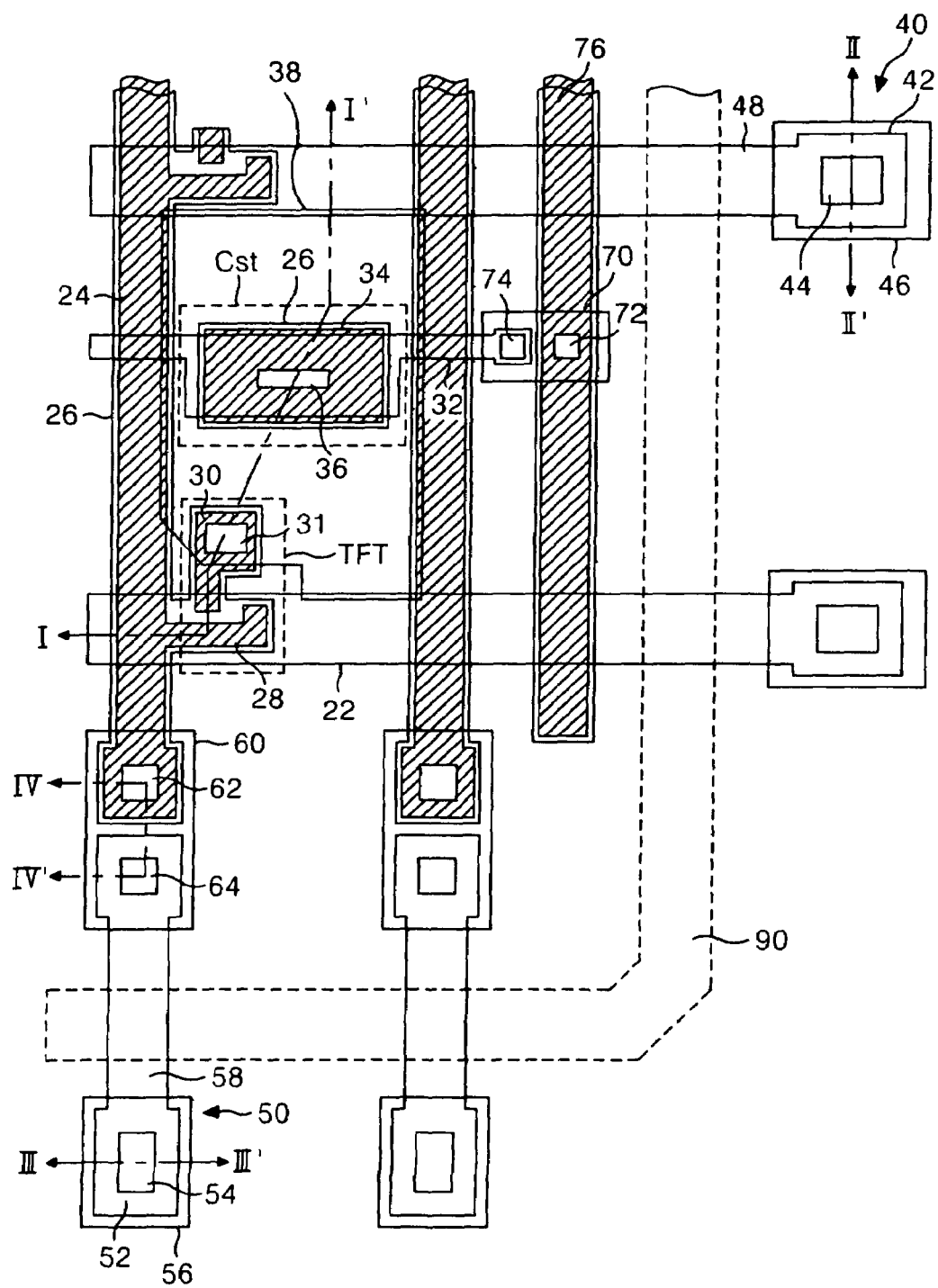
FIGS. 7A through 7E are a plane view and a sectional diagram to explain a fourth mask process in the fabricating method of the thin film transistor substrate according to the embodiment of the present invention.
Figure 7B:
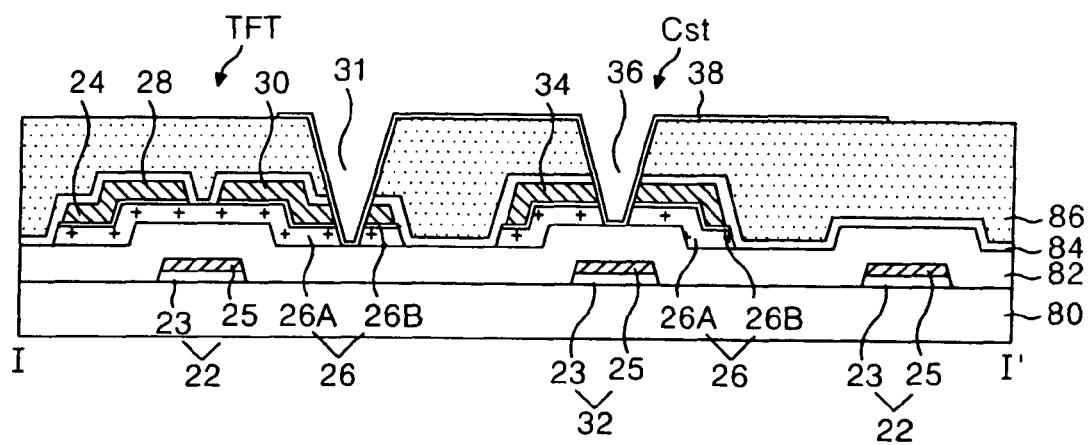
Figure 7C:
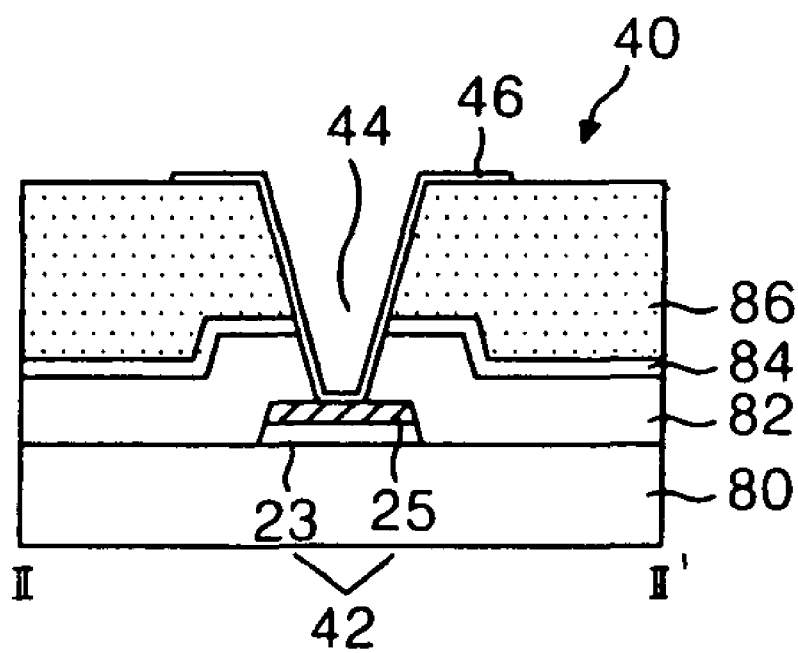
Figure 7D:
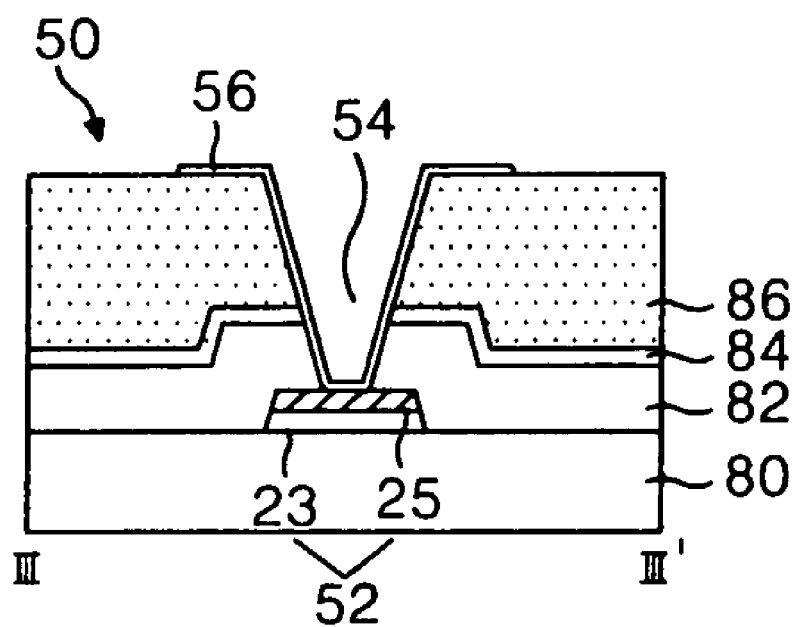
Figure 7E:
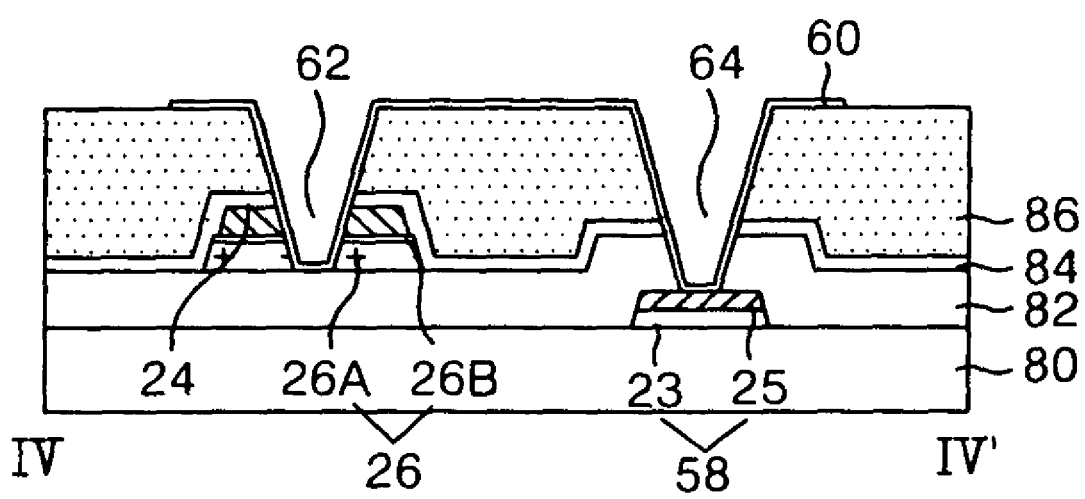

Referring to FIG. 3D, the thin film transistor substrate of the present invention further includes a first contact electrode 60 to connect the data link 58, which is formed of the gate metal layer 23, 25 under the gate insulating film 82, with the data line 24, which is formed of the source/drain metal layer on top of the gate insulating film 82. The first contact electrode 60 connects the data line 24 which is exposed through a fifth contact hole 62 that penetrates the organic insulating film 86 and a buffer insulating film 84, with the data link 58 which is exposed through a sixth contact hole 64 that penetrates from the organic insulating film 86 to the gate insulating film 82. The first contact electrode 60 is located in an area of the liquid crystal display that is to be sealed by sealant 90.

The thin film transistor substrate of the present invention further includes a second common line 76 to commonly connect the first common line 32 that crosses the pixel electrode 38. The second common line 76 is commonly connected to the first common lines, 32 which are formed between the gate lines 22, to supply a common voltage. The second common line 76 is formed of the same source/drain metal layer as the data line, whereas the first common line 32 if formed of the gate metal layer in 23 and 25. The second common line 76 is insulated from and crosses the gate line 22, and the semiconductor pattern 26 is disposed underneath. The second common line 76 is connected to the first common line 32 which is formed of the gate metal layer 23 and 25 through a second contact electrode 70. The second contact electrode 70 connects the second common line 76 which is exposed through a seventh contact hole 72 that penetrates the organic insulating film 86 and the buffer insulating film 84; and the first common line 32 is exposed through an eighth contact hole 74 that penetrates from the organic insulating film 86 to the gate insulating film 82. The contact electrode 70 is located at a liquid crystal area which is to be sealed by the sealant 90.

The thin film transistor substrate of the present invention further includes a common pad and a link (not shown) to supply the common voltage from an external common voltage source to the second common line 76. The common pad and link have the same vertical structure as the data pad 50 and link 58, and it is connected to the second common line through a contact part (not shown) that has the same vertical structure as a contact part of the data link 58 and the data line 24 including the first contact electrode 60.

An exemplary the fabricating method of the thin film transistor substrate of the present invention with such a composition is as follows.

FIGS. 4A through 4E are a plane view and sectional diagrams that illustrates a first mask process in an exemplary fabricating method of a thin film transistor substrate according to the embodiment of the present invention.

A gate metal pattern is formed, including the gate line 22, the gate link 48, a gate pad lower electrode 42, the data link 58, a data pad lower electrode 52 and the first common line 32 on the lower substrate 80 by a first mask process. The gate metal pattern is formed in a double structure where the first and second gate metal layers 23, 25 are deposited.

The first and second gate metal layers 23, 25 may be deposited on the lower substrate 80 by a deposition method such as sputtering. The first and second gate metal layers 23, 25 are formed of a metal such as Mo, Ti, Cu, Al(Nd), Cr, and MoW. In a particular embodiment the first gate metal layer 23 is formed of Al, and the second gate metal layer 25 is of Mo. The deposited first and second metal layers 23, 25 are patterned by a photolithography process using a first mask and an etching process, thereby forming the gate metal pattern including the gate line 22, the gate link 48, the gate pad lower electrode 42, the data link 58, the data pad lower electrode 52 and the first common line 32. The gate metal pattern includes a common pad lower electrode and a common link (not shown).

FIGS. 5A through 5E are a plane view and sectional diagrams to explain an exemplary second mask process in the fabricating method of the thin film transistor substrate according to the embodiment of the present invention.

The gate insulating film 82 is formed on the lower substrate 80 where the gate metal pattern is formed. Using a second mask process, a source/drain metal pattern is formed, which includes the data line 24, the source electrode 28, the drain electrode 30 and the storage upper electrode 34. A semiconductor pattern 26 is next formed, which includes the active layer 26A and the ohmic contact layer 26B, which overlaps along the rear surface of the source/drain metal pattern.

In a particular embodiment of a second mask process, a gate insulating film 82, an amorphous silicon layer, an amorphous silicon layer doped with impurities (n+ or p+) and the source/drain metal layer are sequentially formed on the lower substrate 80 where the gate pattern is formed. For example, the gate insulating film 82, the amorphous silicon layer, and the amorphous silicon layer doped with impurities (n+ or p+) may be formed by a PECVD method, and the source/drain metal layer is formed by a sputtering method. The gate insulating film 82 may be formed of an inorganic insulating material such as SiOx and SiNx, and the source/drain metal layer may be formed of a metal such as Mo, Ti, Cu, Al(Nd), Cr and MoW.

A photo-resist pattern may be formed with a stepped surface on the source/drain metal layer by a photolithography process using a diffractive exposure (halftone) mask. The photo-resist pattern with the stepped surface has a structure such that the part for forming the channel of the thin film transistor is thinner than the other part. The source/drain pattern including the data line 24, the source electrode 28, the drain electrode 30 integrated with the source electrode 28, the storage upper electrode 34, the second common line 76, and the semiconductor pattern 26 disposed underneath these elements are formed by the etching process using the photo-resist pattern.

Subsequently, the photo-resist pattern for forming the channel 21, which corresponds to thinner part of the stepped surface, is removed by an ashing process using an oxygen $O_2$ plasma, and the photo-resist pattern corresponding to the rest of the stepped surface becomes thin. The exposed source/drain pattern and the ohmic contact layer 26B underneath are exposed by the etching process using the ashed photo-resist pattern as a mask, thus the source electrode 28 and the drain electrode 30 are separated and the active layer 26A corresponding to the channel 21 is exposed. Both side parts of the source/drain pattern are etched once more along the ashed photo-resist pattern, thus the source/drain pattern and the semiconductor pattern 26 have a fixed stepped difference in a step shape.

The photo-resist pattern remaining behind on the source/drain pattern is removed by a strip process.

FIGS. 6A through 6D are a plane view and sectional diagrams illustrating an exemplary third mask process in the fabricating method of the thin film transistor substrate according to the present invention.

Using the third mask process, the buffer insulating film 84 and the organic insulating film 86 are formed, including first to eighth contact holes 31, 36, 44, 54, 62, 64, 72 and 74 on the gate insulating film 82. Specifically, the buffer insulating film 84 is formed on the gate insulating film 82 where the source/drain pattern is formed, using a deposition method such as PECVD, and the organic insulating film 86 is formed thereon by a deposition process such as spin coating. The buffer insulating film 84 may include an inorganic insulating material such as that used for the gate insulating film 82, and the organic insulating film 86 may include an organic insulating material such as acrylic compound, Teflon, benzocyclobutene BCB, cytop or perfluorocyclobutane PFCB.

Next the first to eighth contact holes 31, 36, 44, 54, 62, 64, 72 and 74 are formed by photolithography using the third mask and the etching process. For example, if a photo-sensitive organic material such as photo acryl is used for the organic insulating film 86, the organic insulating film 86 using the third mask may be patterned by an exposure and development process, thereby forming the first to eighth contact holes 31, 36, 44, 54, 62, 64, 72 and 74 only in the organic insulating film 86. Subsequently, the first to eighth contact holes 31, 36, 44, 54, 62, 64, 72 and 74 are extended into the semiconductor pattern 26 or the gate insulating film 82 through the buffer insulating film 84, by a dry etching process using the patterned organic insulating film 86 as a mask. Specifically, each of the first, second, fifth and seventh contact holes 31, 36, 62 and 72 penetrates the buffer insulating film 84 from the organic insulating film 86 to respectively expose the drain electrode 30, the storage upper electrode 34, the data line 24 and the second common line 76. If a metal such as Mo, which is easy for dry etching, is used as the source/drain metal pattern, the first and second contact holes 31, 36 penetrate through the source/drain metal layer to the semiconductor pattern 26 underneath. The third, fourth, sixth and eighth contact holes 44, 54, 64, 74 penetrate from the organic insulating film 86 to the gate insulating film 82 to respectively expose the gate pad lower electrode 42, the data pad lower electrode 52, the data link 58 and the first common line 32.

FIGS. 7A through 7E are a plane view and sectional diagrams illustrating an exemplary fourth mask process in the fabricating method of the thin film transistor substrate according to the present invention.

Using the fourth mask process, a transparent conductive pattern is formed, including the pixel electrode 38, the gate pad upper electrode 46, the data pad upper electrode 56, the first and second contact electrodes 60, 70 on the organic insulating film 86.

The transparent conductive layer is formed on the organic insulating film 86 by a deposition method such as sputtering. The transparent conductive material may include ITO, TO, or IZO. Subsequently, the transparent conductive layer is patterned by the photolithography using the fourth mask and an etching process, thereby forming the transparent conductive pattern including the pixel electrode 38, the gate pad upper electrode 46, the data pad upper electrode 56 and the first and second contact electrodes 60, 70. The pixel electrode 38 is connected to the drain electrode 30 and the storage upper electrode 34 exposed respectively through each of the first and second contact holes 31 and 36. The gate pad upper electrode 46 and the data pad upper electrode 56 are respectively connected to the gate pad lower electrode 42 and the data pad lower electrode 52 which are respectively exposed through the third and fourth contact holes 44 and 54. The first contact electrode 60 connects the data line 24 and the data link 58, which are respectively exposed through the fifth and sixth contact holes 62 and 64. The second contact electrode 70 connects the second common line 76 and the first common line 32 which are respectively exposed through the seventh and eighth contact holes 72 and 74.

With the thin film transistor substrate formed by the exemplary four mask processes, an alignment film (not shown) for aligning the liquid crystal is spread in a picture display part. Subsequently, a sealant 90 for bonding with the upper plate is formed to enclose the liquid crystal area which is filled with the liquid crystal. In order to reinforce the adhesive strength of the sealant 90, the contact area between the sealant 90 and the organic insulating film 86 is diminished, and the wiring should be prevented from being exposed in order to prevent corrosion. By taking these conditions into consideration, the vertical structures of the seal area which can be applied are as follows.

Figure 8:
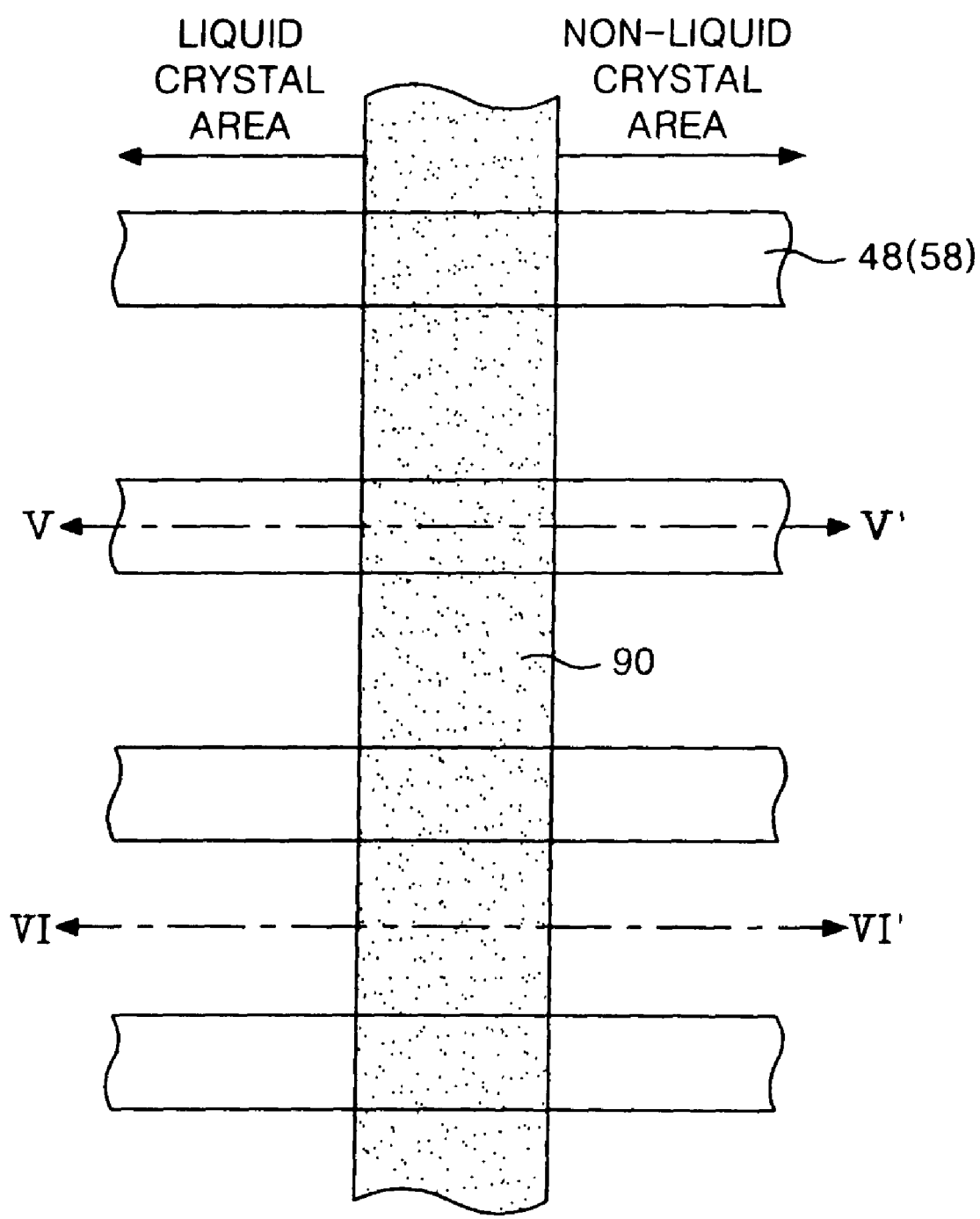
FIG. 8 is a plane view illustrating an enlarged part of a sealing area in the thin film transistor substrate shown in FIG. 2.
Figure 9A:
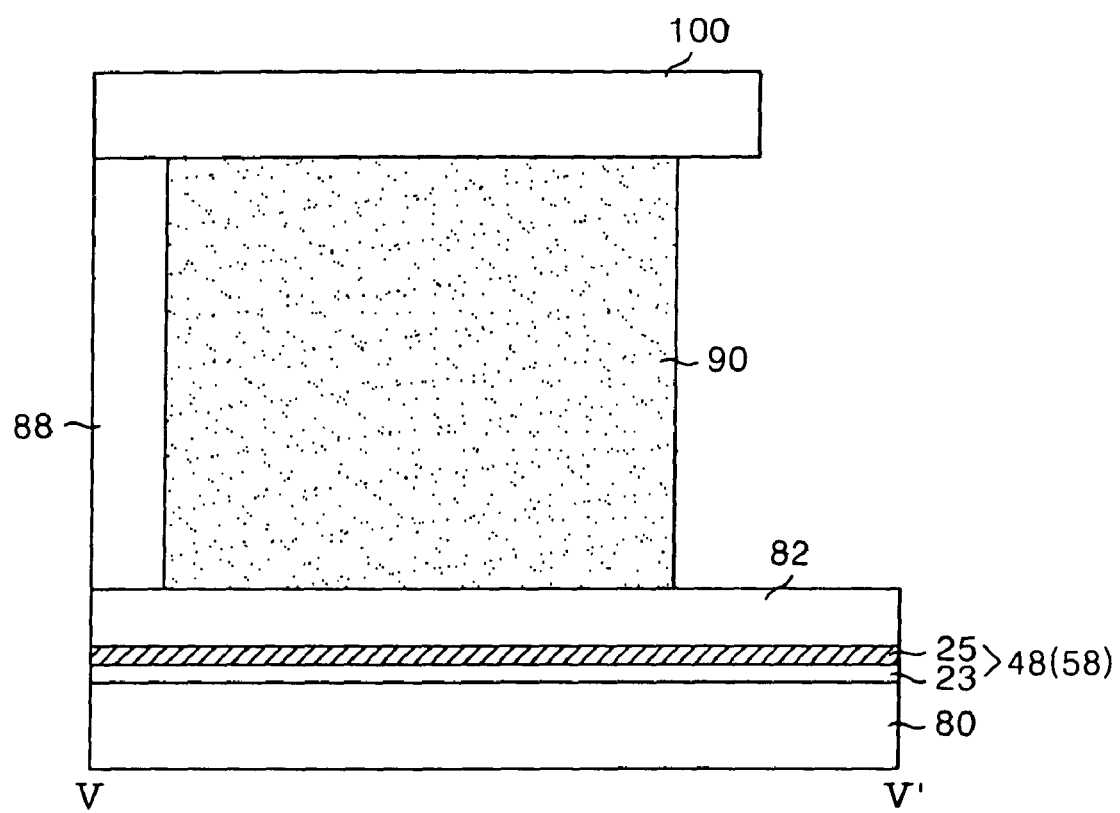
FIGS. 9A to 9C are sectional diagrams illustrating three embodiments which can be applied as a vertical structure of a wiring part that crosses a sealant shown in FIG. 8.
Figure 9B:
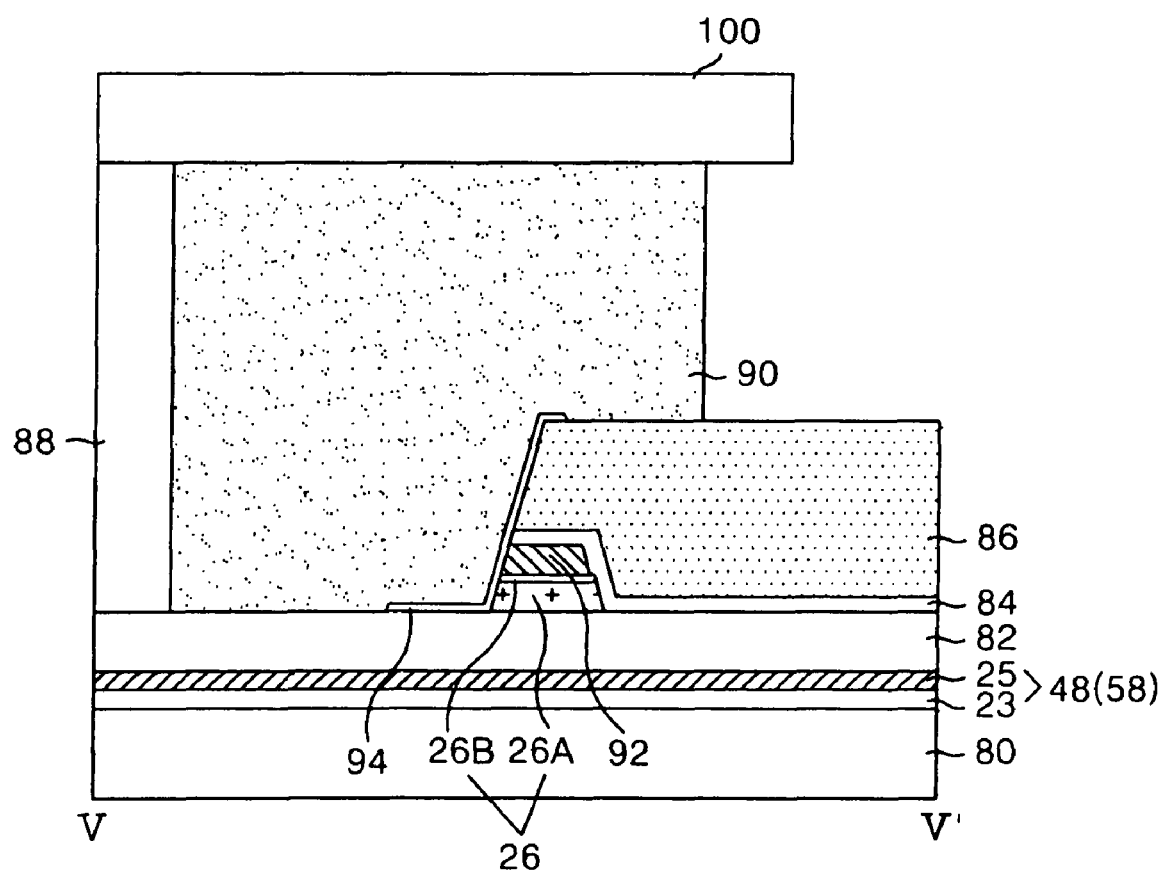
Figure 9C:
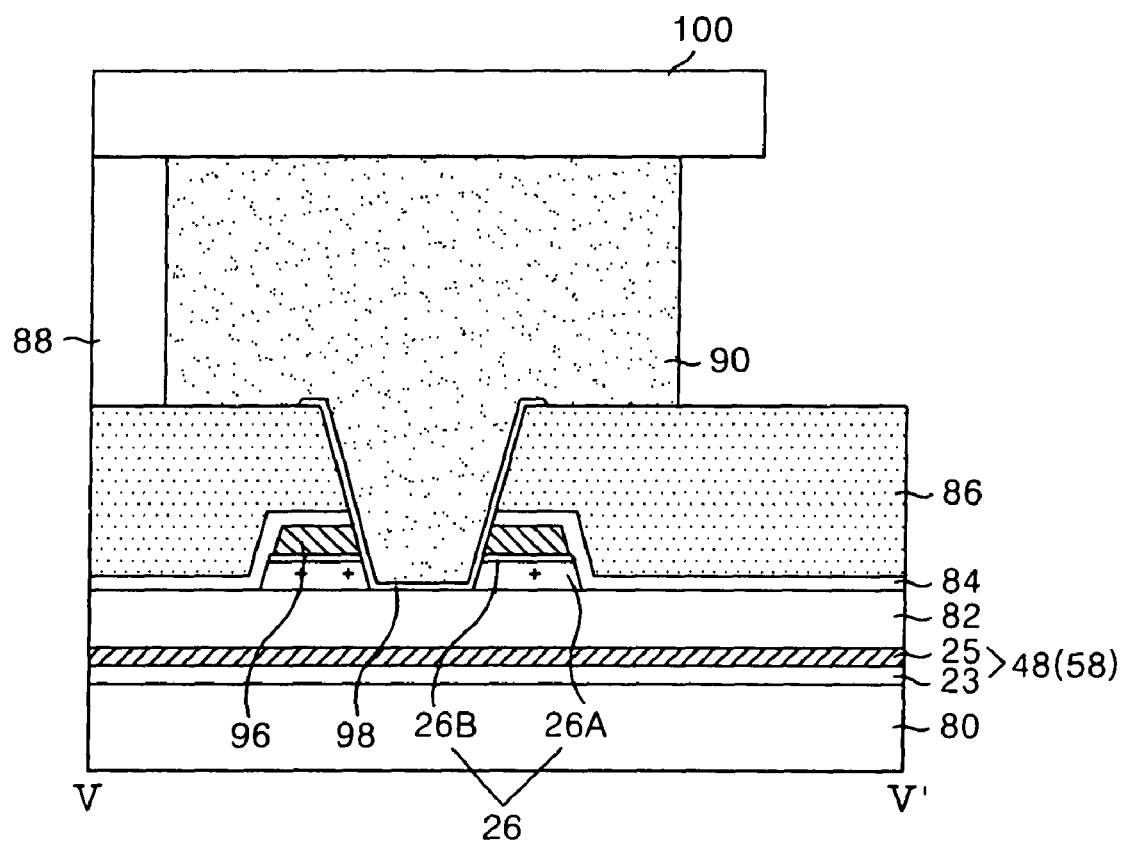

FIG. 8 is a plane view illustrating an enlarged part of a sealing area in the thin film transistor substrate according to an exemplary embodiment of the present invention. FIGS. 9A to 9C are sectional diagrams illustrating three exemplary embodiments that can be applied as a vertical structure of a wiring upper part along the line V-V' in the seal area shown in FIG. 8. FIGS. 10A to 10D are sectional diagrams illustrating four embodiments which can be applied as a vertical structure of an area between wirings along the line VI-VI'. FIGS. 9A to 10D further illustrate the upper plate 100, which is bonded with the thin film transistor substrate by the sealant 90.

The sealant 90 illustrates in FIG. 8 is formed to cross the wiring, like the gate link 48 or the data link 58 of the thin film transistor substrate, to make the thin film transistor substrate bonded with the upper plate. The liquid crystal is filled into the cell gap between the bonded thin film transistor substrate and the upper plate, and the liquid crystal area is sealed by the sealant 90.

FIG. 9A illustrates a first wiring upper structure; FIG. 9B illustrates a second wiring upper structure; and FIG. 9C illustrates a third wiring upper structure which can be applied as an upper structure of the wiring such as the gate link 48, the data link 58 and the common link in the seal area where the sealant 90 is formed. Referring to FIG. 9A, the first wiring upper structure has the sealant 90 in contact with the gate insulating film 82 without the organic insulating film. Referring to FIG. 9B, the second wiring upper structure has the sealant 90 in contact with the part of the organic insulating film 86 extended from a cell outer part (non liquid crystal area). Referring to FIG. 9C, the third wiring upper structure has the sealant 90 in contact with the part of the organic insulating film 86 which is extended from the cell inner part (the liquid crystal area) and the cell outer part.

In the first wiring upper structure illustrated in FIG. 9A, the organic insulating film of the thin film transistor substrate is patterned for the sealant 90 to be in contact only with the gate insulating film 82. The organic insulating film 86 and the buffer insulating film 84 underneath it are patterned, and the part where the gate insulating film 82 is exposed is extended to the cell inner and outer parts around the sealant 90. Accordingly, the sealant 90 is not in contact with the organic insulating film, so that the adhesive strength is improved and it is possible to prevent the contamination of the liquid crystal 88 caused by the reaction of the sealant 90 and the organic insulating film. Further, wiring such as the gate link 48 and the data link 58 is protected by the gate insulating film 82.

In the second wiring upper structure illustrated in FIG. 9B, the organic insulating film 86 is patterned so that the organic insulating film 86, which is extended from the cell outer part, overlaps part of the sealant 90, and the other part of the sealant 90 which is adjacent to the cell inner part overlaps the gate insulating film 82. Herein, the organic insulating film 86 and the buffer insulating film 84 thereunder are removed so that the part which is exposed to the gate insulating film 82 is extended to the cell inner part around the seal area. A dummy pattern 92 that acts as an etch stopper is used in order to remove the organic insulating film 86 so that the gate insulating film 82 is exposed. Accordingly, part of the dummy pattern 92 that overlaps the organic insulating film 86 remaining behind in the seal area is left behind. Further, if the source/drain metal layer is used as the dummy pattern 92, the semiconductor pattern 26 remains underneath according to the process, and a dummy protective pattern 94 formed in a transparent conductive layer after the organic insulating film 86 is formed is provided to protect the dummy pattern 92. Accordingly, the contact area of the sealant 90 and the organic insulating film 86 decreases, thereby improving the adhesive strength of the sealant 90. Further, the contamination of the liquid crystal 88 caused by the reaction of the sealant 90 and the organic insulating film 86 can be prevented because the organic insulating film 86 does not exist at an interface where the liquid crystal is in contact with the sealant 90. Additionally, wiring such as the gate link 48, data link 58 and the common link is protected by the gate insulating film 82' the buffer insulating film 84, and the organic insulating film 86, which are patterned over the wiring.

In the third wiring upper structure illustrated in FIG. 9C, the organic insulating film 86 is patterned so that part of the organic insulating film 86, which is extended from the cell outer and inner parts, overlaps the sealant 90. And, part of a dummy pattern 96 overlapping the organic insulating film 86 which remains behind at both sides of the seal area remains together with the semiconductor pattern 26 underneath, and a dummy protective pattern 98 is formed to protect the dummy pattern 96 of both sides. Accordingly, the contact area of the sealant 90 and the organic insulating film 86 decreases, which improves the adhesive strength of the sealant 90. Also, the gate insulating film 82' and the buffer insulating film 84, and the organic insulating film 86 protect the wiring, such as the gate link 48 and the data link 58. Further, the organic insulating film 86 exists at the interface where the sealant 90 is in contact with the liquid crystal 88. However, if a sealant 90 and an organic insulating film 86 that do not generate a reactant are used, the contamination of the liquid crystal 88 caused by the reactant can be prevented.

Figure 10A:
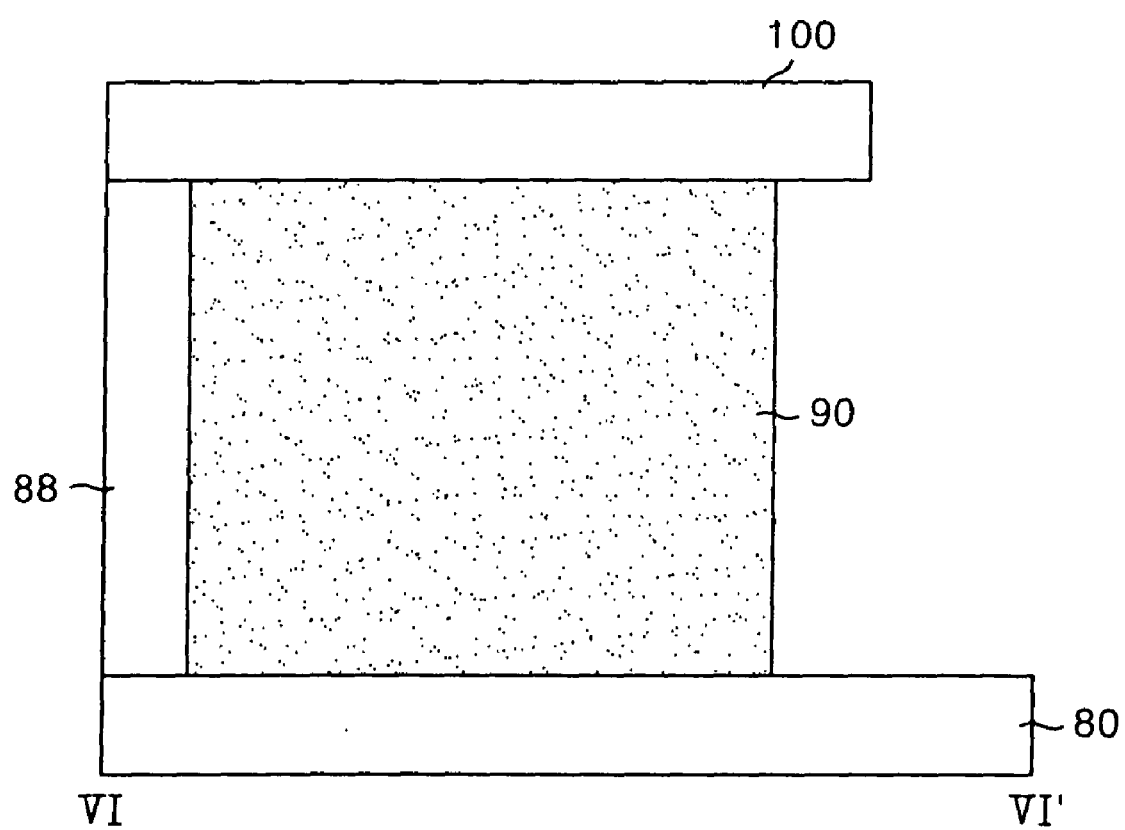
FIGS. 10A to 10D are sectional diagrams illustrating four embodiments which can be applied as a vertical structure of an area between wirings that cross a sealant shown in FIG. 8.
Figure 10B:
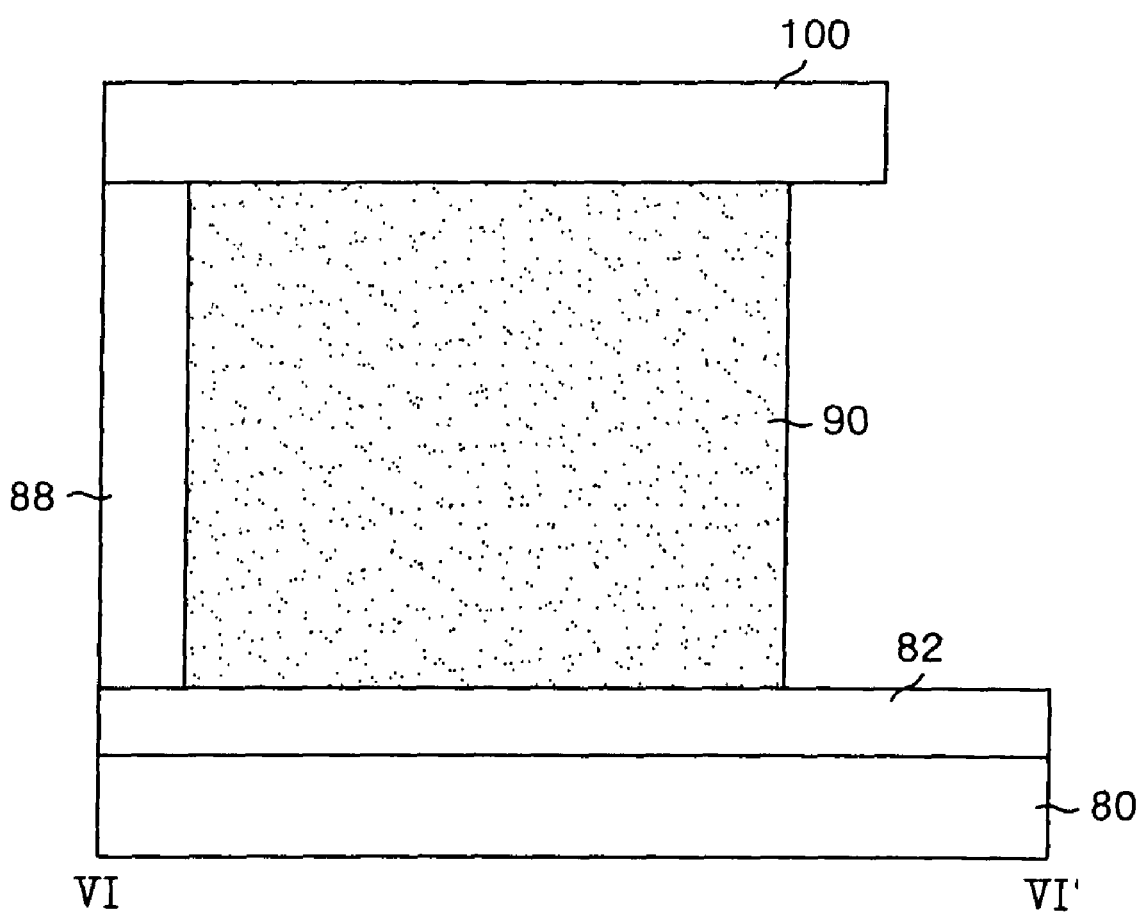
Figure 10C:
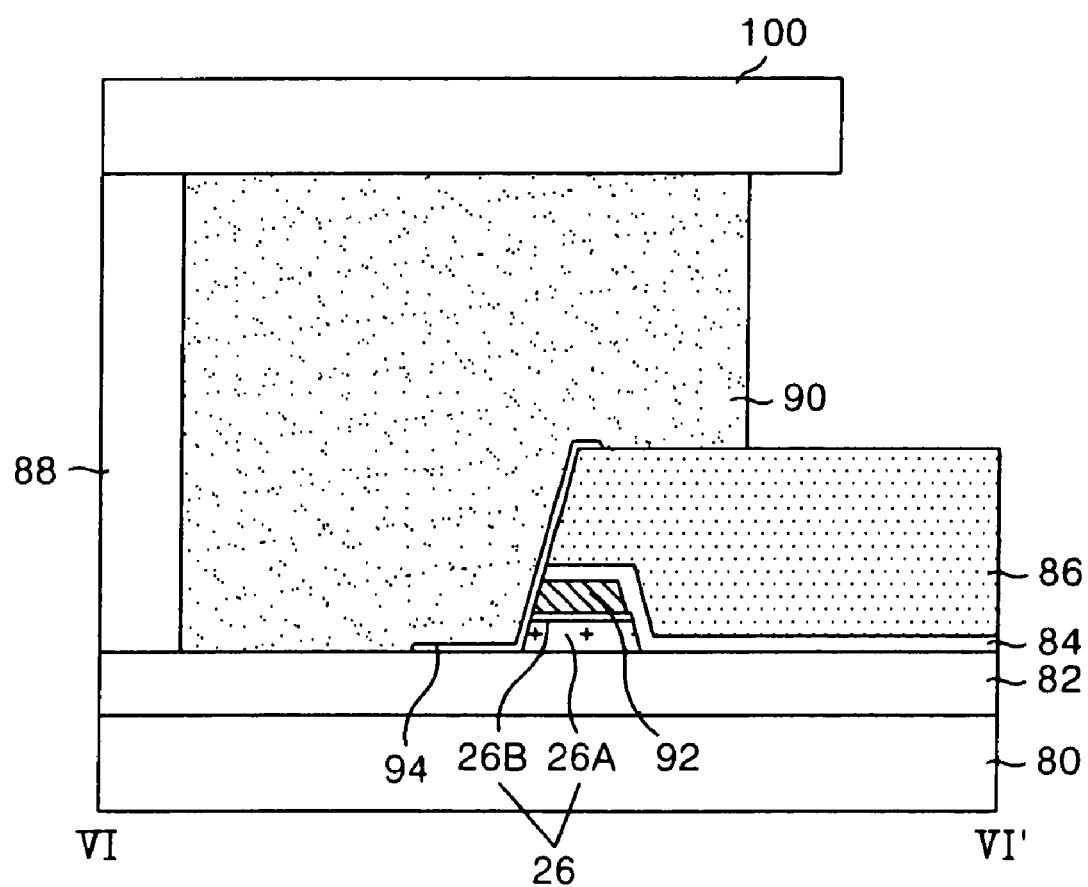
Figure 10D:
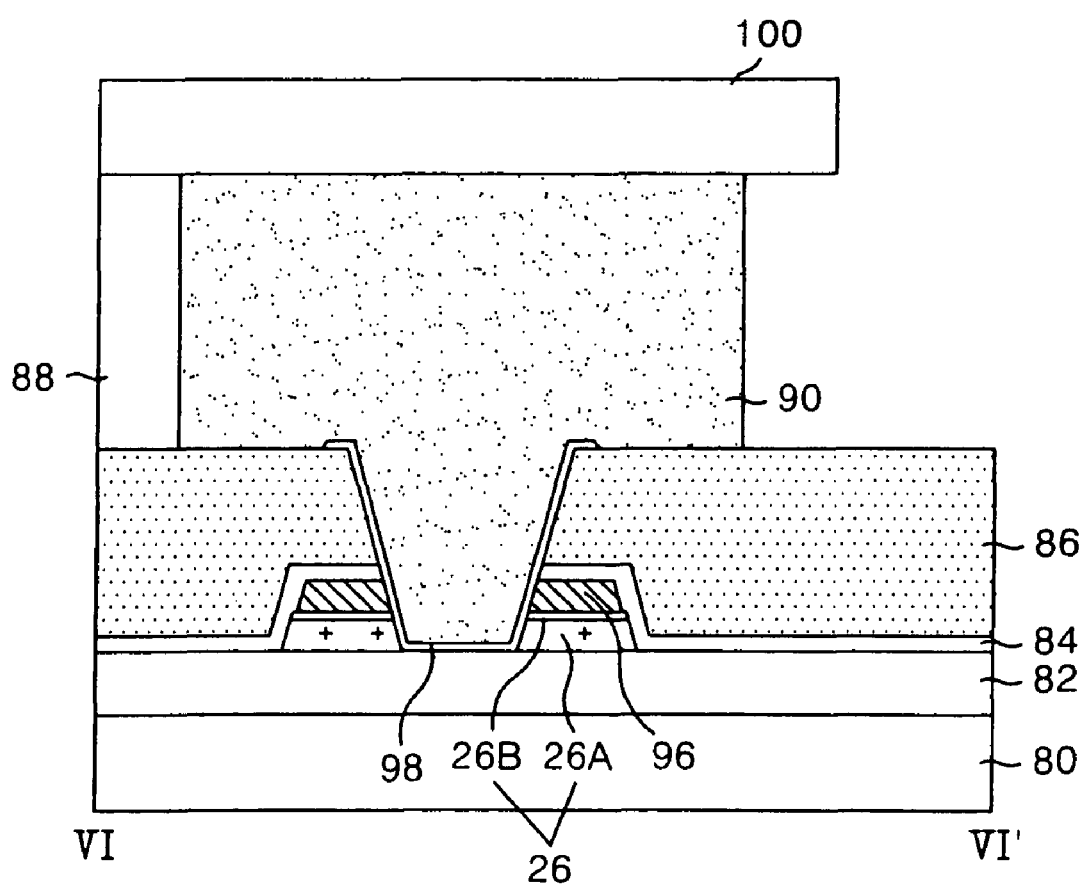

FIG. 10A illustrates a first wiring gap structure which; FIG. 10B, illustrates a second wiring gap structure; FIG. 10C illustrates a third wiring gap structure; FIG. 10D illustrates and a fourth wiring gap structure can be applied as a wiring gap structure in the seal area where the sealant 90 is printed. Referring to FIG. 10A, the first wiring gap structure has the sealant 90 in contact with the substrate 80. Referring to FIG. 10B, the second wiring gap structure has the sealant 90 in contact with the gate insulating film 82 without the organic insulating film. Referring to FIG. 10C, the third wiring gap structure has the sealant 90 in contact with part of the organic insulating film 86 which is extended from the cell outer part. Referring to FIG. 10D, the fourth wiring gap structure has the sealant 90 in contact with part of the organic insulating film 86 which is extended from the cell inner and outer parts.

In the first wiring gap structure illustrated in FIG. 10A, the organic insulating film is patterned together with the buffer insulating film and the gate insulating film underneath so that the sealant 90 is in contact only with the substrate 80. The part where the substrate 80 is exposed is extended to the cell inner and outer parts around the sealant 90.

In the second wiring gap structure illustrated in FIG. 10B, the organic insulating film and the buffer insulating film underneath are patterned so that the sealant 90 is in contact only with the gate insulating film 82, and the part where the gate insulating film 82 is exposed is extended to the cell inner and outer parts around the sealant 90.

Accordingly, in the first and second wiring gap structure, the sealant 90 is not in contact with the organic insulating film, thus its adhesive strength is improved, and the contamination caused by the reaction of the sealant 90 and the organic insulating film can be prevented.

In the third wiring gap structure illustrated in FIG. 10C, the organic insulating film 86 is patterned so that the organic insulating film 86, which is extended from the cell outer part, overlaps part of the sealant 90 and the other part of the sealant 90 that is adjacent to the cell inner part overlaps the gate insulating film 82. Herein, the organic insulating film and the buffer insulating film 84 underneath are removed so that the part where the gate insulating film 82 is exposed is extended to the cell inner part around the seal area. In the seal area, part of the dummy pattern 92 which overlaps a portion of the remaining organic insulating film 86 is left is disposed over the semiconductor pattern 26. The dummy protective pattern 94 is formed to protect the dummy pattern 92 of both sides. Accordingly, the contact area of the sealant 90 and the organic insulating film 86 decreases to improve the adhesive strength, and the contamination of the liquid crystal 88 caused by the reaction of the sealant 90 and the organic insulating film 86 can be prevented because the organic insulating film 86 do not exist at the interface where the sealant 90 is in contact with the liquid crystal 88.

In the fourth wiring gap structure illustrated in FIG. 10D, the organic insulating film 86 is patterned so that part of the organic insulating film 86, which extends from the cell outer and inner parts, overlaps the sealant 90. And, part of the dummy pattern 96 which overlaps the remaining organic insulating film 86 is left together with the semiconductor pattern 26 thereunder at both sides of the seal area, and the dummy protective pattern 98 is formed to protect the dummy pattern 96 of both sides. Accordingly, the contact area of the sealant 90 and the organic insulating film 86 decreases to improve the adhesive strength of the sealant 90. in this exemplary embodiment, contamination of the liquid crystal 88 can be prevented by selecting a material for the sealant 90 and the organic insulating film, which do not generate the reactant.

Accordingly, in the thin film transistor substrate according to the present invention, there are twelve possible combinations as the vertical structure of the seal area by combing the first to third wiring upper structures with the first to fourth wiring gap structures. Based on a pressure cooking test and a high humidity operation test on the seal area structures of each of the 12 cases, the first wiring upper structure illustrated in FIG. 9B and the first wiring gap structure shown in FIG. 10A or the second wiring gap structure shown in FIG. 10B may be the most reliable structures. Hereinafter, the two seal area structures where the first wiring upper structure and the first wiring gap structure or the second wiring gap structure are applied are described in detail.

Figure 11:
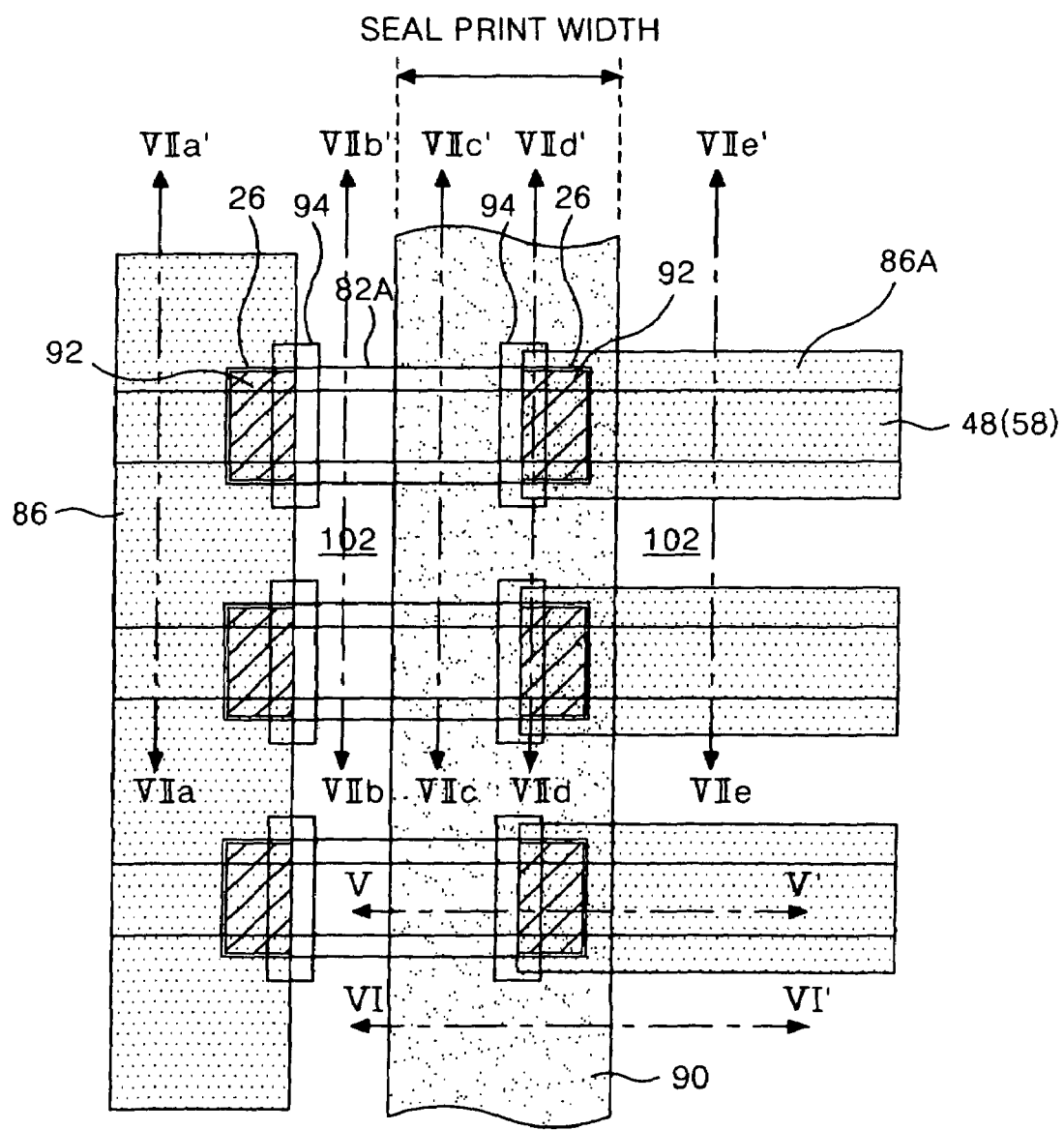
FIG. 11 is a plane view partially illustrating a sealing area according to a first embodiment of the present invention.
Figure 12A:
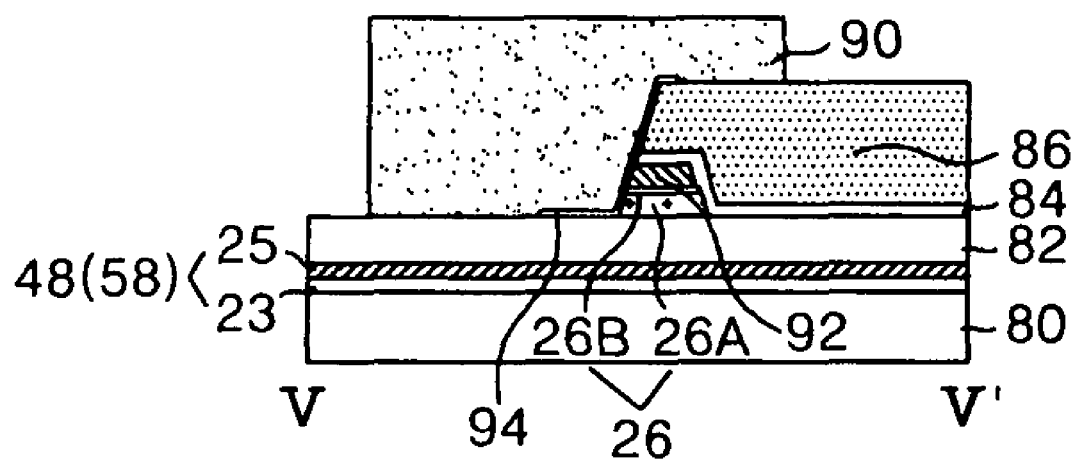
FIGS. 12A through 12G are sectional diagrams illustrating a sealing area of the thin film transistor substrate shown in FIG. 11, taken along the lines V-V', VI-VI', VIIa-VIIa', VIIb-VIIb', VIIc-VIIc', VIId-VIId', VIIe-VIIe'.
Figure 12B:
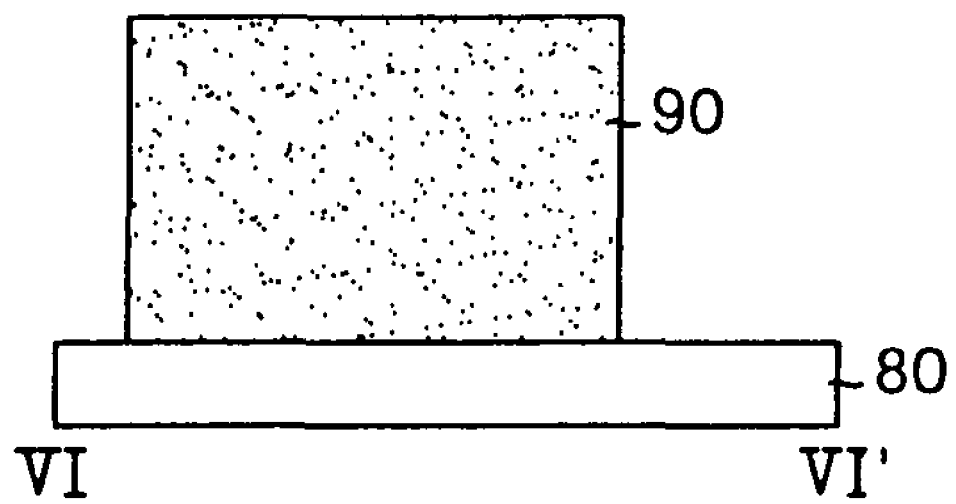
Figure 12C:
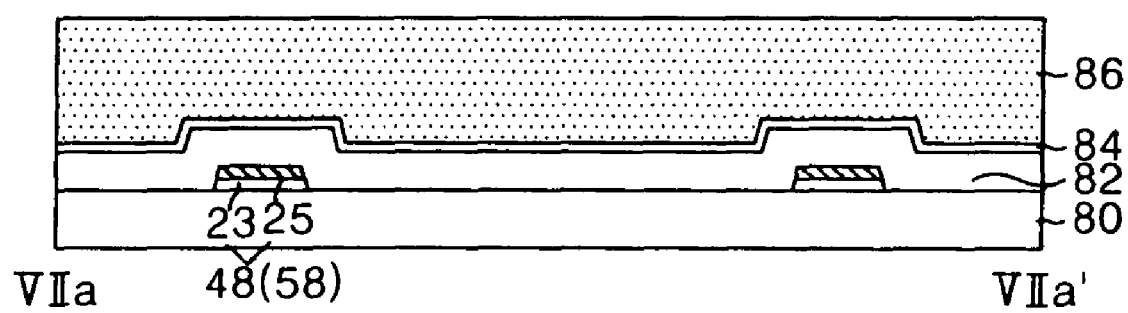
Figure 12D:
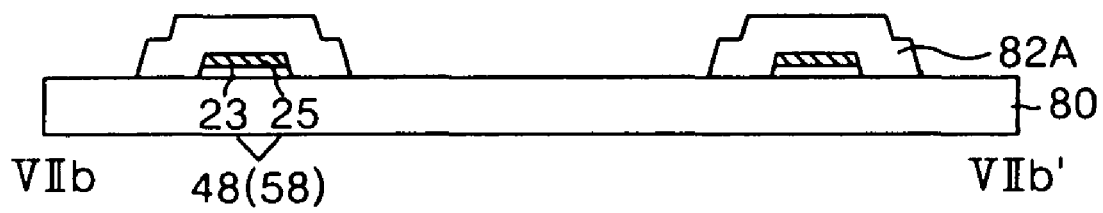
Figure 12E:
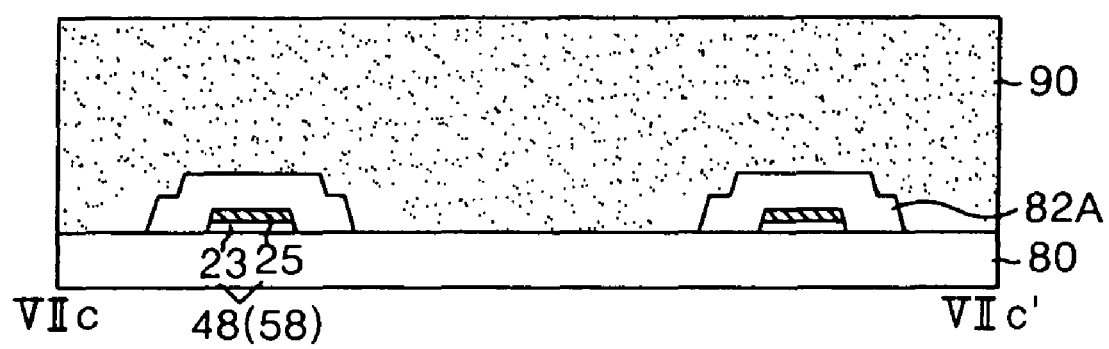

FIG. 11 is an enlarged plane view partially illustrating a sealing area of a thin film transistor substrate according to a first embodiment of the present invention, and FIGS. 12A-12G are sectional diagrams illustrating a sealing area and a surrounding part thereof shown in FIG. 11, respectively taken along the lines V-V', VI-VI', VIIa-VIIa', VIIb-VIIb', VIIc-VIIc', VIId-VIId', VIIe-VIIe';

The foregoing first wiring structure and wiring gap structure are applied to the seal area illustrated in FIGS. 11 and 12A-12G. Sectional view V-V' in FIG. 12A and sectional view VI-VI' in FIG. 12B illustrate a wiring part vertical structure and a wiring gap vertical structure taken in a wiring direction. Referring to FIGS. 12C-12G, sectional view VIIa-VIIa', VIIc-VIIc', VIId-VIId' and VIIe-VIIe' respectively illustrate a cell inner part where the organic insulating film 86 exists; the cell inner part where the organic insulating film 86 is removed; the seal area where the organic insulating film 86 exists; and the vertical structure of the cell inner part, which are cut off along the sealant's 90 forming direction.

The sealant 90 in FIGS. 11 and 12A-12G is formed to cross the wiring such as the gate link 48, the data link 58, and the common link, which are formed on the thin film transistor substrate.

On the inner cell part of the thin film transistor substrate, where the liquid crystal is to be formed, there is formed an insulating film including the gate insulating film 82, the buffer insulating film 84 and the organic insulating film, 86 which are deposited to commonly cover the wiring as illustrated in the VIIa-VIIa' section. The edge part of the insulating films is separated from the sealant so that the insulating films of the cell inner part does not overlap the sealant 90.

Figure 12F:
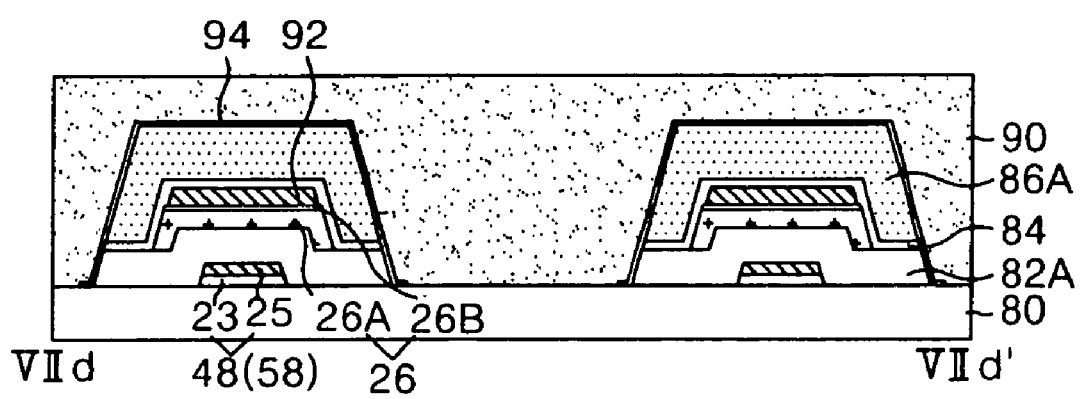
Figure 12G:
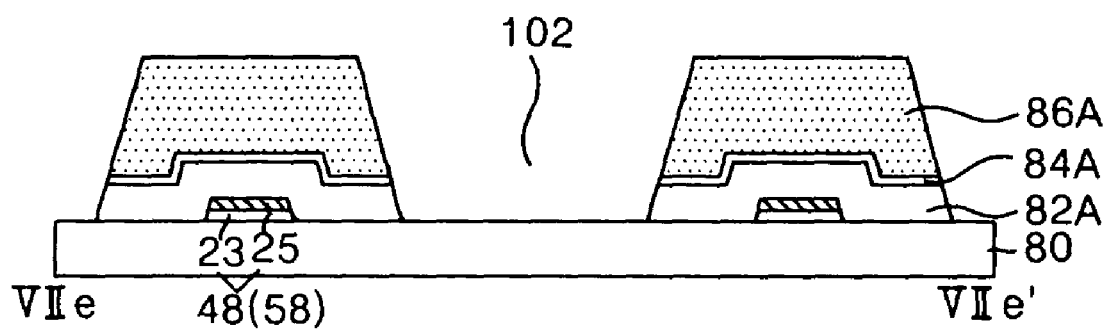
Figure 13A:
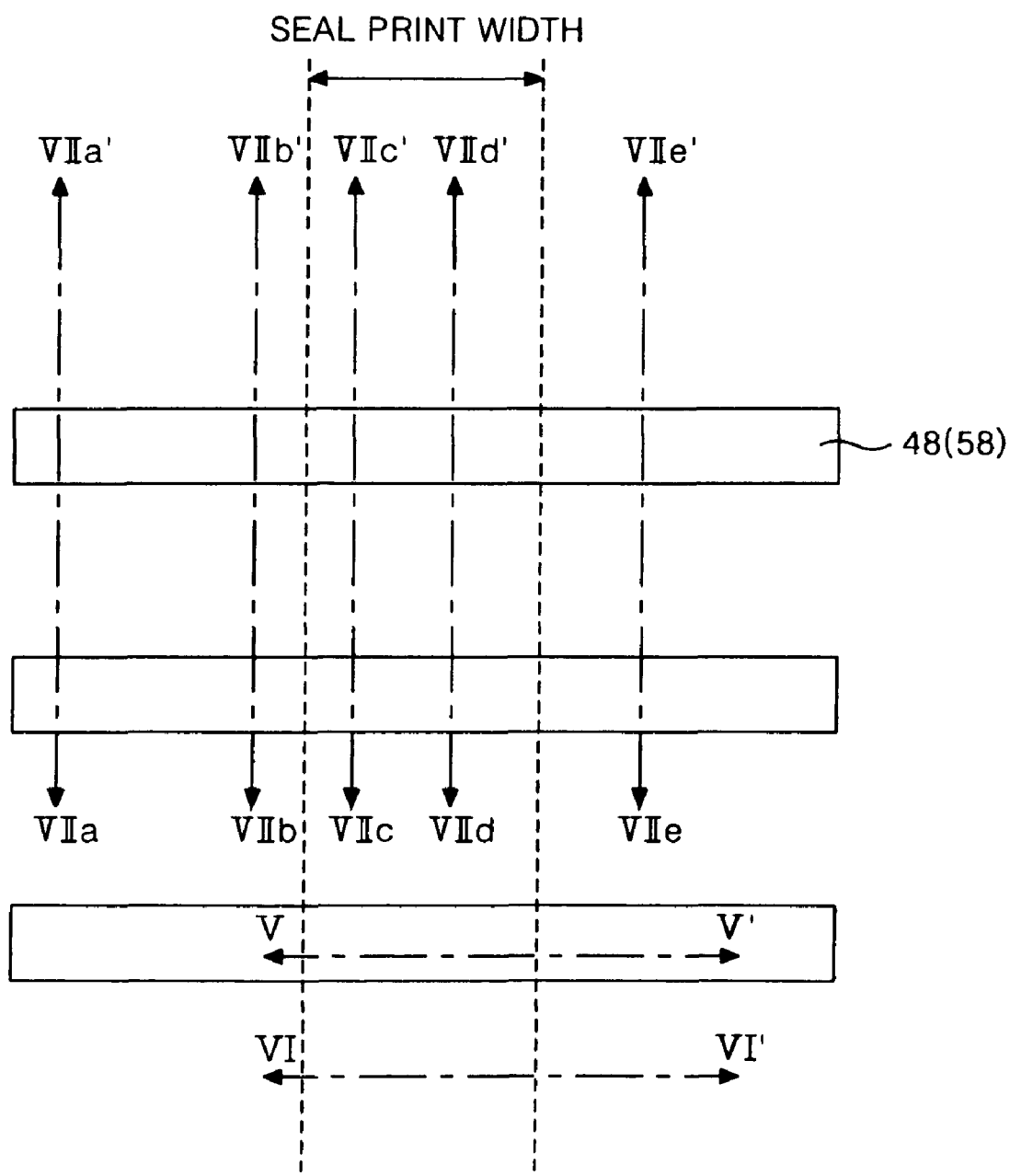
FIGS. 13A through 13H are a plain view and a sectional diagram to explain a first mask process in a fabricating method of the thin film transistor substrate shown in FIGS. 11 and 12.
Figure 13B:
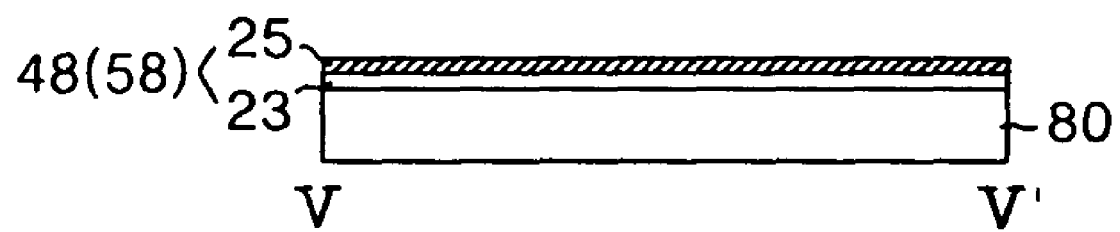
Figure 13C:
Figure 13D:
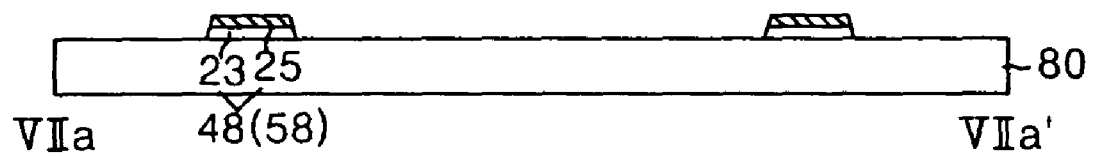
Figure 13E:
Figure 13F:
Figure 13G:
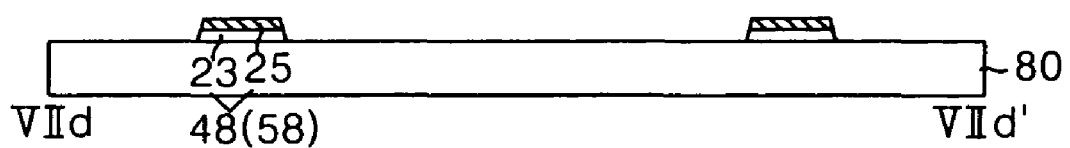
Figure 13H:
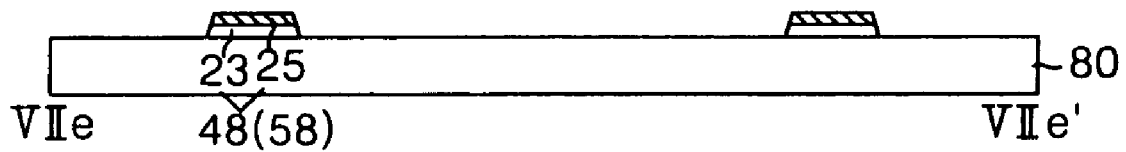
Figure 14A:
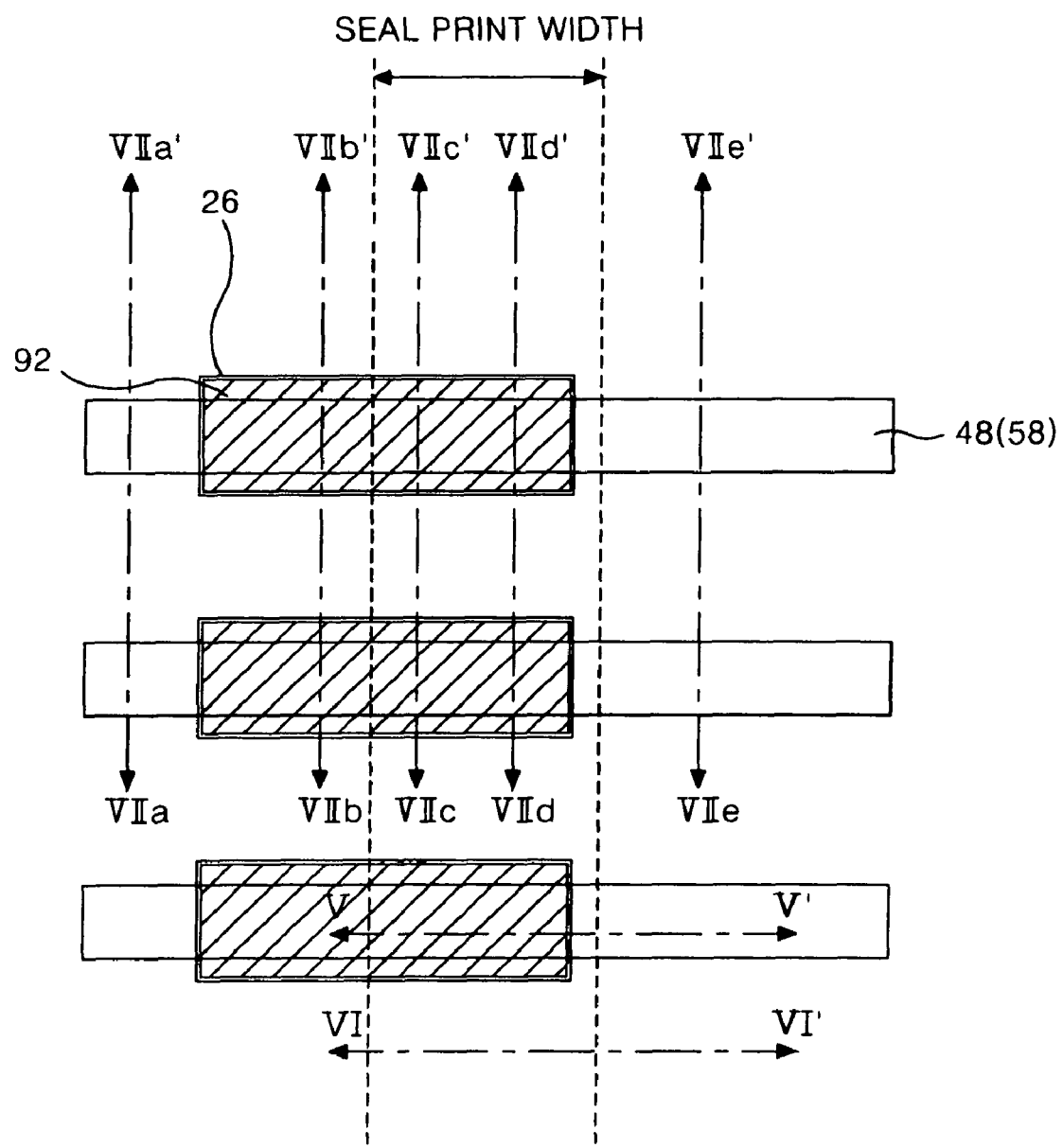
FIGS. 14A through 14H are a plane view and a sectional diagram to explain a second mask process in the fabricating method of the thin film transistor substrate shown in FIGS. 11 and 12.
Figure 14B:
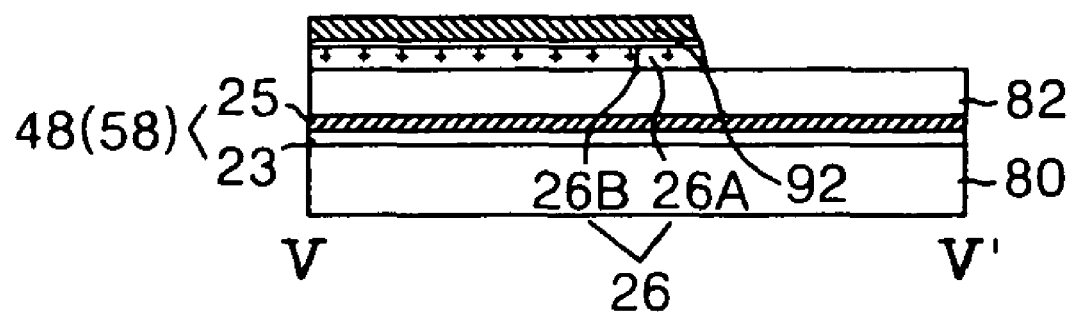
Figure 14C:
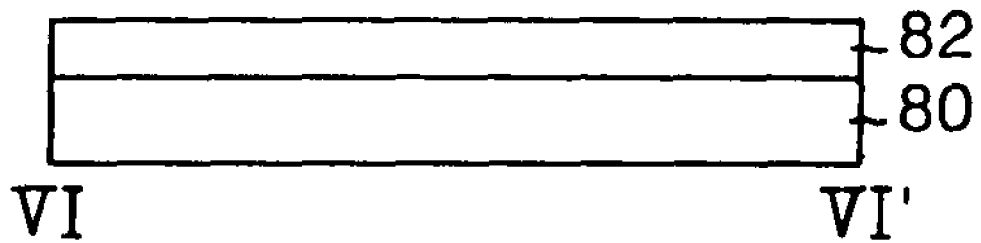
Figure 14D:
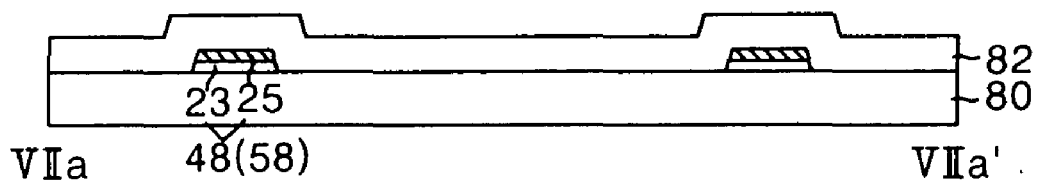
Figure 14E:
Figure 14F:
Figure 14G:
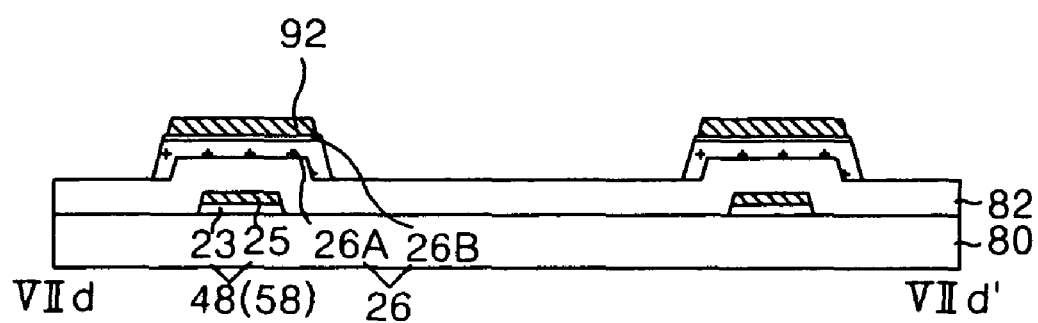
Figure 14H:
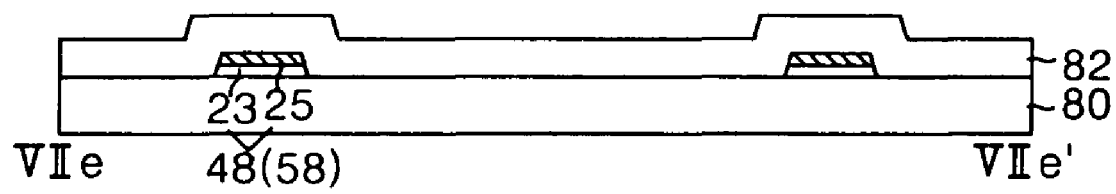
Figure 15A:
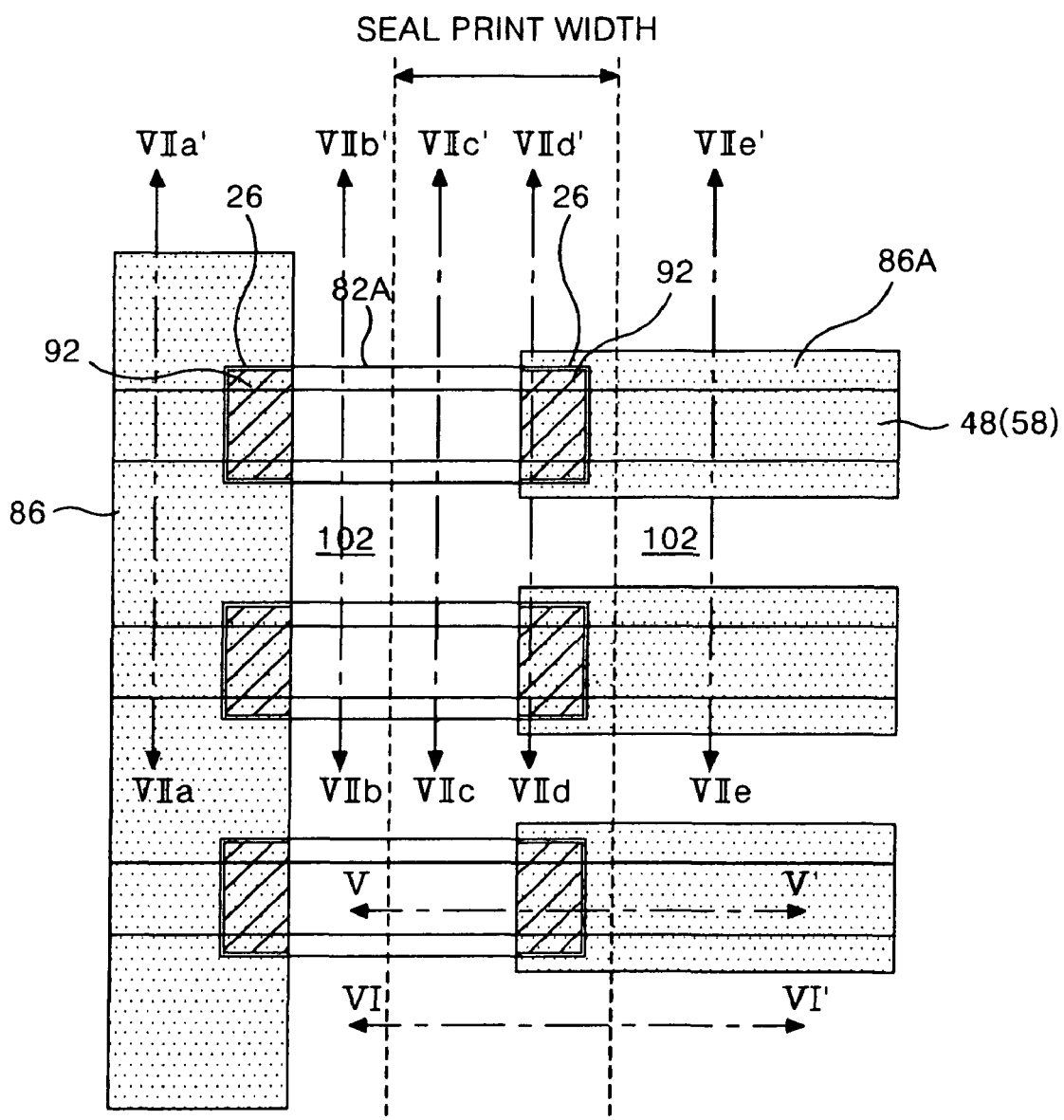
FIGS. 15A through 15H are a plane view and a sectional diagram to explain a third mask process in the fabricating method of the thin film transistor substrate shown in FIGS. 11 and 12.
Figure 15B:
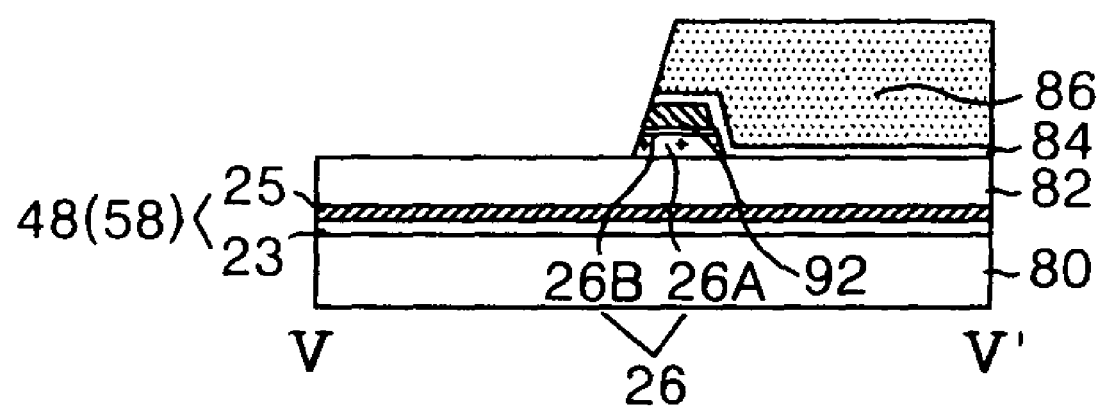
Figure 15C:
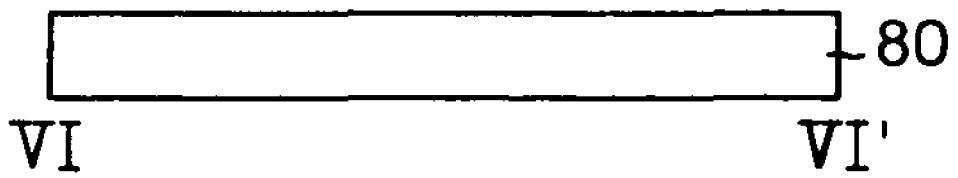
Figure 15D:
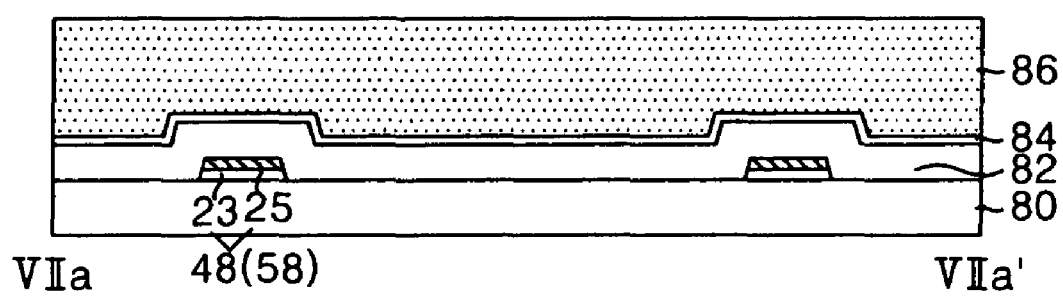
Figure 15E:
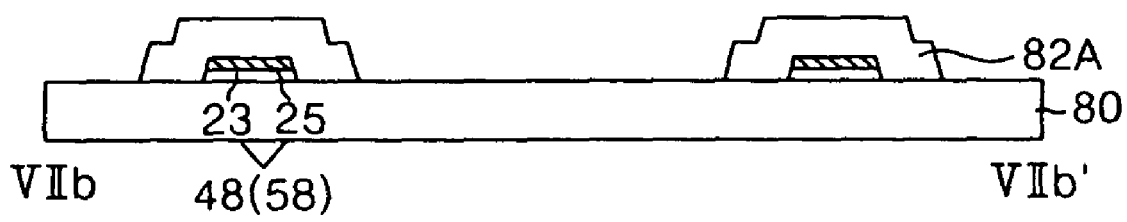
Figure 15F:
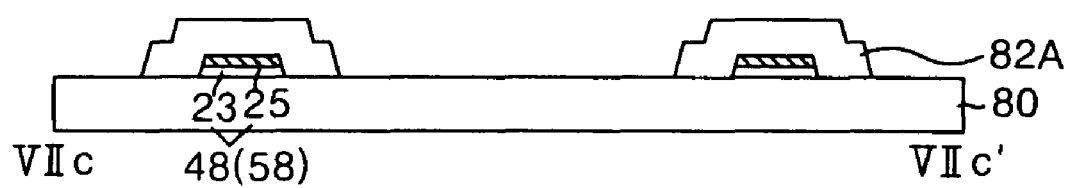
Figure 15G:
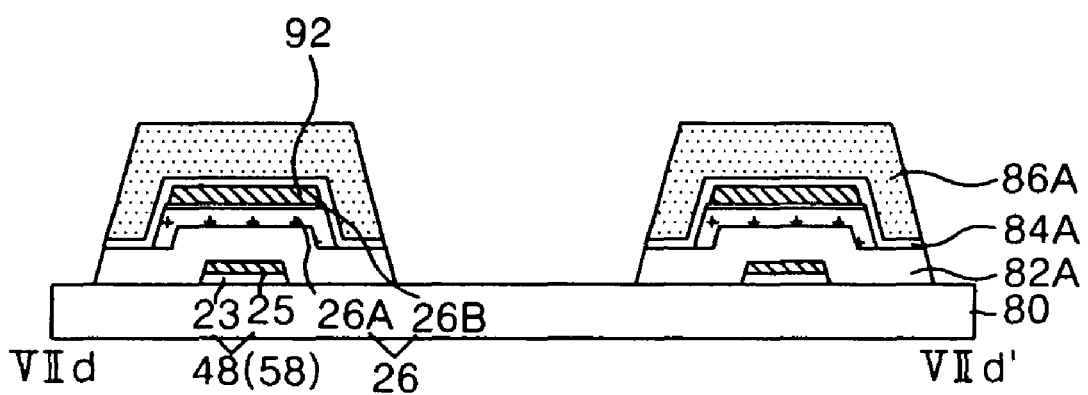
Figure 15H:
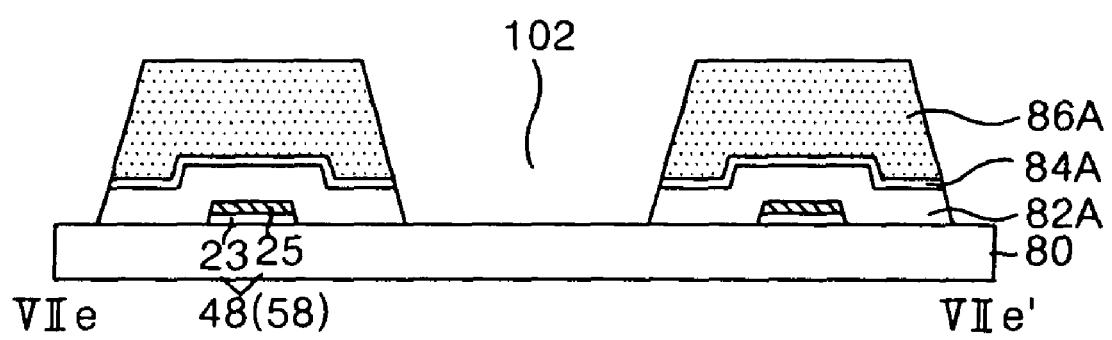
Figure 16A:
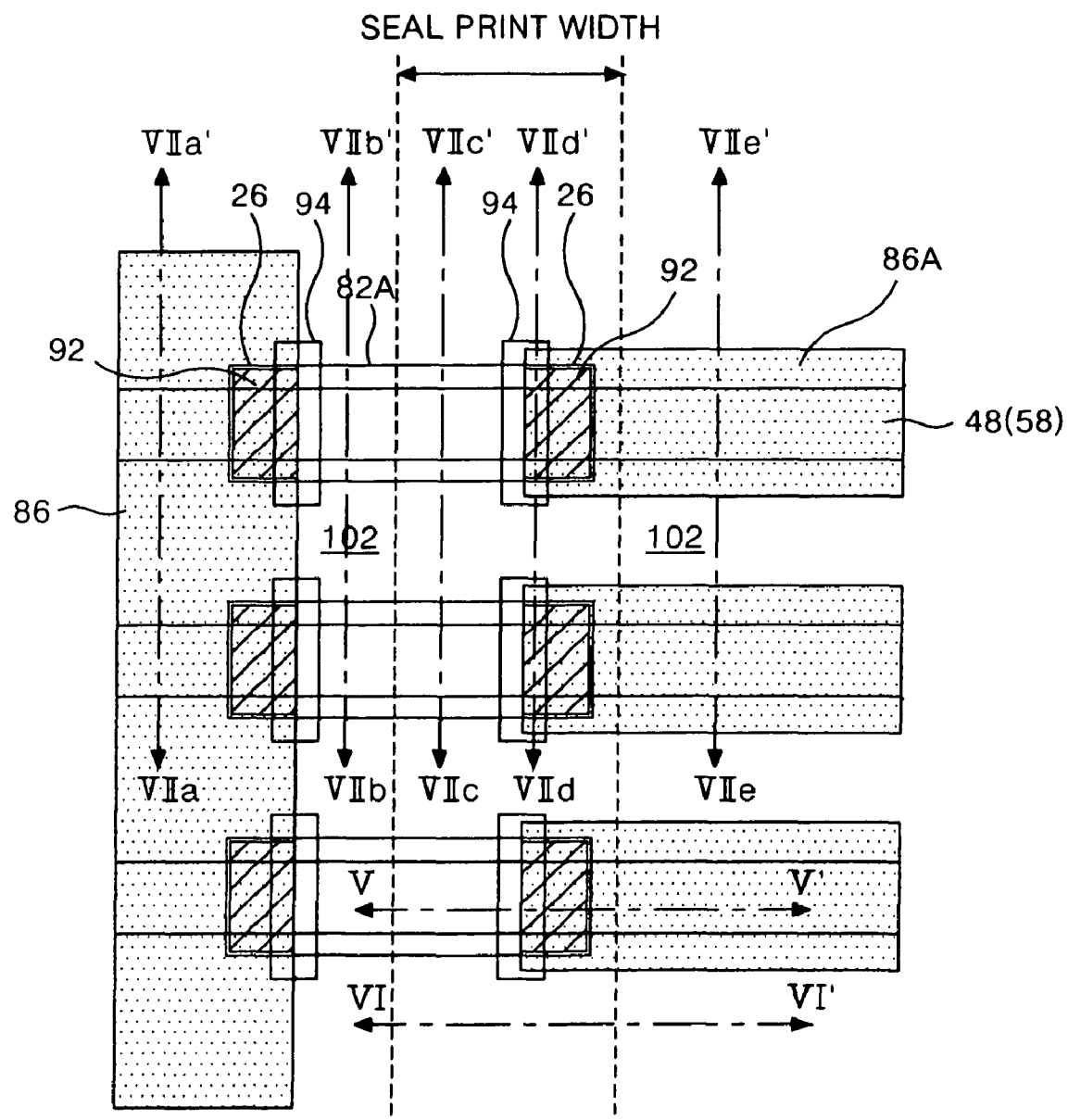
FIGS. 16A through 16H are a plane view and a sectional diagram to explain a fourth mask process in the fabricating method of the thin film transistor substrate shown in FIGS. 11 and 12.
Figure 16B:
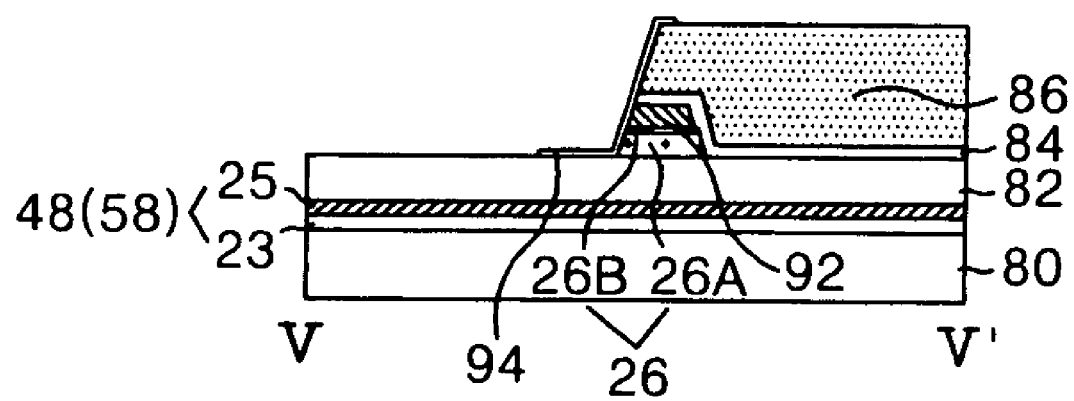
Figure 16C:
Figure 16D:
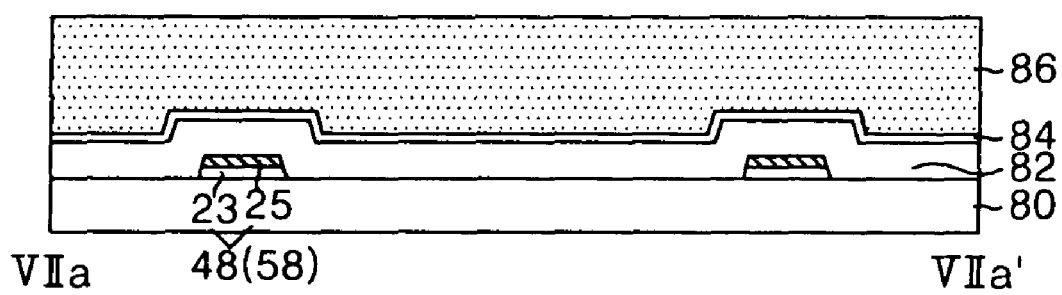
Figure 16E:
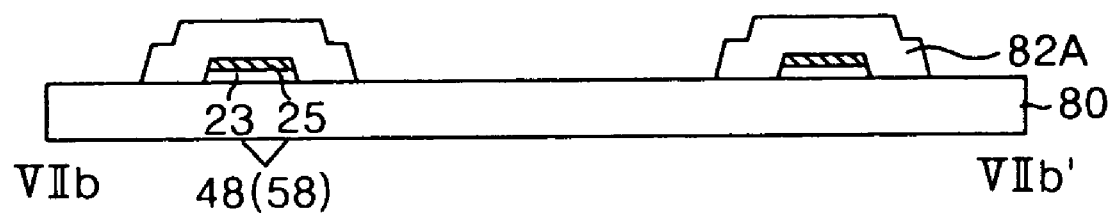
Figure 16F:
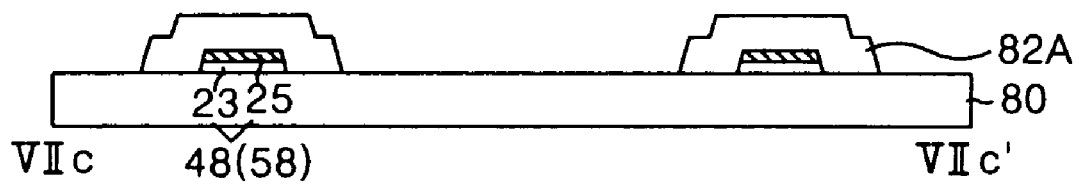
Figure 16G:
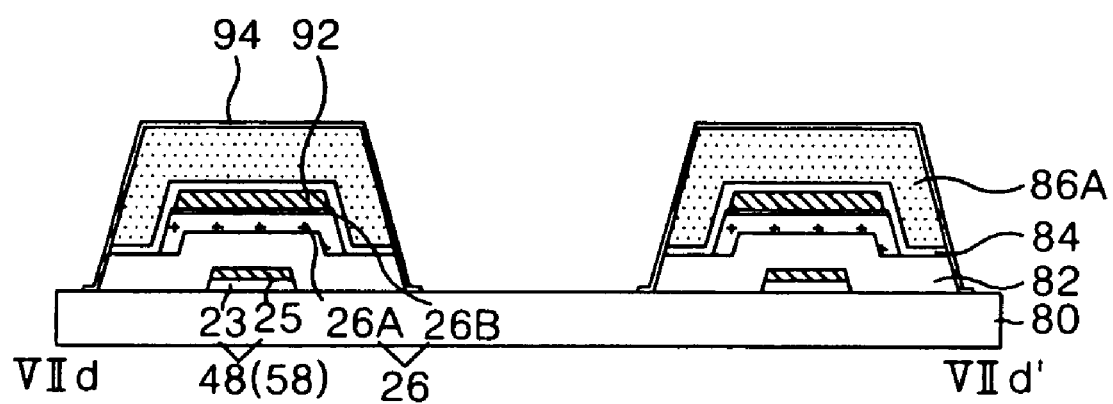
Figure 16H:
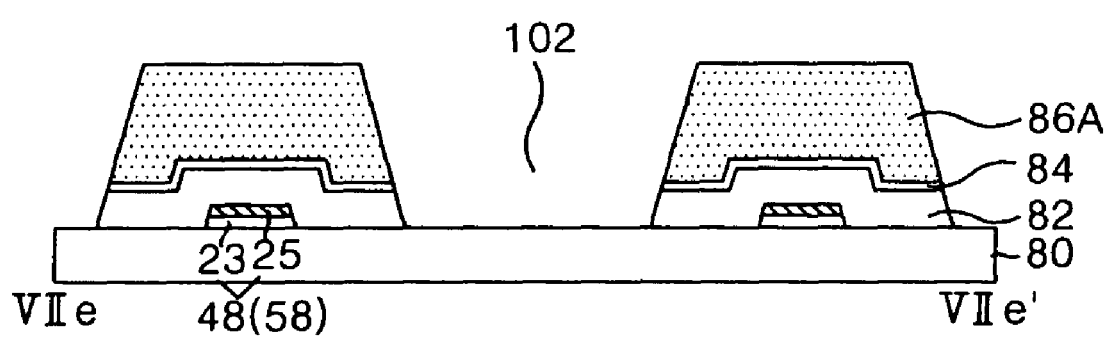

Referring to FIG. 12G on the outer cell part of the thin film transistor substrate, there is formed an insulating pattern including a line type gate insulating pattern 82A, a buffer insulating pattern 84A and an organic insulating pattern 86A which are deposited to independently encompass the wiring as in the VIIe-VIIe' section. Referring to FIG. 12F, the insulating pattern of the cell outer part is extended along the wiring to overlap the part of the sealant 90, thereby protecting the wiring as in the VIId-VIId' section. The gate insulating pattern 82A among these is further extended along the wiring to the edge part of the inner insulating film so as to overlap the other part of the sealant 90, thereby protecting the wiring as in the VIIb-VIIb' section.

The dummy pattern 92 is used as the etch stopper when patterning the insulating film in order to further extend only the gate insulating pattern 82A along the wiring. In the dummy pattern 92, the part overlapping the end of the inner insulating film and the part overlapping the end of the organic insulating pattern 86A which overlaps the sealant 90 remain together with the semiconductor pattern 26 underneath. The dummy pattern 92 has a wider line width than the wiring as illustrated in the VIId-VIId' section.

The dummy protective pattern 94 is further formed to protect the edge part of the semiconductor pattern 26 and the remaining dummy pattern 92. The dummy protective pattern 94 is formed to have a wider line width than the organic insulating pattern 86A, thus it has a shape of covering the insulating pattern, as illustrated in the VIId-VIId' section.

Referring to FIG. 11, all insulating film is removed in the area 102 between the gate insulating patterns 82A, thus it has a structure such that the substrate 80 is exposed, as illustrated in the VIIb-VIIb', VIIc-VIIc', VIId-VIId' and VIIe-VIIe' sections.

Accordingly, the sealant 90 is in contact with the gate insulating pattern 82A which is adjacent to the cell inner part and exposed; the organic insulating pattern 86A, which is adjacent to the cell outer part and exposed; and the dummy protective pattern 94 in the wiring upper part; and it is in contact with the substrate 80 between the wirings. As a result, the adhesive strength is improved, and the reliability is improved in that liquid crystal contamination is prevented, and wiring is protected.

The seal area according to the first embodiment of the present invention having such a structure is formed by an exemplary four mask processes as illustrated in FIGS. 13A to 16H. The four mask processes uses processes substantially similar to the four mask processes described above with reference to FIGS. 4A to 7E.

Referring to FIGS. 13A and 13B-13H, there is formed a wiring of double structure such as the gate link 48, the data link 58, and the common link on the substrate 80 by a first mask process.

Referring to FIGS. 14A and 14B-14H, there are formed the gate insulating film 82 which commonly covers the wirings, and the dummy pattern 92, which act as the etch stopper, to overlap each wiring with the semiconductor pattern 26 underneath. In this case, the dummy pattern 92 and the semiconductor pattern 26 are formed to encompass the wiring along each wiring to the part of the seal area from the cell inner part that is adjacent to the seal area. If the distance between the wirings is not sufficient, the dummy pattern 92 and the semiconductor pattern 26 are formed to encompass the wirings by numbers.

Referring to FIGS. 15A and 15B-15H, the buffer insulating film 84 and the organic insulating film 86 are formed on the gate insulating film 82 by the third exemplary mask process, and then the insulating films from the organic insulating film 86 to the gate insulating film 82 are patterned. Accordingly, the insulating film separated from the seal area is formed in the cell inner part, and an insulating pattern is formed that independently protects each wiring from the part of the seal area to the cell outer part. In this case, the dummy pattern 92, which acts as the etch stopper, is exposed to be removed together with the semiconductor pattern underneath, thus the gate insulating pattern 82A remains in the shape of the dummy pattern 92 at the part where the dummy pattern 92 and the semiconductor pattern 26 are otherwise removed. The gate insulating pattern 82A encompasses each wiring in accordance with the shape of the dummy pattern 92 which encompasses the wirings by numbers. Further, the part of the dummy pattern 92 overlapping the end of the organic insulating pattern 86A and the organic film 86 symmetrically remains together with the semiconductor pattern 26.

After the organic insulating film 86 is formed, the organic insulating film 86 is patterned by a photolithography process using the third mask. Accordingly, the organic insulating film 86 is separated from the seal area so that it is in the cell inner part. And, there is formed an organic insulating pattern 86A, which covers each wiring from the part of the seal area to the cell outer part. By using the patterned organic insulating film 86 and the organic insulating pattern 86A as a mask, the gate insulating film 82 and the buffer insulating film 84 underneath are patterned. Accordingly, the gate insulating film 82 and the buffer insulating film 84 of the cell inner part are separated from the seal area similar to the organic insulating film 86. And, the gate insulating pattern 82A and the buffer insulating pattern 84A are disposed underneath the organic insulating pattern 86A in the seal area and the cell outer part. The dummy pattern 92 and the semiconductor pattern 26 underneath which are exposed between the organic film 86 and the organic insulating pattern 86A are removed by delaying the etch speed, thus the gate insulating pattern 82A encompassing each wiring or the wirings by numbers remains in the shape in the part where the dummy pattern 92 and the semiconductor pattern 26 are otherwise removed. In case that there is a pin hole within the dummy pattern 92 and the semiconductor pattern 26, the pin hole is extended to the gate insulating pattern 82A to expose the wiring so that it can be subsequently corroded when being used in high humidity for a long time. Thus it may be desirable to form the wiring with two or more layers. The part of the dummy pattern 92 overlapping the end of the organic insulating pattern 86A and the organic film 86 symmetrically remains behind together with the semiconductor pattern 26.

Referring to FIGS. 16A and 16B-16H, the dummy protective pattern 94 is formed to protect the edge of the semiconductor pattern 26 and the dummy pattern 92 by the fourth exemplary mask process. The dummy protective pattern 94 is formed of a transparent conductive layer. The dummy protective pattern 94 prevents the dummy pattern 92 and the semiconductor pattern 26 from being etched by the etchant of the transparent conductive layer in the patterning process for forming the contact electrode and the pixel electrode of the cell inner part.

Figure 17:
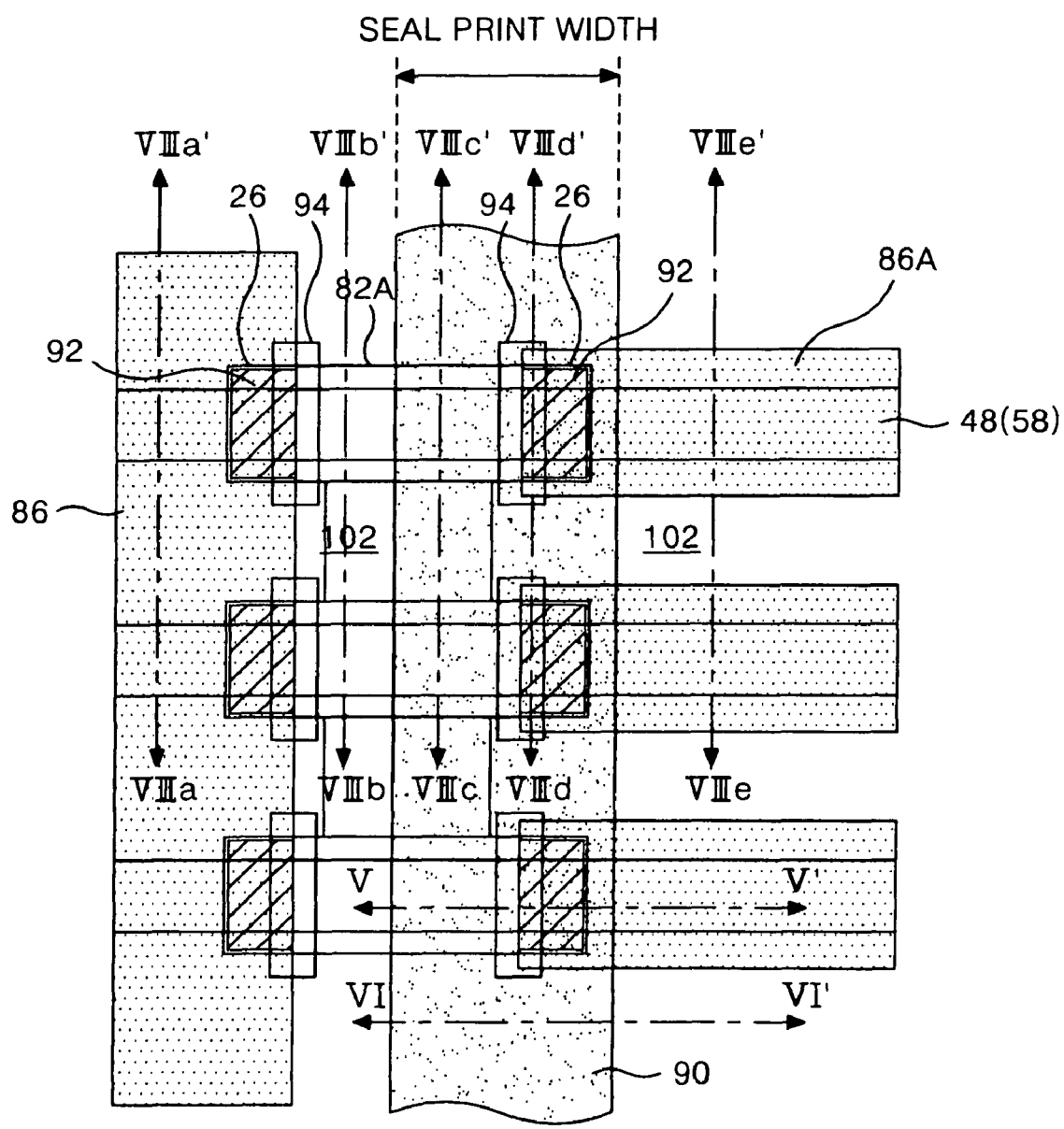
FIG. 17 is a plane view partially illustrating a sealing area according to a second embodiment of the present invention.
Figure 18A:
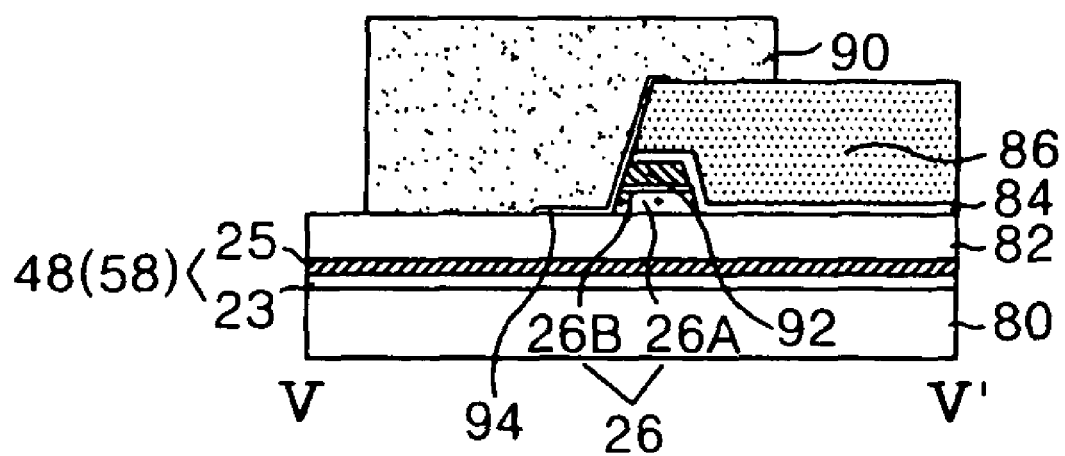
FIGS. 18A through 18G is a sectional diagram illustrating a sealing area of the thin film transistor substrate shown in FIG. 17, taken along the lines V-V', VI-VI', VIIa-VIIa', VIIb-VIIb', VIIc-VIIc', VIId-VIId', VIIe-VIIe'.
Figure 18B:
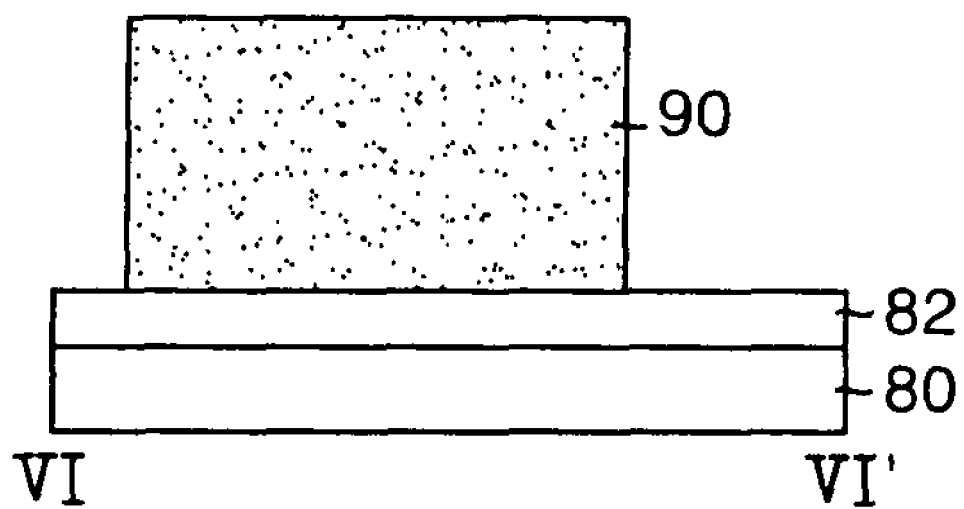
Figure 18C:
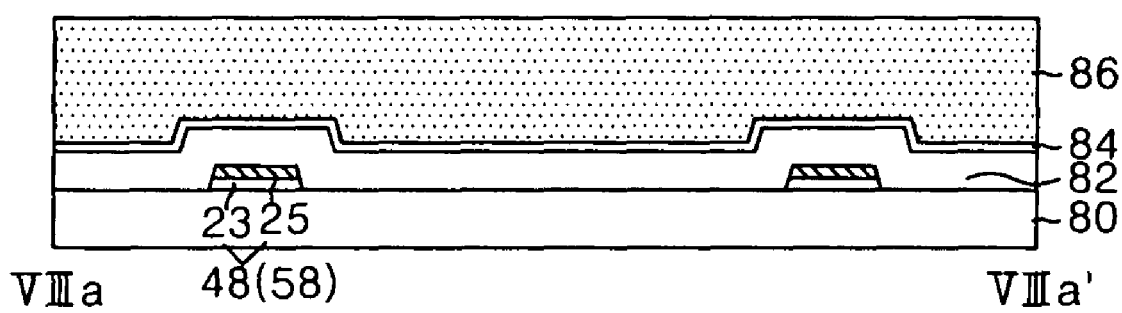
Figure 18D:
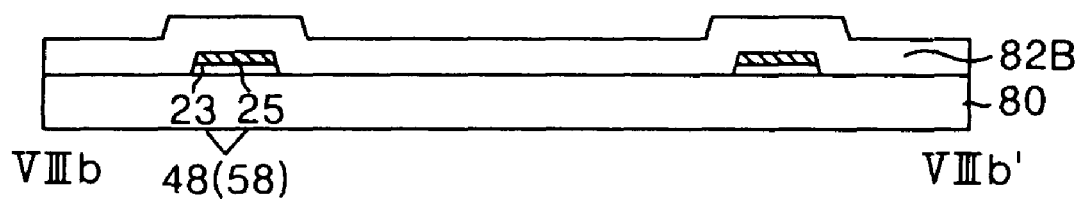
Figure 18E:
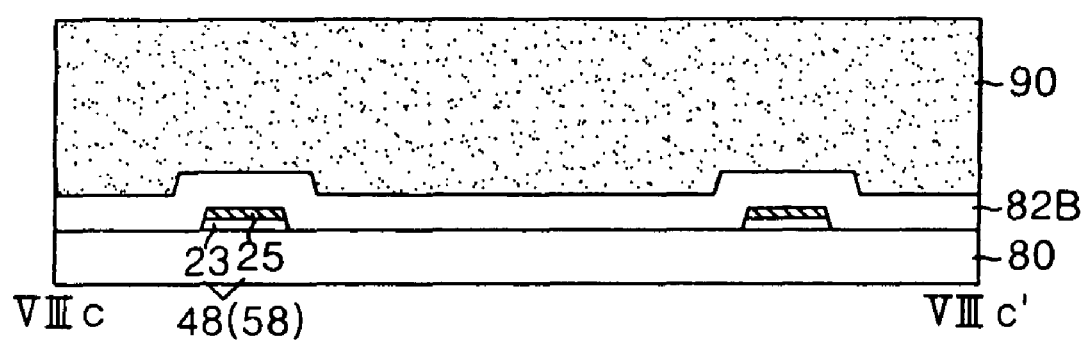
Figure 18F:
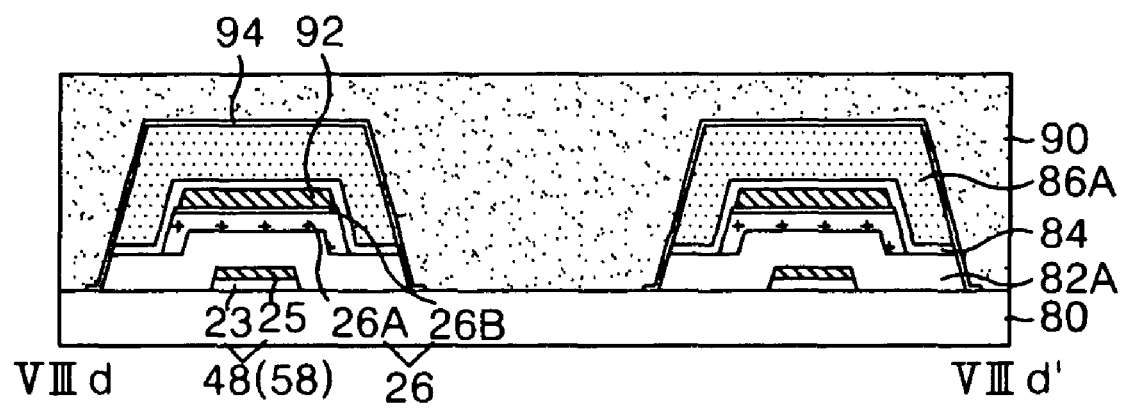
Figure 18G:
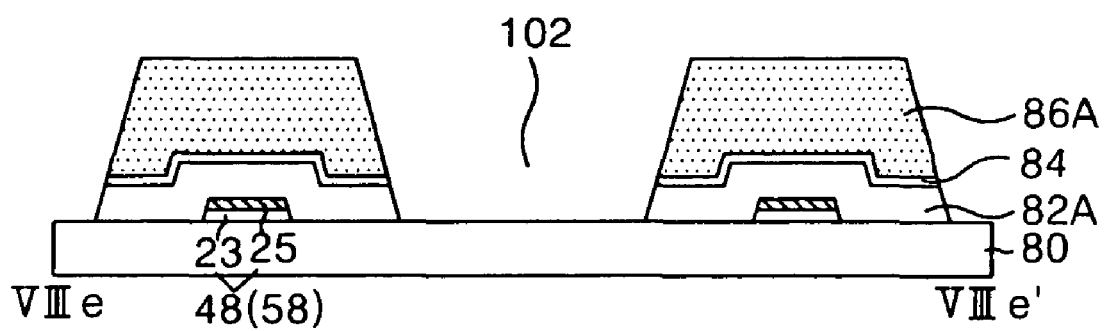

FIG. 17 is an enlarged plane view partially illustrating a sealing area of a thin film transistor substrate according to another embodiment of the present invention, and FIGS. 18A-18G are sectional diagrams illustrating a sealing area and a surrounding part thereof shown in FIG. 17, respectively taken along the lines V-V', VI-VI', VIIa-VIIa', VIIc-VIIc', VIId-VIId', VIIe-VIIe'.

Specifically, the foregoing first wiring structure and wiring gap structure are applied to the seal area shown in FIGS. 17 and 18A-18G.

The seal area illustrated in FIGS. 17 and 18 has substantially similar components as the seal area shown in FIGS. 11 and 12 except that the sealant 90 is in contact with the gate insulating pattern 82B even between the wirings, thus the explanation for the repeated components will be omitted.

The gate insulating pattern, which is exposed between the organic insulating film 86 of the cell inner part and the organic insulating pattern 86A overlapping the part of the seal area, includes a first gate insulating pattern 82A of the upper part and a second gate insulating pattern 82B between the wirings, and the first and second gate insulating patterns 82A and 82B are formed to be integrated. The first gate insulating pattern 82A is further extended to the cell outer part along the organic insulating pattern 86A which independently encompasses each wiring. Herein, the length of the second gate insulating pattern 82B is formed to be shorter than the exposed part length (wiring direction) of the first gate insulating pattern 82A. Accordingly, the area 102 between the organic insulating patterns 86A has a structure such that the substrate 80 is exposed.

Accordingly, the sealant 90 is in contact with the first gate insulating pattern 82B, which is adjacent to the cell inner part and exposed; the organic insulating pattern 86A which is adjacent to the cell outer part and exposed; and the dummy protective pattern 94 in the wiring upper part. The sealant 90, it is in contact with the second gate insulating pattern which is adjacent to the cell inner part and exposed, and the substrate 80 which is adjacent to the cell outer part and exposed, between the wirings. As a result, the adhesive strength is improved, and reliability is improved due to prevention of liquid crystal contamination and the protection of wiring.

The seal area according to the second embodiment of the present invention having such a structure is formed by four mask processes as shown in FIGS. 19A to 22H. The four mask processes are substantially similar to the four mask processes described above with reference to FIGS. 4A to 7B, thus it will be described in brief.

Figure 19A:
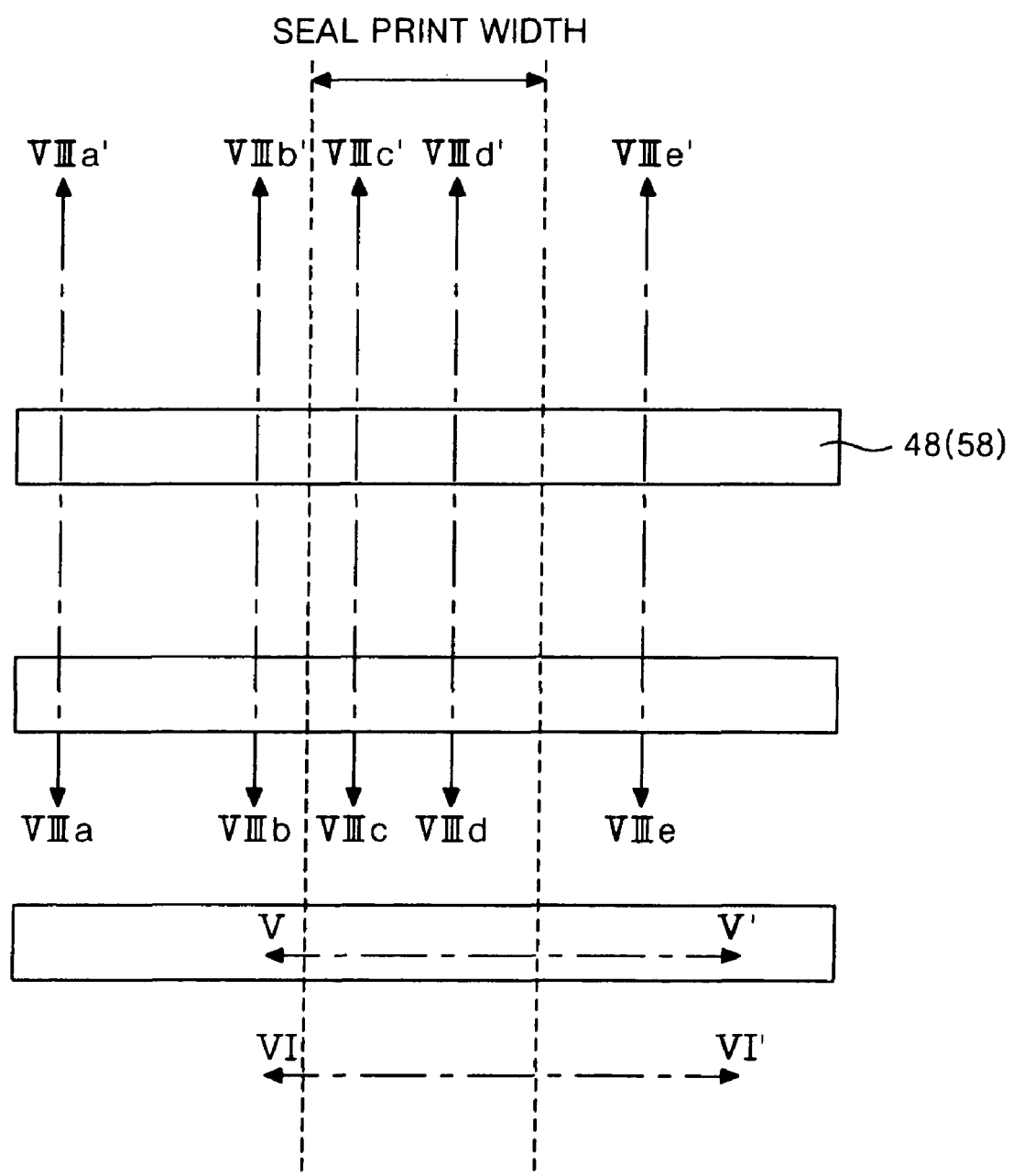
FIGS. 19A through 19H are a plain view and a sectional diagram to explain a first mask process in a fabricating method of the thin film transistor substrate shown in FIGS. 17 and 18.
Figure 19B:
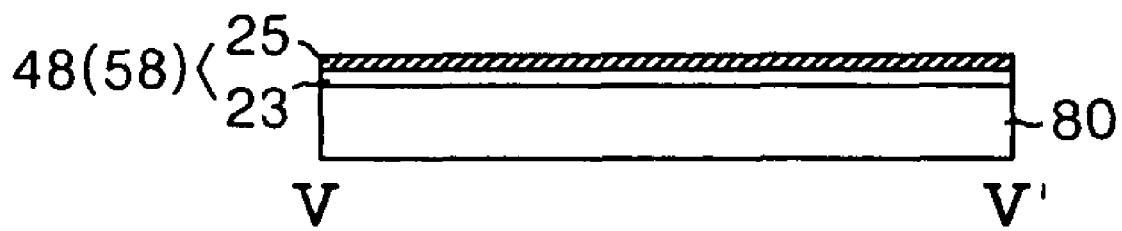
Figure 19C:
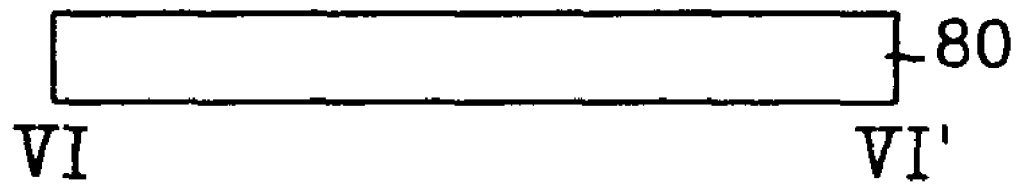
Figure 19D:
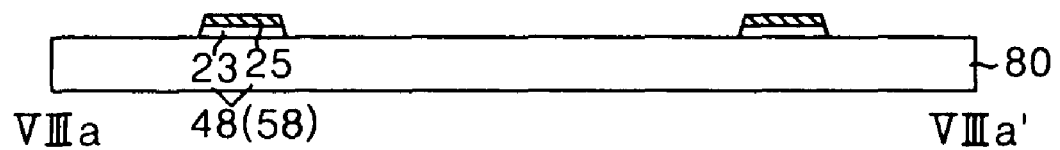
Figure 19E:
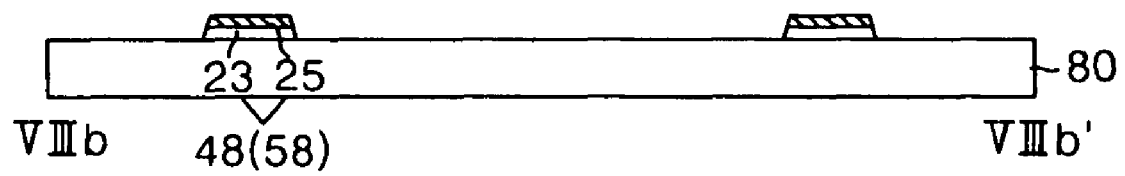
Figure 19F:
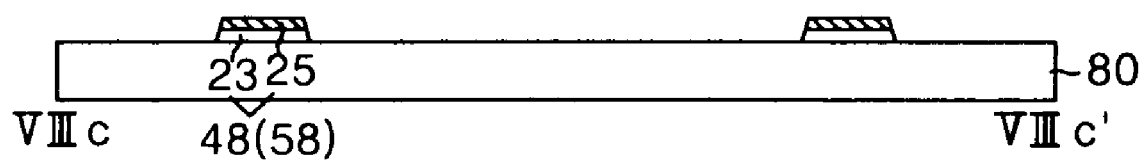
Figure 19G:
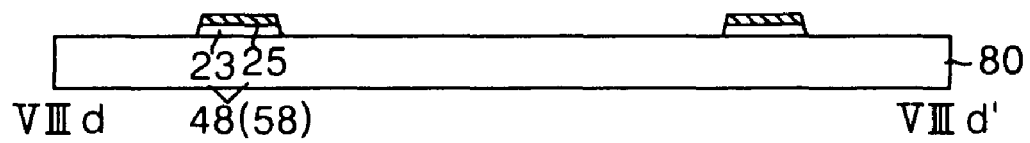
Figure 19H:
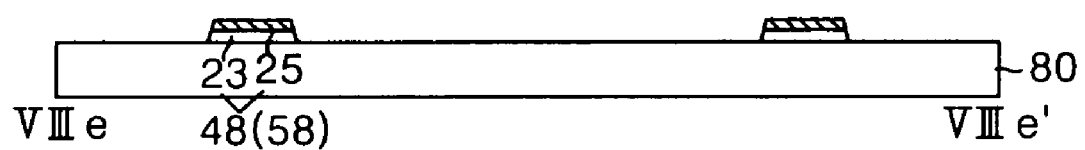

Referring to FIGS. 19A and 19H, there is formed a wiring of double structure such as the gate link 48, the data link 58 and the common link on the substrate 80 by a first mask process.

Figure 20A:
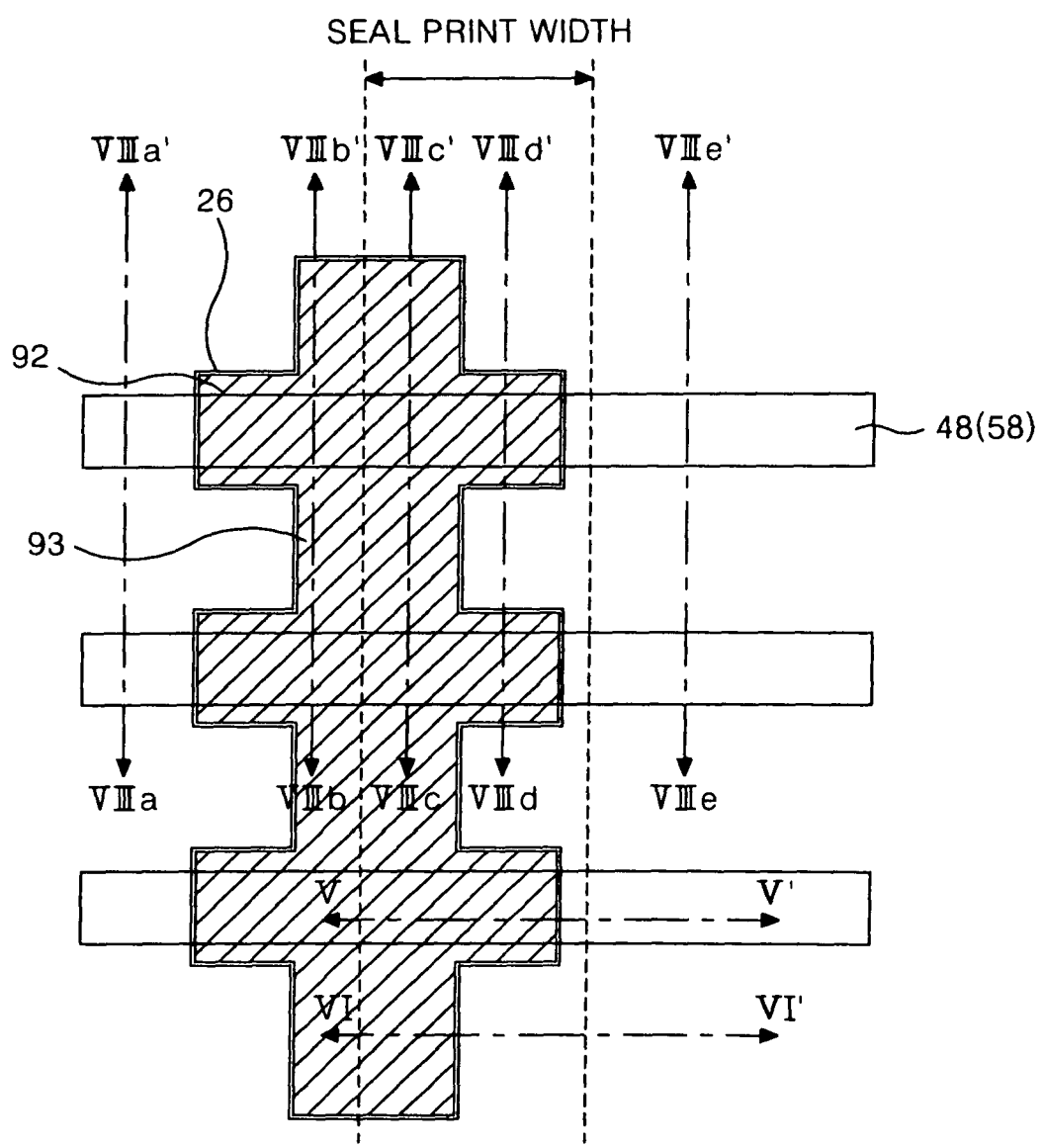
FIGS. 20A through 20H are a plane view and a sectional diagram to explain a second mask process in the fabricating method of the thin film transistor substrate shown in FIGS. 17 and 18.
Figure 20B:
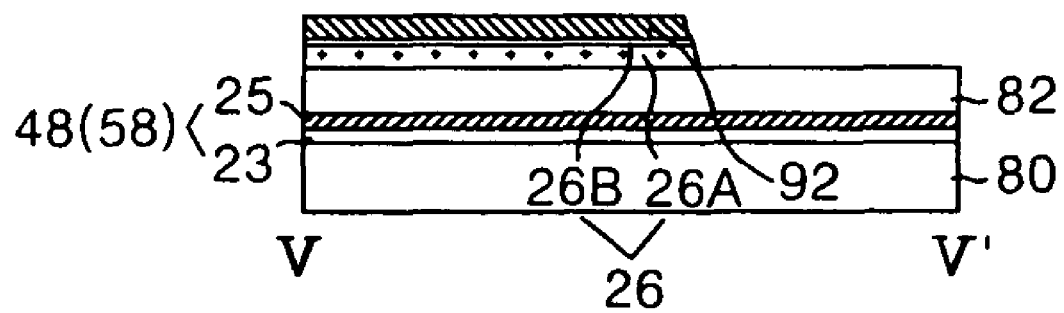
Figure 20C:
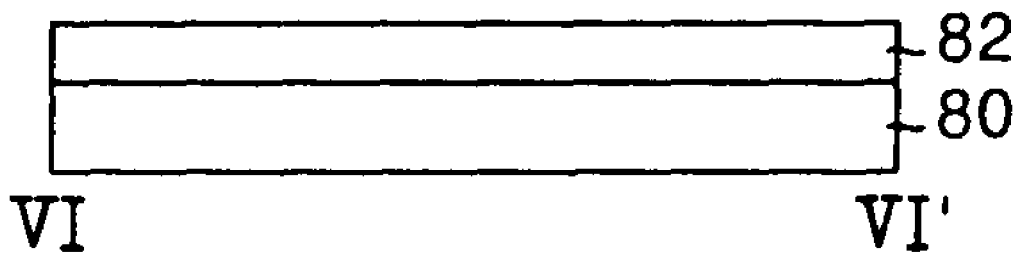
Figure 20D:
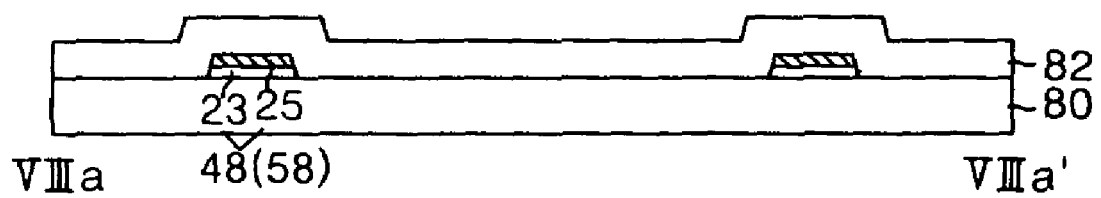
Figure 20E:
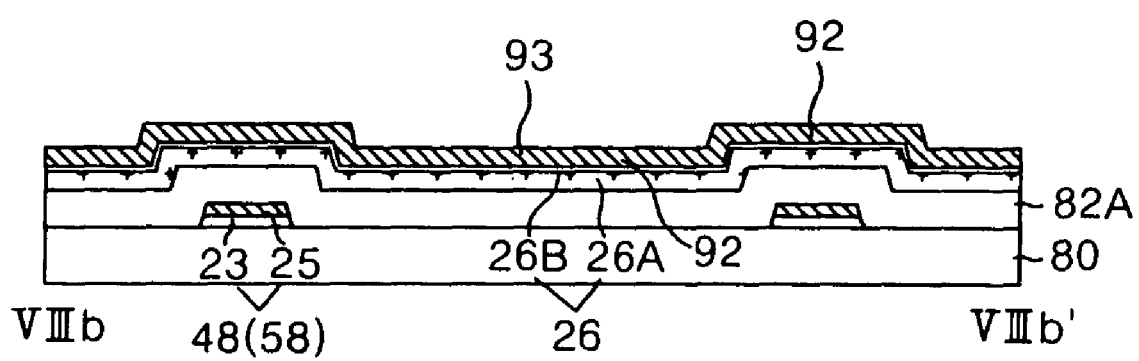
Figure 20F:
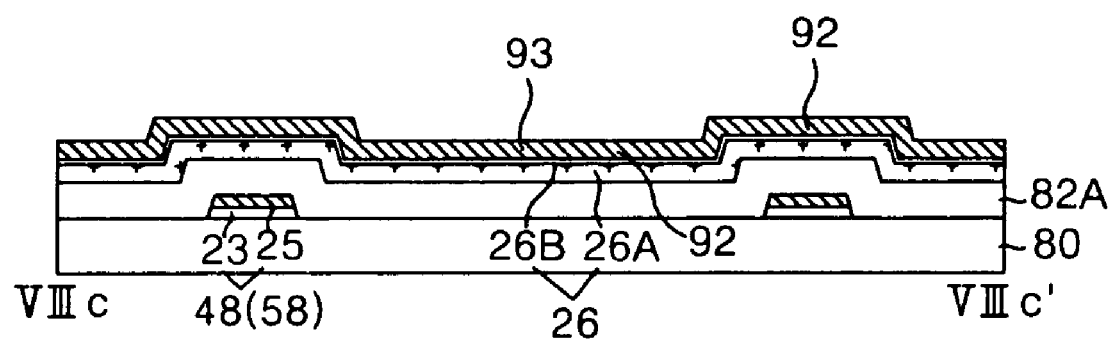
Figure 20G:
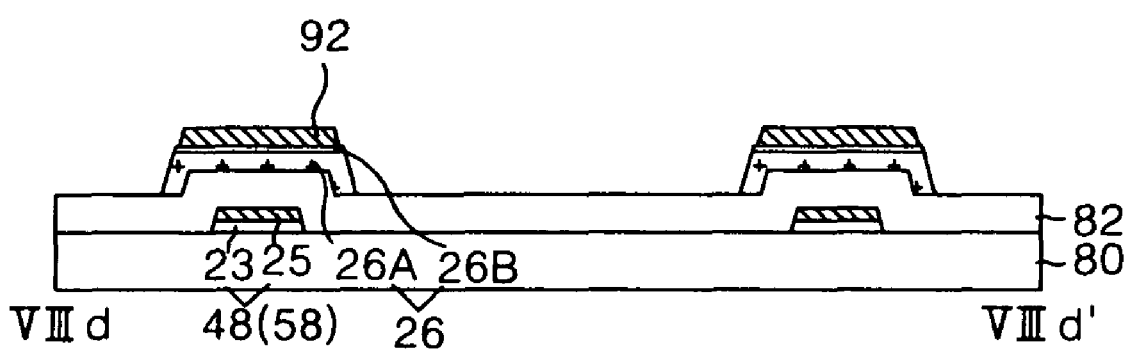
Figure 20H:
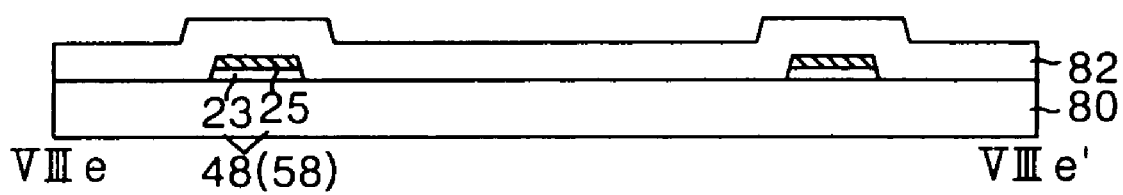
Figure 21A:
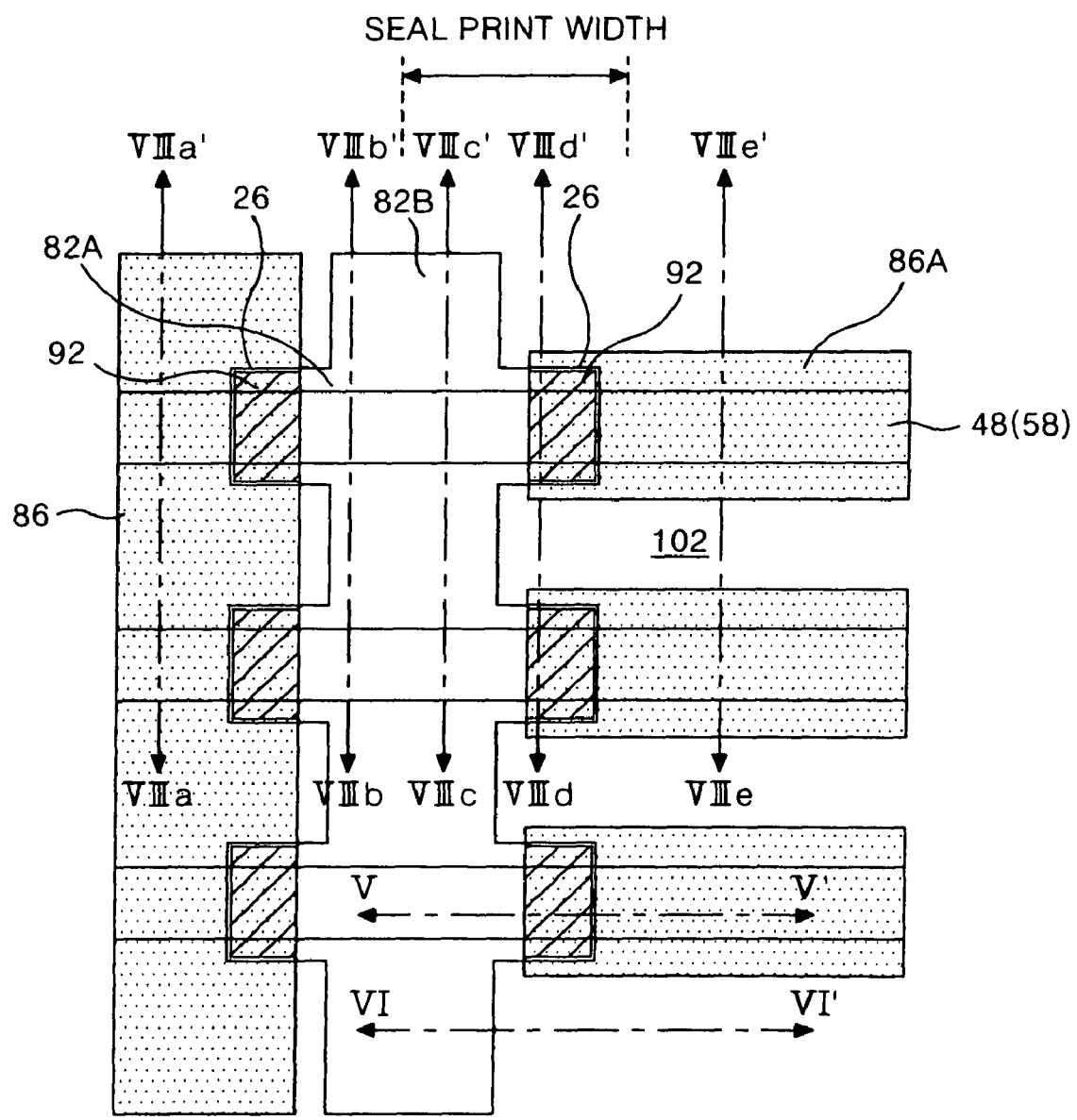
FIGS. 21A through 21H are a plane view and a sectional diagram to explain a third mask process in the fabricating method of the thin film transistor substrate shown in FIGS. 17 and 18.
Figure 21B:
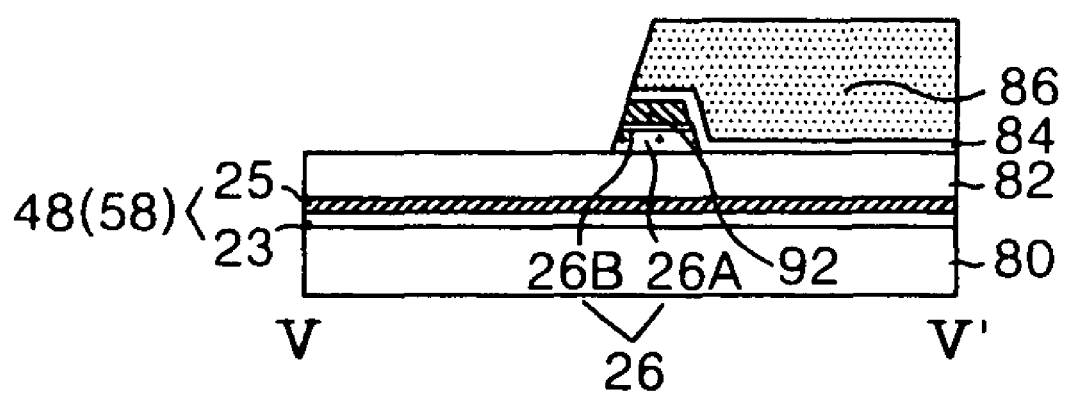
Figure 21C:
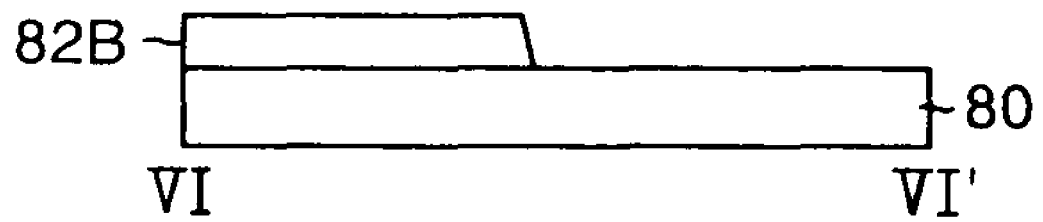
Figure 21D:
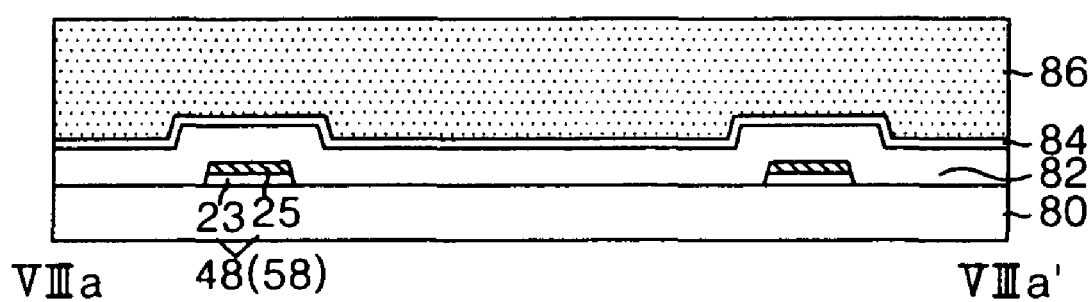
Figure 21E:
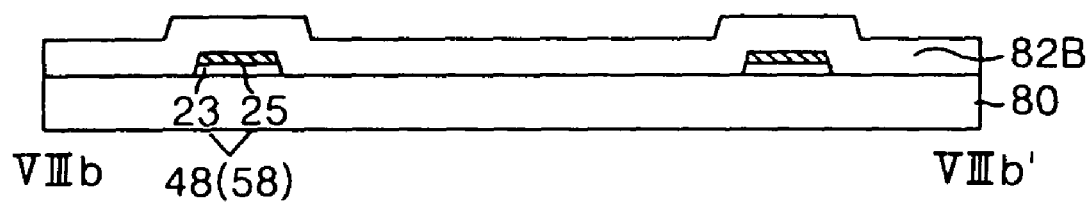
Figure 21F:
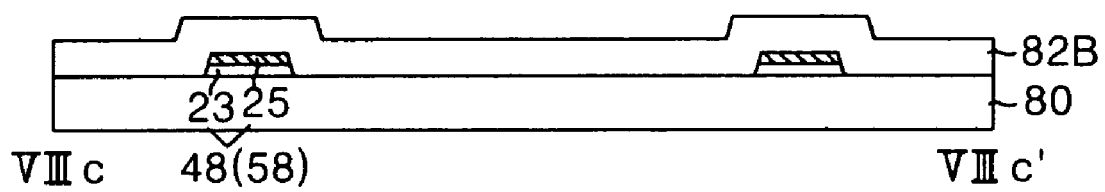
Figure 21G:
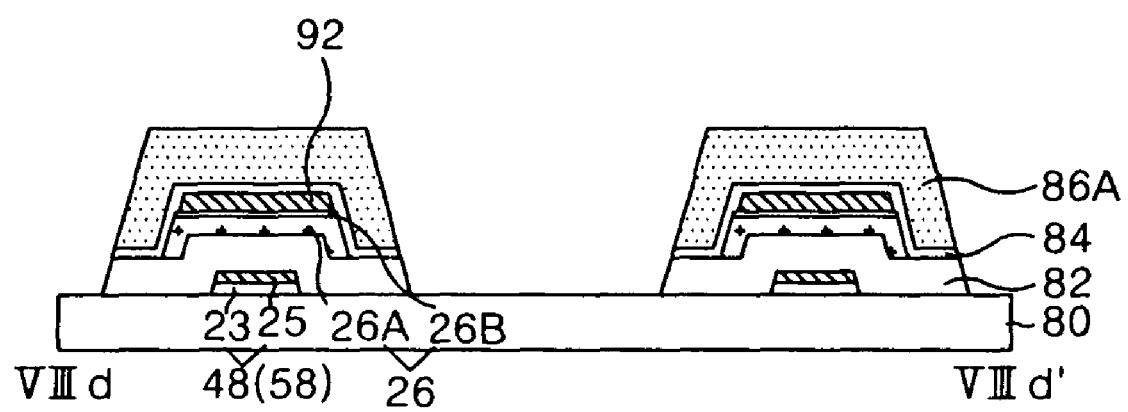
Figure 21H:
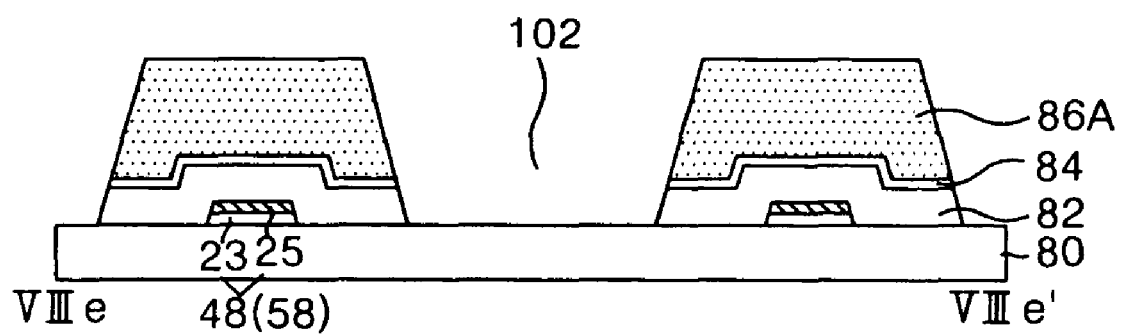
Figure 22A:
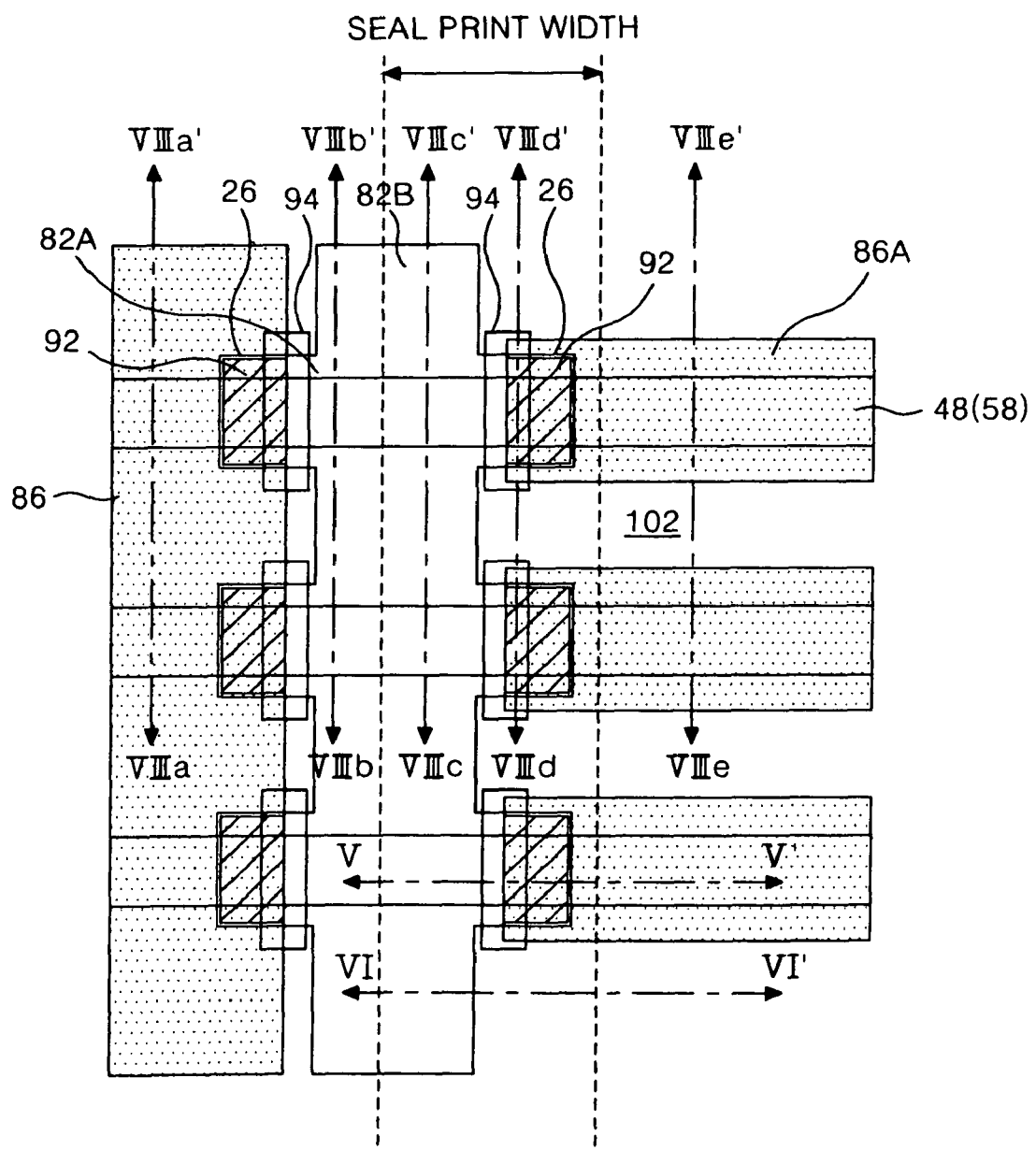
FIGS. 22A through 22H are a plane view and a sectional diagram to explain a fourth mask process in the fabricating method of the thin film transistor substrate shown in FIGS. 17 and 18.
Figure 22B:
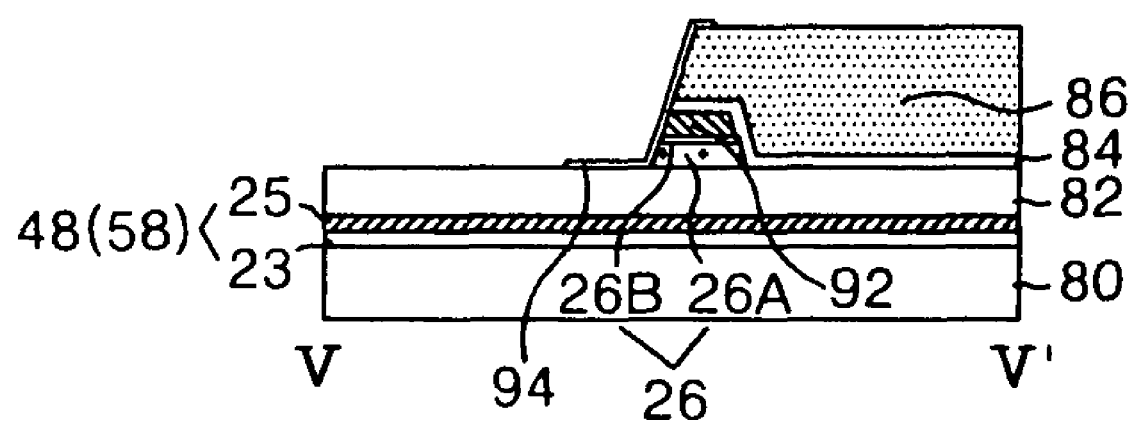
Figure 22C:
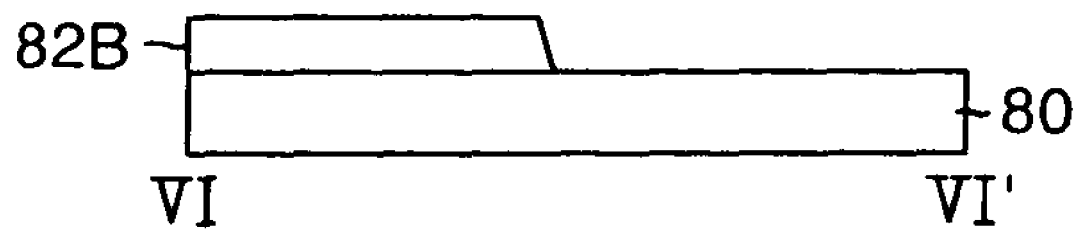
Figure 22D:
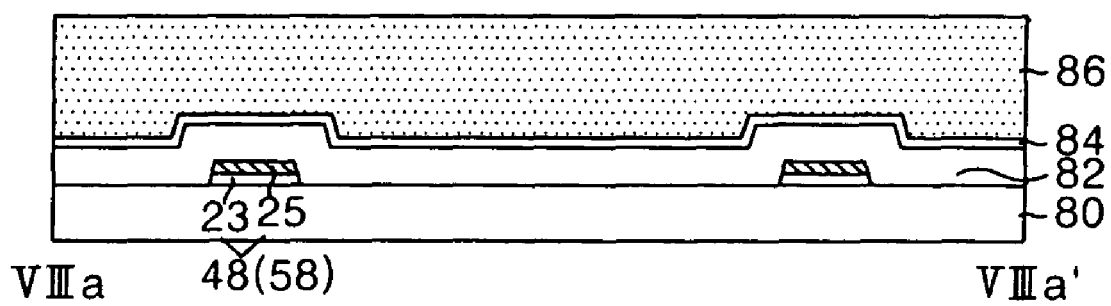
Figure 22E:
Figure 22F:
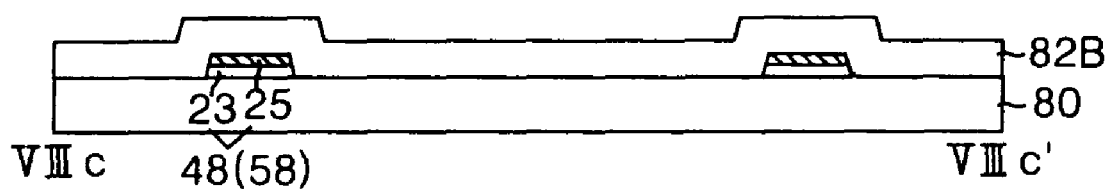
Figure 22G:
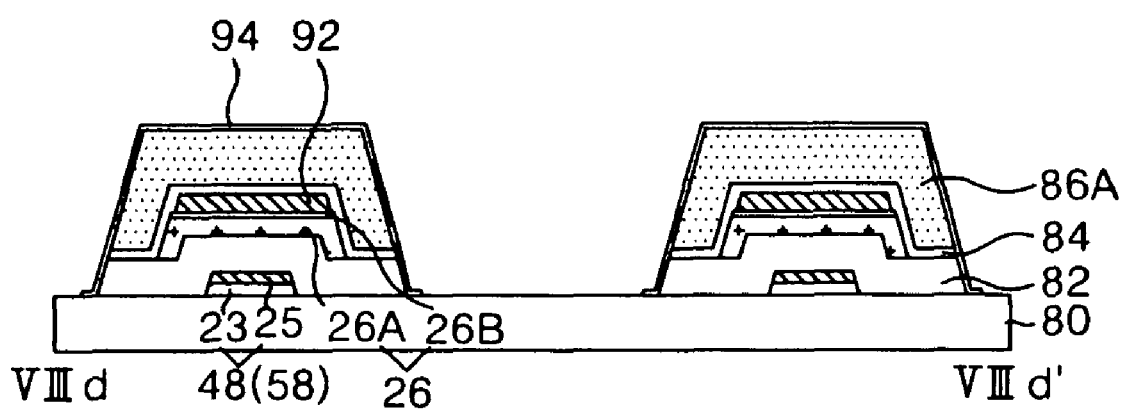
Figure 22H:
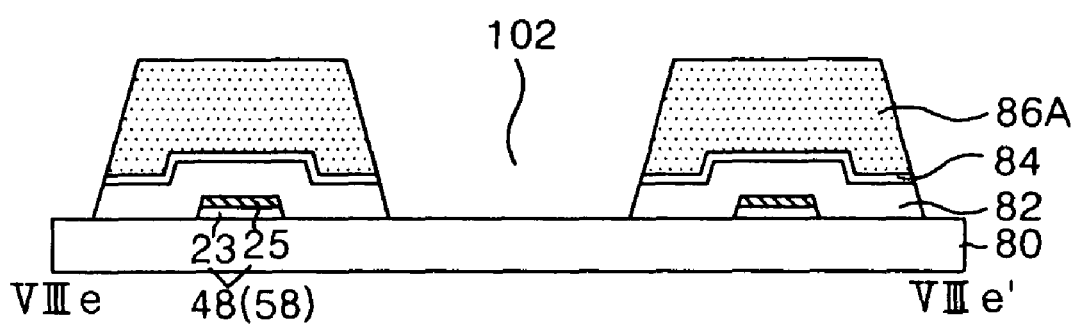

Referring to FIGS. 20A and 20B 20H, the gate insulating film 82 is formed, which commonly covers the wirings. Also formed are the first and second dummy patterns 92, 93, which act as the etch stopper, to overlap each wiring together with the semiconductor pattern 26 underneath. Herein, the first dummy pattern 92 is formed along the wiring to the part of the seal area from the cell inner part which is adjacent to the seal area, and the second dummy pattern 93 integrated with the first dummy pattern 92 between the wirings. The length of the second dummy pattern 93 may be shorter than the length of the first dummy pattern 92 (wiring direction).

Referring to FIGS. 21A and 21B-21H, the buffer insulating film 84 and the organic insulating film 86 are formed on the gate insulating film 82 by the third mask process, and then these three insulating films are patterned. Accordingly, the insulating films separated from the seal area are formed in the cell inner part. Further, an insulating pattern is formed that independently protects each wiring from the seal area to the cell outer part. In this case, the first and second dummy patterns 92, 93, which act as the etch stopper are exposed to be removed together with the semiconductor pattern underneath. Accordingly, the first gate insulating pattern 82A, which encompasses each wiring, and the second gate insulating pattern 82B between wirings remain at the part where the first and second dummy patterns 92, 93 and the semiconductor pattern 26 are removed. Further, the part of the first dummy pattern 92 overlapping the end of the organic insulating pattern 86A and the organic film 86 symmetrically remains together with the semiconductor pattern 26.

Referring to FIGS. 22A and 22B-22H, the dummy protective pattern 94 is formed from a transparent conductive layer to protect the edge of the semiconductor pattern 26 and the first dummy pattern 92 by the fourth mask process. The dummy protective pattern 94 prevents the first dummy pattern 92 and the semiconductor pattern 26 from being exposed to etchant used in the patterning process of the transparent conductive layer for forming the contact electrode and the pixel electrode on the cell inner part.

Figure 23A:
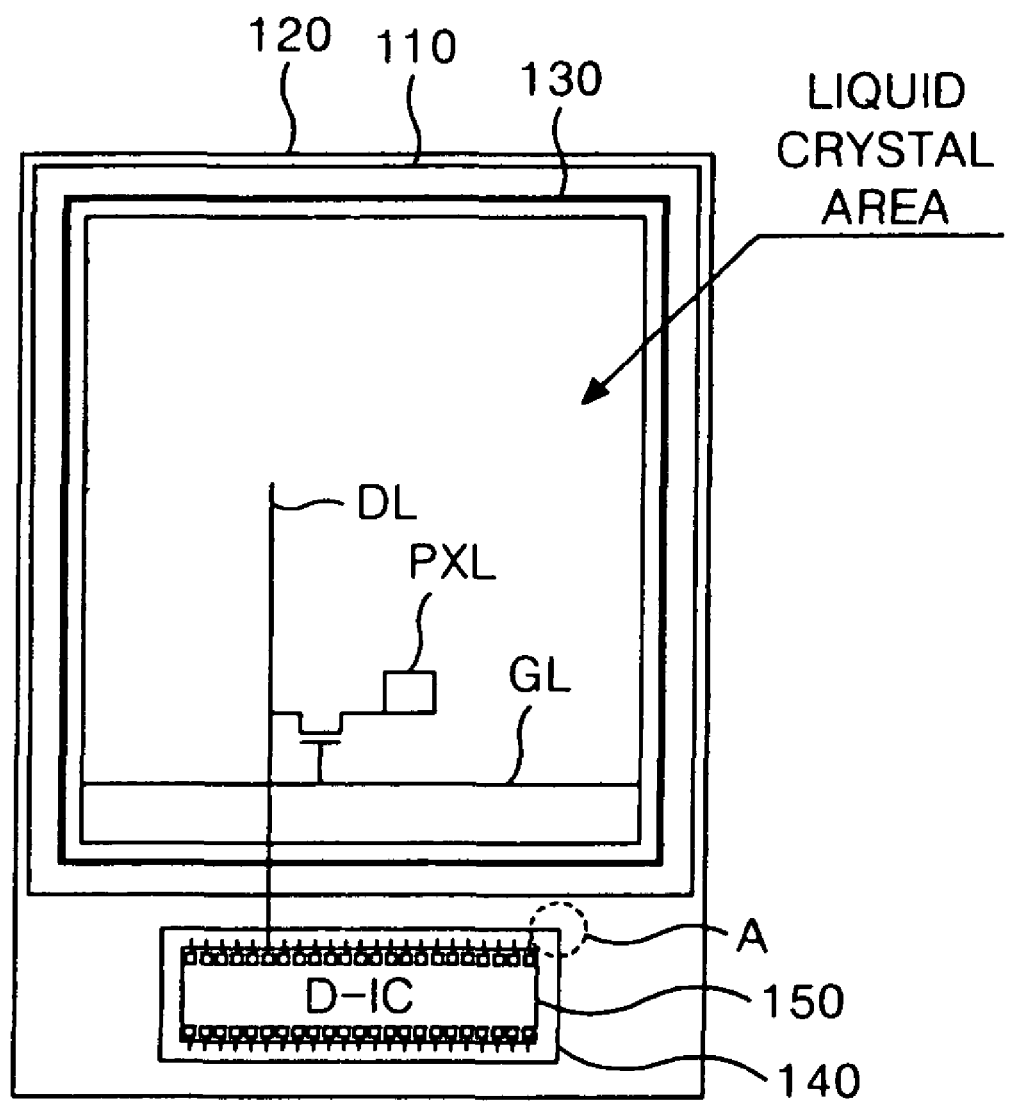
FIGS. 23A and 23B are plane views illustrating a liquid crystal display panel according to the embodiment of the present invention.
Figure 23B:
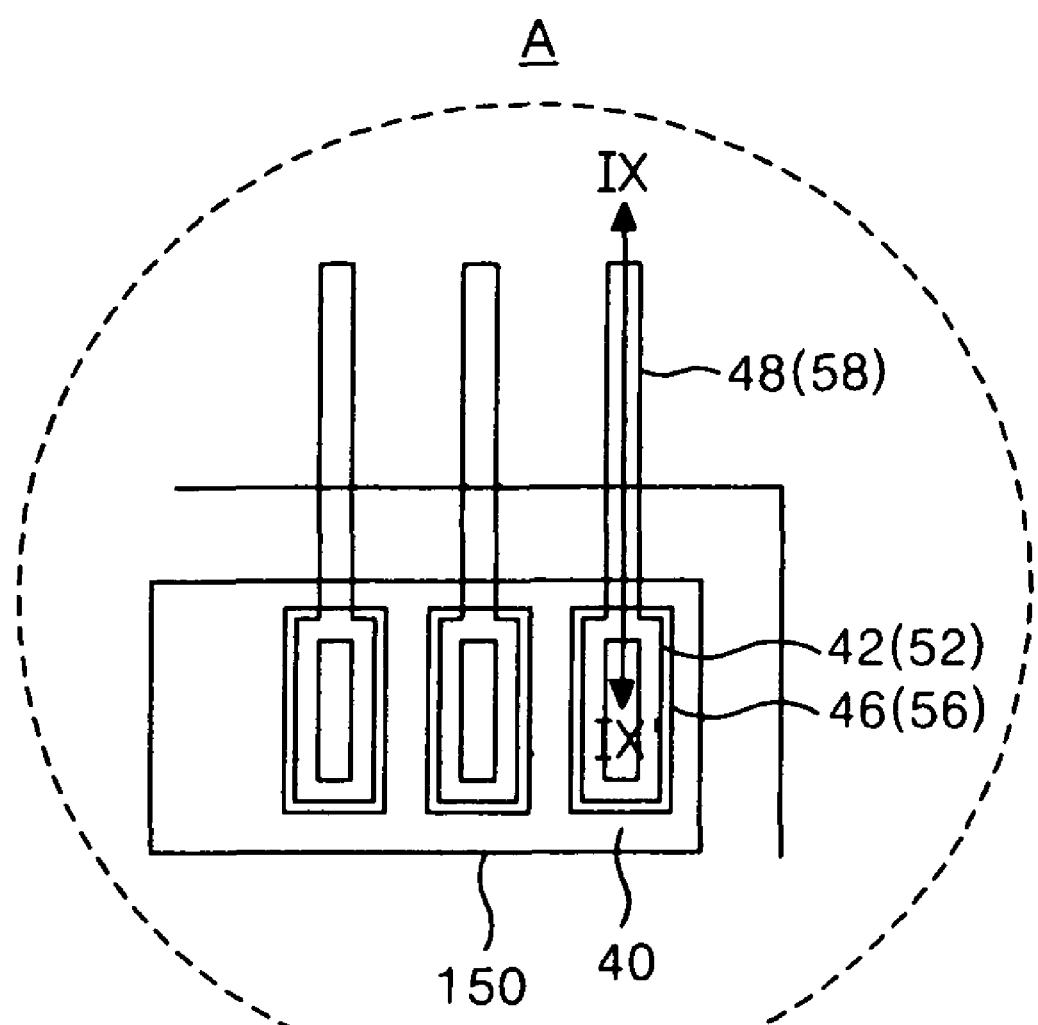
Figure 24:
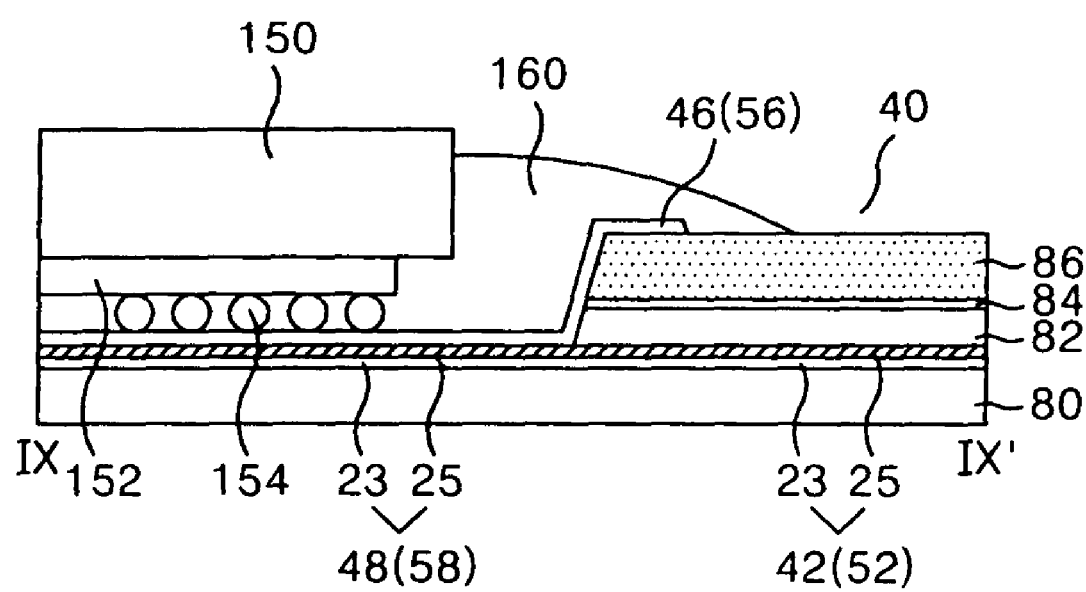
FIG. 24 is a sectional diagram illustrating a sticking part of a tape carrier package illustrated in FIG. 23B, taken along the line IX-IX'.

FIGS. 23A and 23B illustrate a liquid crystal display panel including an organic film according to the embodiment of the present invention. FIG. 24 is a sectional diagram illustrating a sticking part of a tape carrier package (hereinafter, referred to as "TCP") illustrated in FIG. 23, taken along the line IX-IX'.

The liquid crystal display panel shown in FIG. 23 is formed by having a thin film transistor substrate 110 and an upper plate 120 bonded together though a first sealant 130 that encompasses a liquid crystal area.

A TCP 150 is adhered to the surrounding part of the thin film transistor substrate 110 that does not overlap the upper plate 120, wherein a drive IC 140 for driving the gate line 22 and the data line 24 may be mounted on the TCP 150. The TCP 150, as illustrated in FIG. 24, is adhered to a pad part including the gate pad 40 or the data pad (not shown) through an anisotropic conductive film ACF 154 as in FIG. 24. The sticking part of the TCP 150 and the pad part is sealed by a second sealant 160 that substantially encompasses the surroundings of the TCP 150.

Referring to FIGS. 23B and 24, the gate line 22 formed at the liquid crystal area is connected to the gate pad 40 through the gate link 48, and the gate pad 40 is connected to the output pad 152 of the TCP 150, on which the drive IC 140 is mounted, through the ACF 154. The gate pad 40 includes a gate pad lower electrode having a double structure, which is extended from the gate link 48, and a gate pad upper electrode 46 connected to the gate pad lower electrode 42. The gate pad upper electrode 46 is connected to the gate pad lower electrode 42 which is exposed through a contact hole that penetrates the organic insulating film 86, the buffer insulating film 84 and the gate insulating film 82. The gate pad upper electrode 46, as illustrated in FIG. 24, is located between the edge part of the TCP 150 and the edge part of the second sealant 160 to be protected by the second sealant 160. On the other hand, in the gate pad double structure lower electrode 42 in which the first and second gate metal layers 23, 25 are deposited, a metal like Mo may be used, which is easily dry-etched, as a second gate metal layer. The lower electrode 82 might be etched when forming the contact hole to have a structure so that the first gate metal layer 23 is exposed.

The data line (not shown) may be connected to a data link 58 through the contact electrode (not shown) may as described above, and the data link 58 and a data pad (not shown) also have the same structure as the gate link 48 and the gate pad 40 to be connected to an output pad 152 of the TCP 150 through ACF 154.

As described above, in the liquid crystal display panel having an organic insulating film, and the fabricating method thereof, according to the present invention, the wiring crossing the sealant has a substantially similar structure, thereby enabling maintenance of a uniform cell gap. Further, according to the present invention, the organic insulating film is removed from the bordering part where the liquid crystal is in contact with the sealant such that the gate insulating film is exposed to the sealant and protects the wirings. Accordingly, the liquid crystal and the sealant are not in contact with the organic insulating film at the bordering part, thus the liquid crystal contamination caused by the reaction of the sealant and the organic insulating film might be prevented. The organic insulating film protects the wiring in the cell outer part and it partially overlaps the sealant. Thus, the adhesive strength can be improved due to the reduction of the area of contact between the sealant and the organic insulating film.

Further, according to the present invention, in case that the surroundings of the TCP adhered to the pad part is sealed by the sealant, the pad upper electrode, which is formed of a transparent conductive layer, is located between the edge part of the TCP and the edge part of the sealant, thereby enabling the improvement of the adhesive strength and the protection of the pad upper electrode.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed:

1. A method of fabricating a liquid crystal display device, comprising:

providing first and second substrates having a liquid crystal region, a sealant region, and an outer region;

forming a wiring on the first substrate, wherein the wiring crosses the sealant region;

forming an inorganic insulating film on the wiring;

forming an organic insulating film on the inorganic insulating film, wherein a portion of the inorganic insulating film is exposed in the sealant region; and forming a liquid crystal layer between the first and second substrates using a sealant, wherein forming the wiring includes:

forming a gate line and a first common line in the liquid crystal region, a gate pad lower electrode and a common pad lower electrode in the outer region, a common link connected to the common pad lower electrode and crossing the sealant region, and a gate link connecting the gate line to the gate pad lower electrode across the sealant region;

forming a second common line on the inorganic insulating film, the second common line crossing the gate line;

exposing a portion of the common pad lower electrode, a portion of the first common line, a portion of the second common line, and a portion of the common link when patterning the organic insulating film;

exposing the gate pad lower electrode and the first common line when patterning the inorganic insulating film; and forming a gate pad upper electrode connected to the exposed gate pad lower electrode, a common pad upper electrode connected to the portion of the common pad lower electrode, a first contact electrode connected to the portion of the first common electrode and the portion of the second common lines, and a second contact electrode connected to the portion of the second common line and the portion of the common link.

2. The method of claim 1, wherein forming the inorganic insulating film includes patterning the inorganic insulating film.

3. The method of claim 1, wherein a portion of the first substrate is exposed between the wiring in the sealant region.

4. The method of claim 1, wherein forming the organic insulating film includes forming an organic insulating film that overlaps a portion of the sealant region.

5. The method of claim 4, further comprising forming a dummy pattern between the inorganic insulating film and the organic insulating film.

6. The method of claim 5, wherein the dummy pattern overlaps the sealant region and includes metal.

7. The method of claim 5, wherein forming a dummy pattern includes forming a semiconductor layer underneath the dummy pattern.

8. The method of claim 1, further comprising forming a dummy protective pattern on the organic insulating film in a region where the organic insulating film overlaps the sealant region.

9. The method of claim 8, wherein forming a dummy protective pattern includes forming a transparent conductive layer.

10. The method of claim 1, further comprising forming a second inorganic insulating film between the inorganic insulating film and the organic insulating film.

11. The method of claim 10, wherein the second insulating film has a substantially similar shape to the organic insulating film.

12. The method of claim 1, further comprising:
attaching a tape carrier package with a pad area having at least one of a gate pad and a data pad through an anisotropic conductive film; and
sealing the tape carrier package and the pad area using a second sealant.

13. The method of claim 12, wherein the second sealant surrounds a periphery of the tape carrier package.

* * * * *